US007450651B2

(12) United States Patent
Yamasaki

(10) Patent No.: US 7,450,651 B2
(45) Date of Patent: Nov. 11, 2008

(54) MULTI-CARRIER TRANSMISSION SYSTEM

(75) Inventor: Shoichiro Yamasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 689 days.

(21) Appl. No.: 10/935,097

(22) Filed: Sep. 8, 2004

(65) Prior Publication Data
US 2005/0089107 A1    Apr. 28, 2005

(30) Foreign Application Priority Data
Sep. 22, 2003 (JP) ............................. 2003-330170

(51) Int. Cl.
*H04L 27/28* (2006.01)
*H04L 7/04* (2006.01)
(52) U.S. Cl. ..................................... 375/260; 375/355
(58) Field of Classification Search ................. 375/260
See application file for complete search history.

(56) References Cited

U.S. PATENT DOCUMENTS

| 4,601,045 | A | * | 7/1986 | Lubarsky | 375/260 |
|---|---|---|---|---|---|
| 6,028,900 | A | * | 2/2000 | Taura et al. | 375/344 |
| 6,876,675 | B1 | * | 4/2005 | Jones et al. | 370/509 |
| 2003/0072397 | A1 | * | 4/2003 | Kim et al. | 375/347 |
| 2003/0232601 | A1 | * | 12/2003 | Uno | 455/67.11 |
| 2004/0057502 | A1 | * | 3/2004 | Azenkot et al. | 375/147 |
| 2004/0109515 | A1 | * | 6/2004 | Krauss et al. | 375/316 |

FOREIGN PATENT DOCUMENTS
JP    2002-232387    8/2002
JP    2003-46473    2/2003

OTHER PUBLICATIONS

Athanasios Papoulis, "A New Algorithm in Spectral Analysis and Band-Limited Extrapolation", IEEE Transactions on Circuits and Systems, vol. CAS-22, No. 9, Sep. 1975, pp. 735-742.
Satoshi Kawata et al., "Iterative Image Restoration for Linearly Degraded Images", J. Opt. Soc. Am., vol. 70, No. 7, Jul. 1980, pp. 762-768.

* cited by examiner

*Primary Examiner*—Shuwang Liu
*Assistant Examiner*—David Huang
(74) *Attorney, Agent, or Firm*—Oblon, Spivak, McClelland, Maier & Neustadt, P.C.

(57) ABSTRACT

Multi-carrier transmission system comprises transmitter including acquisition unit configured to acquire $2^m$ (m: a natural number) modulated signals including no-information signals which are failed to be used for information transmission and $2^n$ (n: a natural number, n<m) signals, acquisition unit subjecting modulated signals to inverse discrete Fourier transform to obtain transformed signals, no-information signal included in $L^{th}$ modulated signal of modulated signals being used as first no-information signal of no-information signals, every $K^{th}$ modulated signal of modulated signals that is counted from first no-information signal being used as no-information signal (K: a natural number, L: an integer, $K=2^{m-n}$, $0 \leq L \leq K-1$), and transmission unit configured to transmit transformed signals, and receiver including receiving unit configured to receive the transformed signals, and detection unit configured to detect synchronization timing based on at least one no-information signal included in the transformed signals.

20 Claims, 27 Drawing Sheets

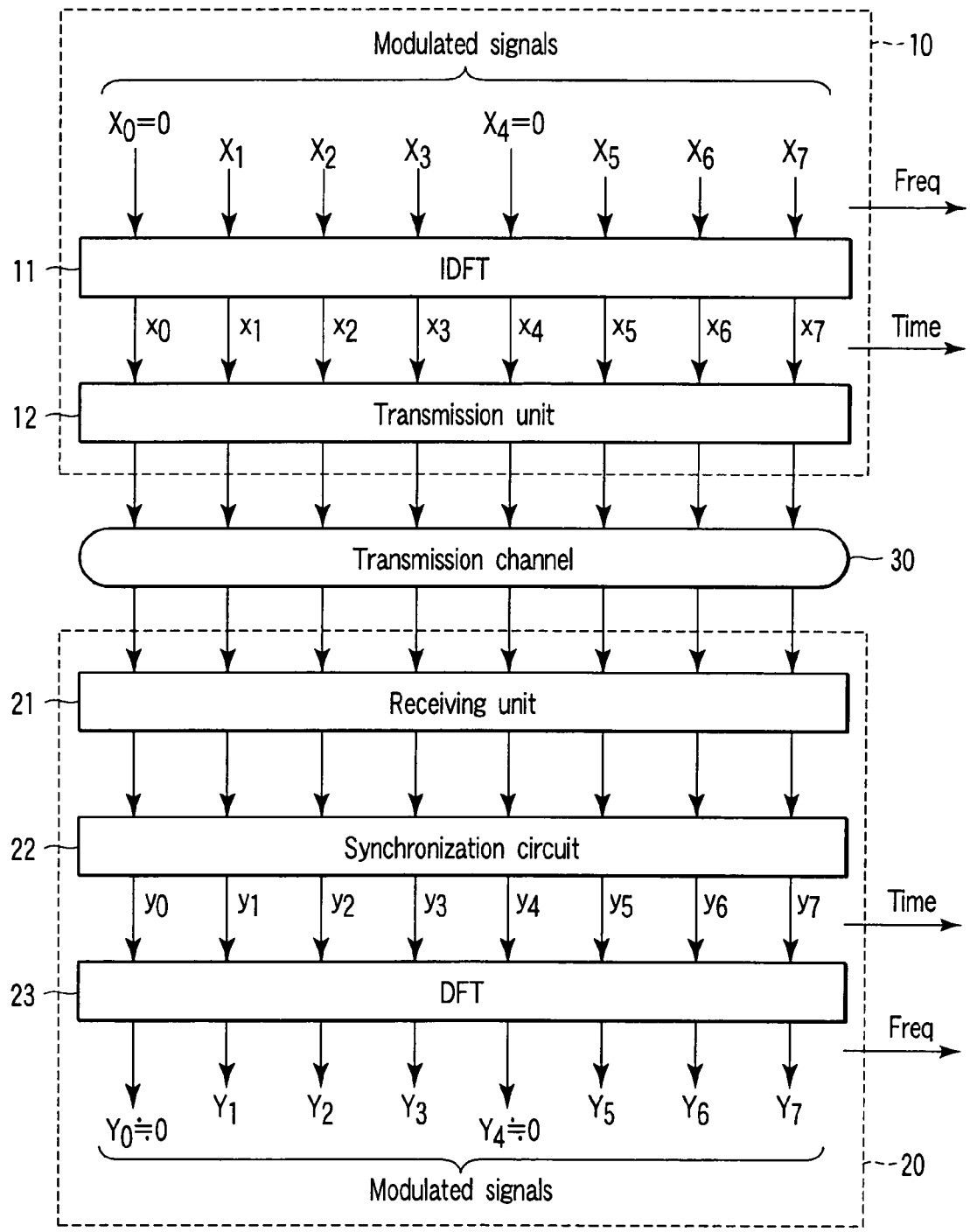
F I G. 1

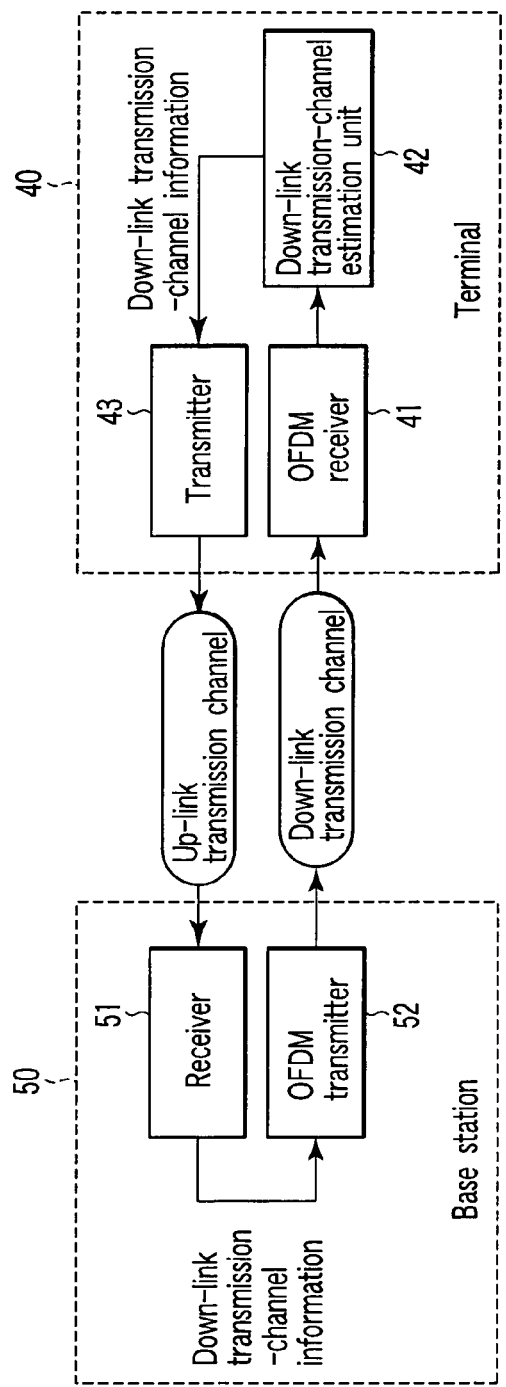
F I G. 6 A
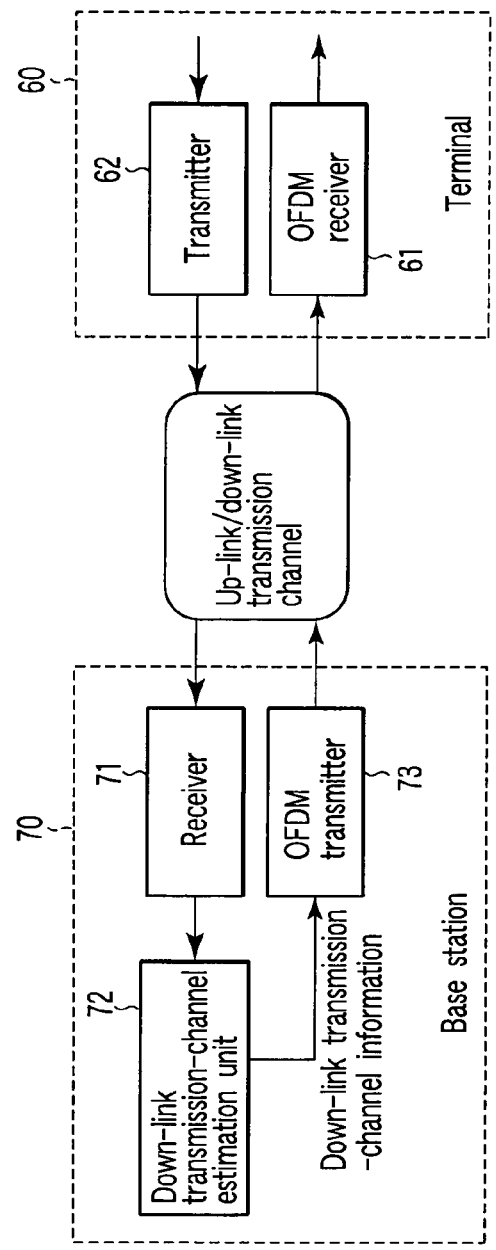
F I G. 6 B

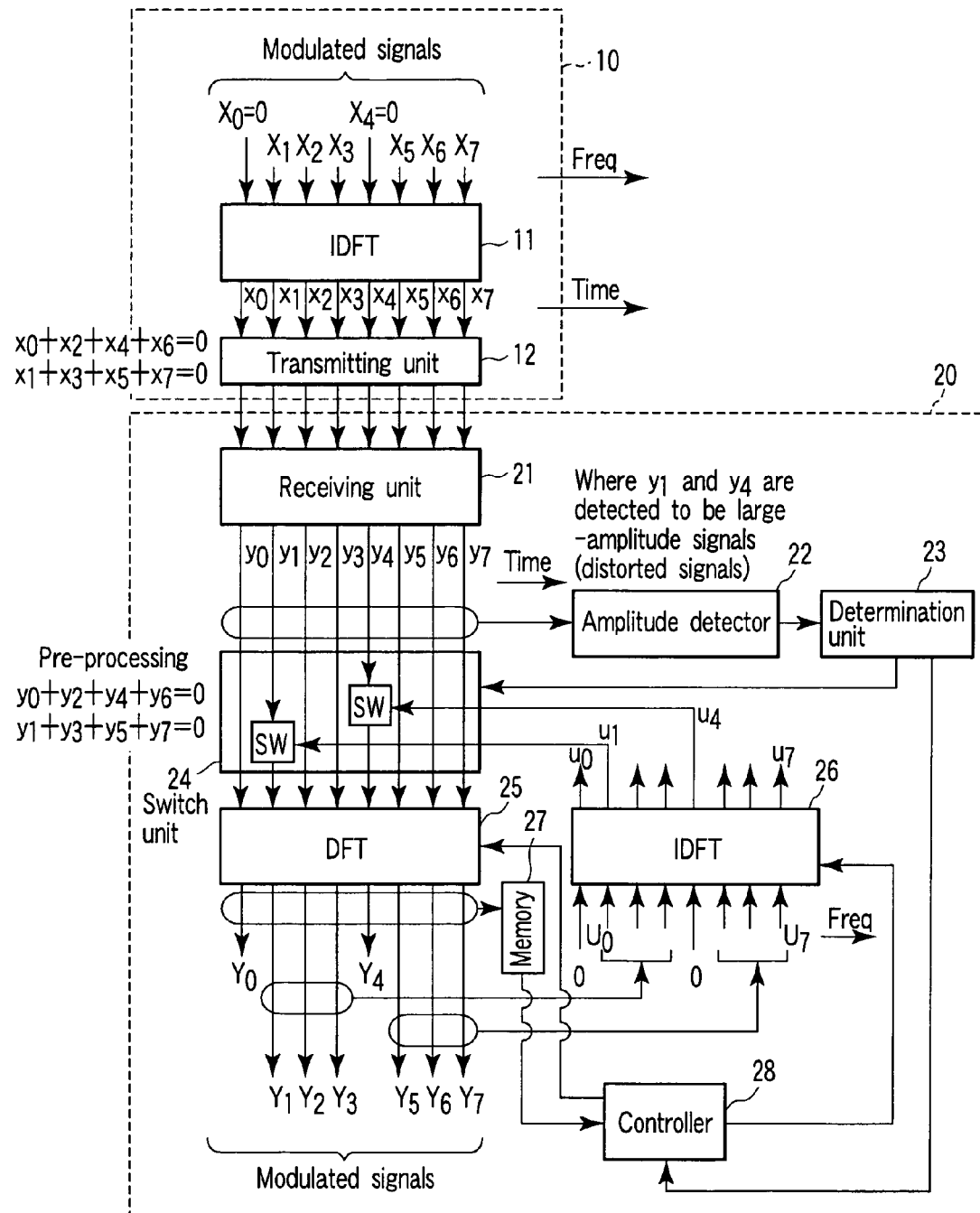
F I G. 14

Signal input to non-linear circuit

Non-linear circuit of clipping characteristic

Signal output from non-linear circuit

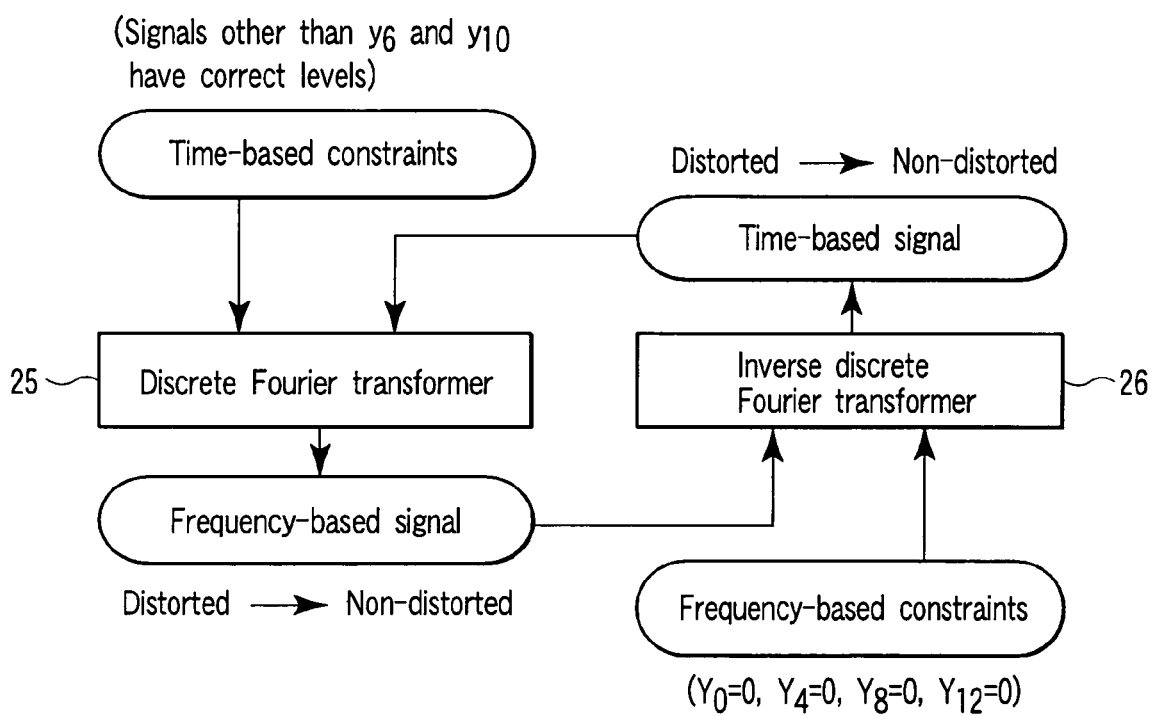
F I G. 17

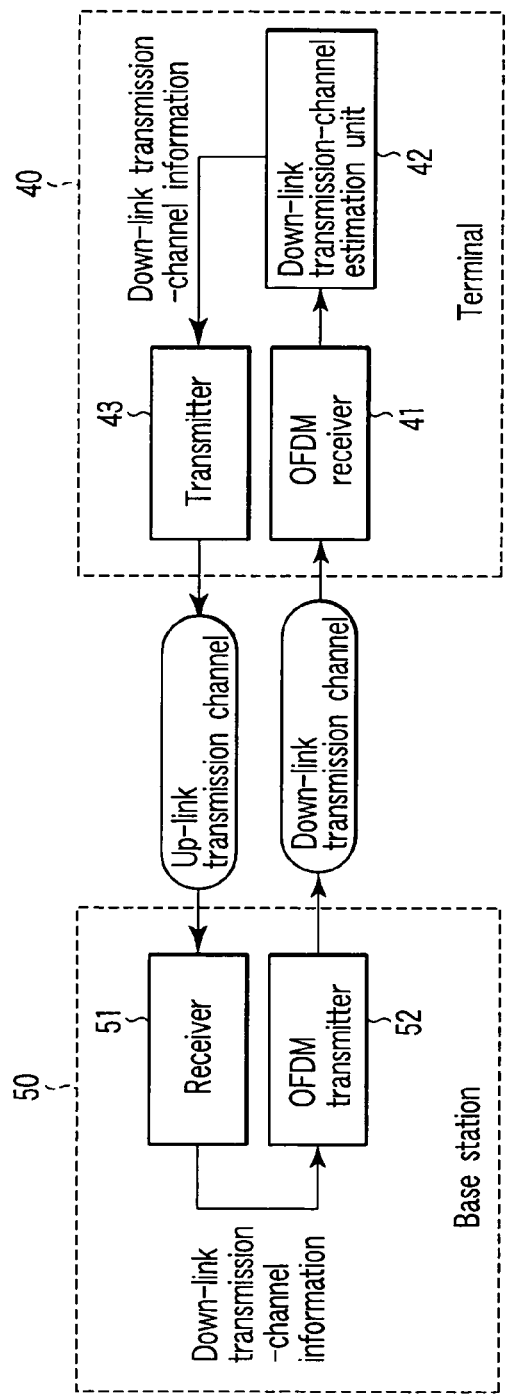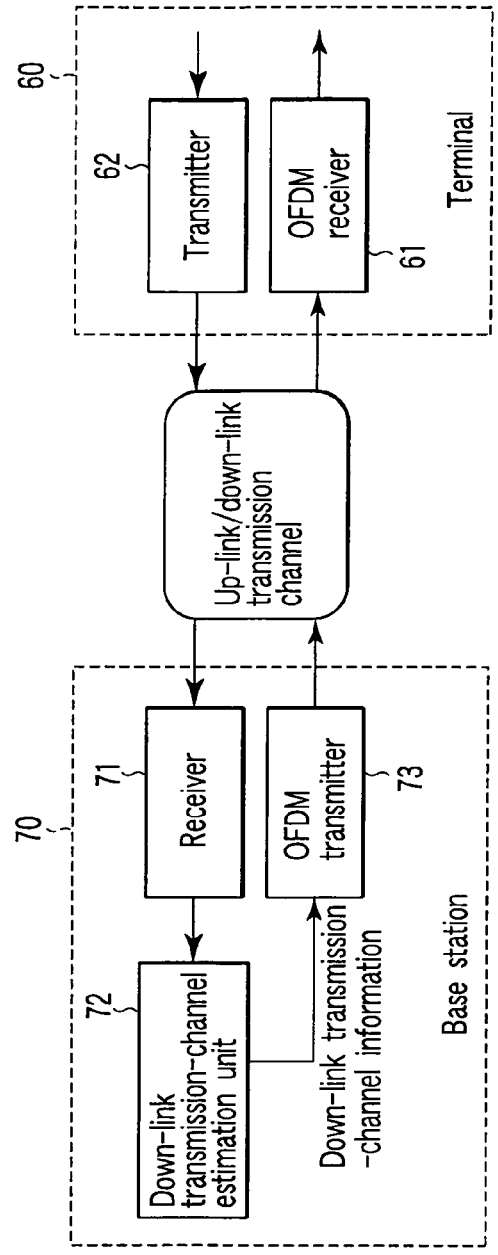
F I G. 20 A
F I G. 20 B

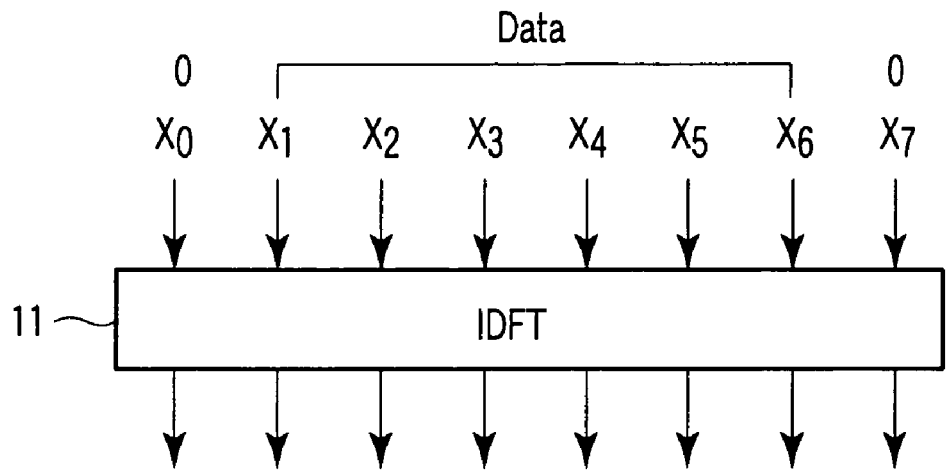
Conventional signal arrangement : Signals located at opposite ends are no-information signals
F I G. 2 1 A
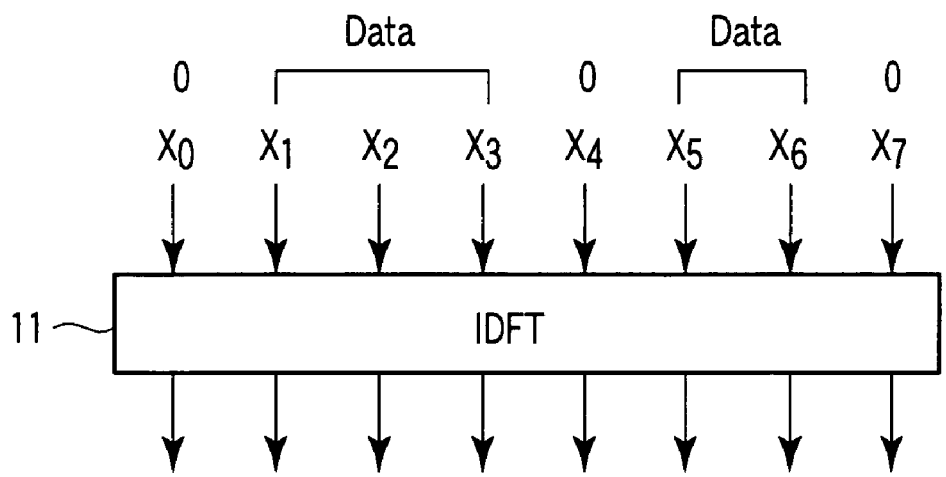
Signal arrangement of the invention : $X_4 = 0$
F I G. 2 1 B

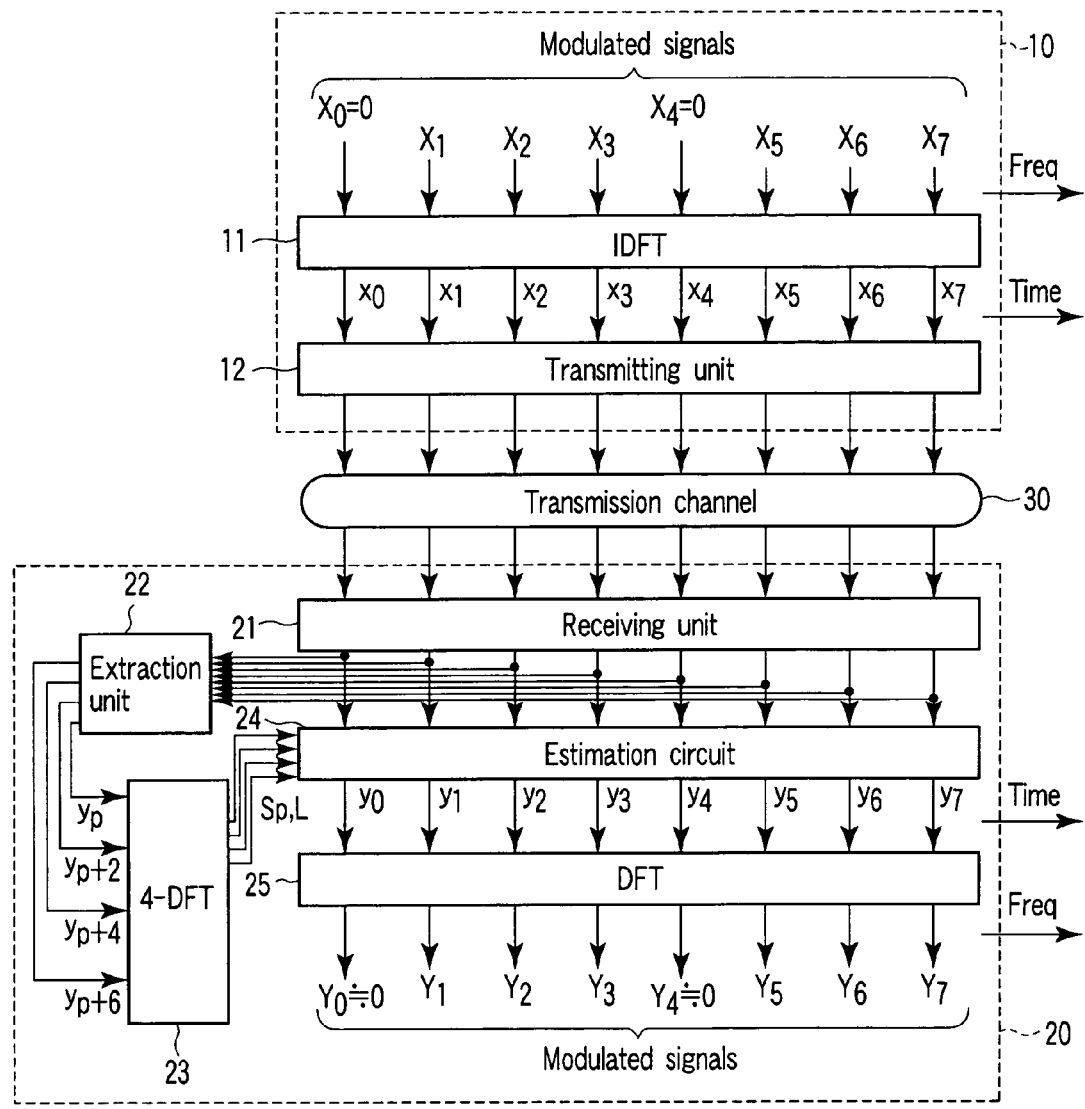
F I G. 2 2

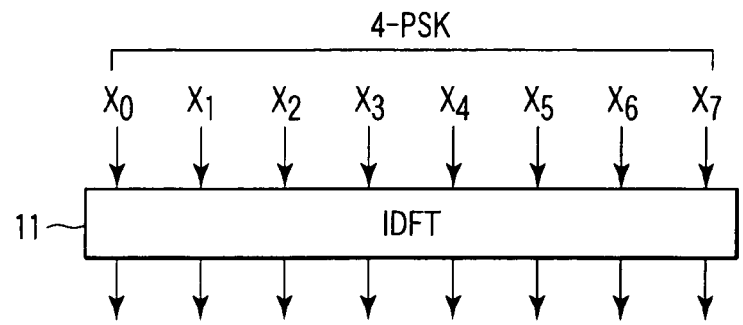
F I G. 2 6 A
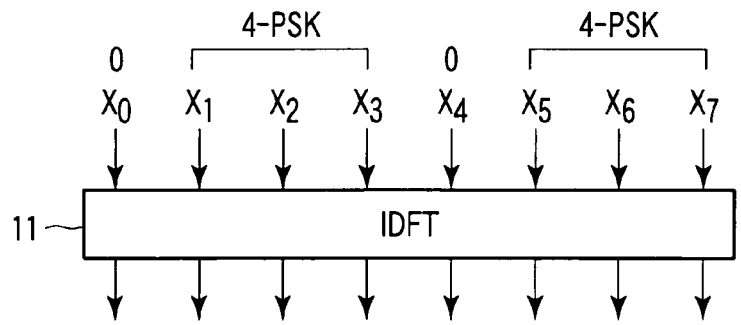
F I G. 2 6 B
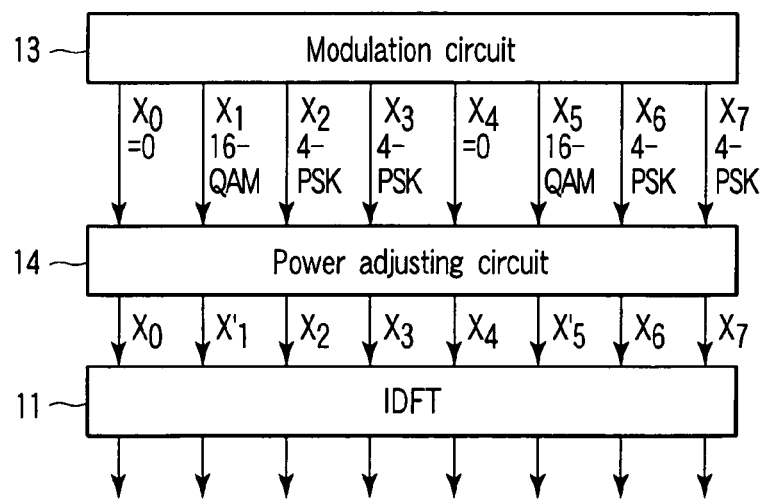
F I G. 2 6 C

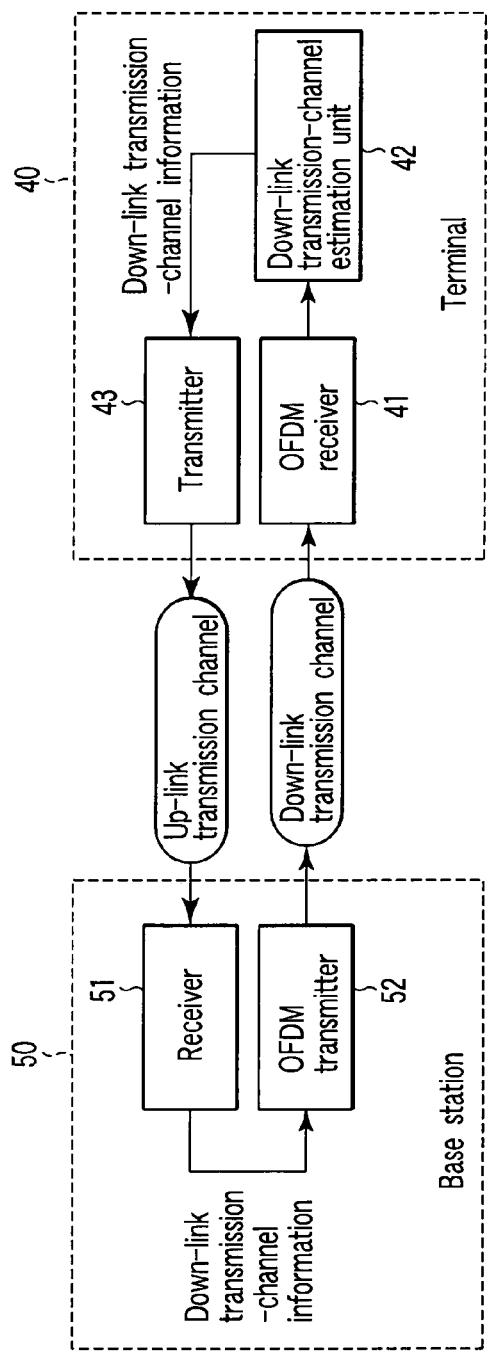
F I G. 27 A
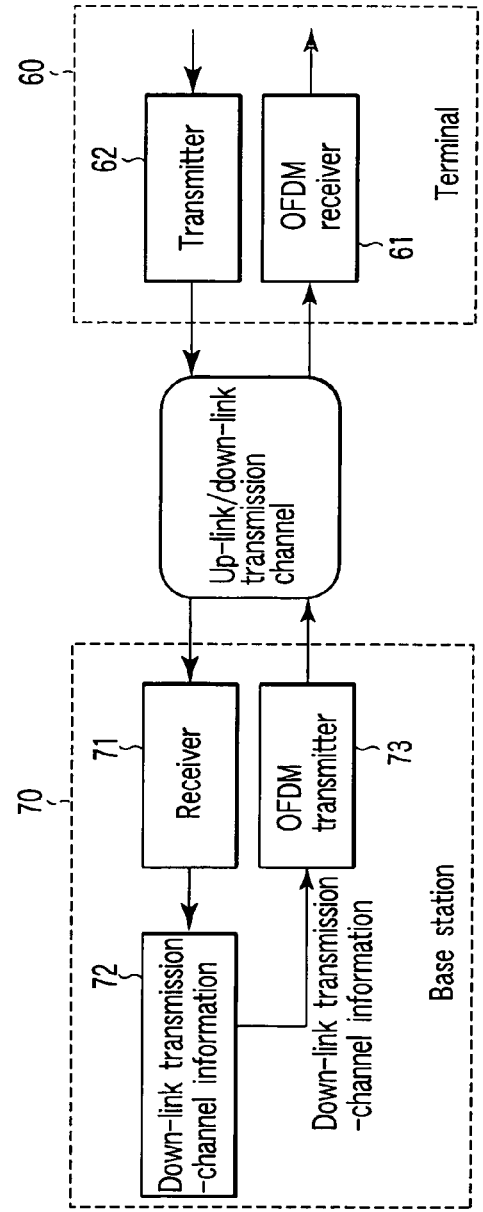
F I G. 27 B

MULTI-CARRIER TRANSMISSION SYSTEM

CROSS-REFERENCE TO RELATED APPLICATIONS

This application is based upon and claims the benefit of priority from prior Japanese Patent Application No. 2003-330170, filed Sep. 22, 2003, the entire contents of which are incorporated herein by reference.

BACKGROUND OF THE INVENTION

1. Field of the Invention

The present invention relates to a digital data transmission technique, and more particularly to a multi-carrier transmission system that utilizes an orthogonal frequency division multiplexing (OFDM) transmission technique using a multi-carrier.

2. Description of the Related Art

In OFDM as a type of multi-carrier transmission system, a transmitter multiplexes frequency-base signals into time-base signals using an inverse discrete Fourier transformer (IDFT), while a receiver extracts frequency-base signals from received time-base signals using a discrete Fourier transformer (DFT). No further particulars of OFDM will be explained since OFDM is a well-known technique.

When an OFDM receiver receives a transmission signal, a DFT performs block processing. Accordingly, it is necessary to accurately set the positions of blocks, i.e., to perform symbol synchronization. In general, to realize symbol synchronization, a transmitter adds a redundant symbol to a to-be-transmitted signal.

There is a method in which a guard symbol is inserted and synchronization is performed based on the symbol. Specifically, if, for example, there is eight IDFT outputs $x_0, x_1, \ldots, x_7$, the last four outputs $x_4, x_5, x_6$ and $x_7$ are copied, and the four copies are positioned before the original four outputs and used as a guard symbol. The thus-obtained outputs, twelve outputs in total, are transmitted as one symbol. When a receiver executes correlation computation on each pair of adjacent ones of the twelve outputs, it finds that the four points of the guard symbol and the four outputs positioned after the guard symbol show high correlation values, since the four guard symbol points are copies of the four outputs. From this, a symbol synchronization position can be specified. (See, for example, Jpn. Pat. Appln. KOKAI Publication No. 7-99486)

Further, Jpn. Pat. Appln. KOKAI Publication No. 2003-69546, for example, discloses a technique for transmitting, as a preamble, a known signal for synchronization, and making a receiver detect the known preamble as a symbol synchronization position.

A block signal as an IDFT output signal from a transmitter is used as a transmission symbol. The transmitter continuously transmits the transmission symbol. A receiver accurately detects the leading portion of the transmission symbol by detecting, for example, a preamble contained therein. Thus, the receiver performs symbol synchronization, and then inputs each symbol to a DFT to perform signal reproduction.

When the transmission channel has multipath characteristics, the receiver receives delayed waves as well as direct waves. Accordingly, when synchronization is established at the leading portions of direct waves, inter-symbol interference in which present and preceding symbols are mixed occurs. In the prior art, to eliminate such inter-symbol interference, a transmitter inserts, for example, a guard symbol in each symbol to be transmitted. Assuming, for example, that the output signals of an IDFT with eight input/output points are $x_0, x_1, \ldots, x_7$, the last four outputs $X_4, x_5, x_6$ and $x_7$ are copied, and the four copies are positioned before the original four outputs and used as a guard symbol. The thus-obtained outputs, twelve outputs in total, are transmitted as one symbol. In this case, if a multipath delay is within a time corresponding to four outputs, the time of inter-symbol interference is limited to the period of the guard symbol. Therefore, if $x_0, x_1, \ldots, x_7$ are input to the DFT with eight input/output points, signal reproduction with suppressed inter-symbol interference can be performed. Further, if the multipath delay is longer than the above, the number of guard symbols may be increased (See, for example, Jpn. Pat. Appln. KOKAI Publication No. 2002-374223).

A block signal as an IDFT output signal from a transmitter is used as a transmission symbol. The transmitter continuously transmits the transmission symbol. A receiver accurately detects the leading portion of the transmission symbol by detecting, for example, a preamble contained therein. Thus, the receiver performs symbol synchronization, and then inputs each symbol to a DFT to perform signal reproduction.

In OFDM transmission, the range of amplitude variation is large, therefore non-linear distortion may easily occur. Accordingly, a receiver for performing OFDM transmission needs to have an analog receiving circuit of high linear performance that can receive, without distortion, signals having significantly different amplitudes, or needs to perform control for suppressing the maximum amplitude of a transmitter output (see, for example, Jpn. Pat. Appln. KOKAI Publication No. 2003-46480).

When an OFDM receiver receives a transmission signal, accurate setting of the block position, i.e., symbol synchronization, is indispensable since a DFT employed therein performs block processing. In general, to realize symbol synchronization, a transmitter adds a redundant symbol to a signal to be transmitted.

For example, there is a method in which a guard symbol is inserted, and synchronization is performed using this symbol. Specifically, assuming, for example, that the output signals of an IDFT with eight input/output points are $x_0, x_1, \ldots, x_7$, the last four outputs $x_4, X_5, x_6$ and $x_7$ are copied, and the four copies are positioned before the original four outputs, and used as a guard symbol. The thus-obtained outputs, twelve outputs in total, are transmitted as one symbol. When a receiver executes correlation computation on each pair of adjacent ones of the twelve outputs, it finds that the four points of the guard symbol and the four outputs positioned after the guard symbol show high correlation values, since the four guard symbol points are copies of the four outputs. From this, a symbol synchronization position can be specified. (See, for example, Jpn. Pat. Appln. KOKAI Publication No. 7-99486)

There is another method in which a known signal for synchronization is transmitted as a preamble, and a receiver detects the preamble to detect the symbol synchronization position (see, for example, Jpn. Pat. Appln. KOKAI Publication No. 2003-69546).

In the above-described multi-carrier transmission system, however, symbols for synchronization must be inserted to enable a receiver to perform symbol synchronization, which reduces the transmission efficiency.

Further, the above-described method for increasing the number of guard symbols is disadvantageous in that the transmission efficiency is inevitably reduced.

Concerning the analog receiving circuit of high linear performance, this circuit is expensive, therefore the use of the circuit inevitably increases the cost of the communication system. If the maximum amplitude of the transmitter output is suppressed, the feature of the OFDM transmission system cannot sufficiently be utilized.

BRIEF SUMMARY OF THE INVENTION

The present invention has been developed in light of the above-described techniques, and aims to provide a multi-carrier transmission system that realizes symbol synchronization without inserting synchronization symbols.

It is another object of the present invention to provide a multi-carrier transmission system that can reduce the degree of inter-symbol interference without reducing the transmission efficiency.

According to a first aspect of the invention, there is provided a multi-carrier transmission system comprising:

a transmitter including: an acquisition unit configured to acquire $2^m$ (m: a natural number) modulated signals including a plurality of no-information signals which are failed to be used for information transmission and $2^n$ (n: a natural number; n<m) signals, the acquisition unit subjecting the modulated signals to inverse discrete Fourier transformer to obtain a plurality of transformed signals, a no-information signal included in an $L^{th}$ modulated signal of the modulated signals being used as a first no-information signal of the no-information signals, every $K^{th}$ modulated signal of the modulated signals that is counted from the first no-information signal being used as a no-information signal (K: a natural number; L: an integer; $K=2^{m-n}$; $0 \leq L \leq K-1$) and a transmission unit configured to transmit the transformed signals; and a receiver including: a receiving unit configured to receive the transformed signals; and a detection unit configured to detect synchronization timing based on at least one no-information signal included in the transformed signals.

According to a second aspect of the invention, there is provided a multi-carrier transmission system comprising:

a transmitter including: an acquisition unit configured to acquire $2^m$ (m: a natural number) modulated signals including a plurality of no-information signals which are failed to be used for information transmission, and $2^n$ (n: a natural number; n<m) signals, the acquisition unit subjecting the $2^m$ modulated signals to inverse discrete Fourier transformer to obtain a plurality of transformed signals, a no-information signal included in an $L^{th}$ modulated signal of the modulated signals being used as a first no-information signal of the no-information signals, every $K^{th}$ modulated signal of the modulated signals that is counted from the first no-information signal being used as a no-information signal (K: a natural number; L: an integer; $K=2^{m-n}$; $0 \leq L \leq K-1$); and a transmission unit configured to transmit $2^m$ transformed signals; and a receiver including: a receiving unit configured to receive the $2^m$ transformed signals; a calculation unit configured to calculate, based on the $2^m$ transformed signals received, a constraint given by a relational expression established between the $2^m$ received signals; and a correction unit configured to correct at least one of the transformed signals based on the constraint.

According to a third aspect of the invention, there is provided a multi-carrier transmission system comprising:

a transmitter including: an acquisition unit configured to acquire $2^m$ (m: a natural number) modulated signals including a plurality of no-information signals which are failed to be used for information transmission, and $2^n$ (n: a natural number; n<m) signals, the acquisition unit subjecting the $2^m$ modulated signals to inverse discrete Fourier transformer to obtain a plurality of transformed signals, a no-information signal included in an $L^{th}$ modulated signal of the modulated signals being used as a first no-information signal of the no-information signals, every $K^{th}$ modulated signal of the modulated signals that is counted from the first no-information signal being used as a no-information signal (K: a natural number; L: an integer; $K=2^{m-n}$; $0 \leq L \leq K-1$); and a transmission unit configured to transmit $2^m$ transformed signals; and a receiver including: a receiving unit configured to receive $2^m$ transmitted signals; a detection unit configured to detect $2^m$ received signals which have distorted amplitudes; a correction unit configured to correct at least one of detected signals; a transforming unit configured to transform, if the correction unit fails to correct at least one of the detected signals, both the at least one detected signal corrected by the correction unit and the at least one detected signal which are failed to be corrected; and a setting unit configured to set, to no-information signals, the received signals which correspond to the no-information signals, to subject the no-information signals and a plurality of transformed signals to inverse discrete Fourier transformer, and to input, to the transforming unit, a plurality of inverse-discrete Fourier-transformed signals which correspond to a plurality of amplitude-distorted signals, as corresponding input signals for the transforming unit.

According to a fourth aspect of the invention, there is provided a multi-carrier transmission system comprising:

a transmitter including: an acquisition unit configured to acquire $2^m$ (m: a natural number) modulated signals including a plurality of no-information signals which are failed to be used for information transmission, and $2^n$ (n: a natural number; n<m) signals, the acquisition unit subjecting the $2^m$ modulated signals to inverse discrete. Fourier transformer to obtain a plurality of transformed signals, a no-information signal included in an $L^{th}$ modulated signal of the modulated signals being used as a first no-information signal of the no-information signals, every $K^{th}$ modulated signal of the modulated signals that is counted from the first no-information signal being used as a no-information signal (K: a natural number; L: an integer; $K=2^{m-n}$; $0 \leq L \leq K-1$); and a transmission unit configured to transmit $2^m$ transformed signals of the transformed signals; and a receiver including: a receiving unit configured to receive the transmitted $2^m$ transformed signals; and an estimation unit configured to estimate a value of L based on the received $2^m$ transformed signals.

BRIEF DESCRIPTION OF THE SEVERAL VIEWS OF THE DRAWING

FIG. 1 is a block diagram illustrating a multi-carrier transmission system according to first embodiment of the invention;

FIG. 6A is a block diagram illustrating a multi-carrier transmission system in which a transmission channel from a base station to a terminal differs from that from the terminal to the base station;

FIG. 6B is a block diagram illustrating a multi-carrier transmission system in which a transmission channel from a base station to a terminal is identical to that from the terminal to the base station;

FIG. 14 is a block diagram illustrating a multi-carrier transmission system according to seventh and eighth embodiments of the invention;

FIG. 17 is a view useful in explaining an operation for eliminating distortion of a received signal;

FIG. 20A is a block diagram illustrating a multi-carrier transmission system in which a transmission channel from a base station to a terminal differs from that from the terminal to the base station;

FIG. 20B is a block diagram illustrating a multi-carrier transmission system in which a transmission channel from a base station to a terminal is identical to that from the terminal to the base station;

FIG. 21A is a view of a multi-carrier transmission system, illustrating a case where respective no-information signals are input to the input/output points of the IDFT of FIG. 14 located at both opposite sides;

FIG. 21B is a view illustrating a case where the arrangement of no-information signals differs from that shown in FIG. 21A;

FIG. 22 is a block diagram illustrating a multi-carrier transmission system according to a ninth embodiment of the invention;

FIG. 26A is a view illustrating a case where modulated signals input to the IDFT appearing in FIG. 22 are all 4-PSK signals;

FIG. 26B is a view illustrating a case where two of the modulated signals shown in FIG. 26A are no-information signals, and the other six modulated signals are all 4-PSK signals;

FIG. 26C is a view illustrating a case where two of the modulated signals shown in FIG. 26A are no-information signals, and other two modulated signals are 16-QAM signals;

FIG. 27A is a block diagram illustrating a multi-carrier transmission system in which a transmission channel from a base station to a terminal differs from that from the terminal to the base station;

FIG. 27B is a block diagram illustrating a multi-carrier transmission system in which a transmission channel from a base station to a terminal is identical to that from the terminal to the base station.

DETAILED DESCRIPTION OF THE INVENTION

Figure 2:
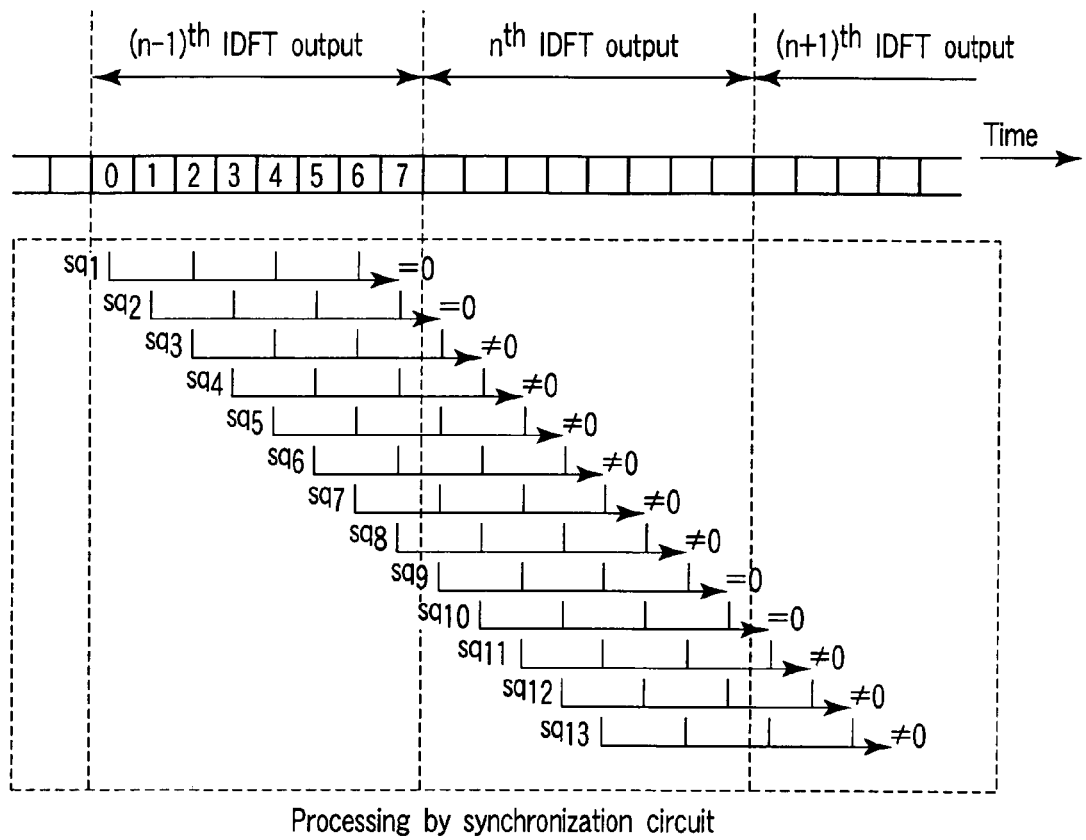
FIG. 2 is a view useful in explaining the process performed by the synchronizing circuit appearing in FIG. 1.

Multi-carrier transmission systems, receivers and transmitters according to embodiments of the invention will be described in detail with reference to the accompanying drawings.

In OFDM as a type of multi-carrier transmission system, a transmitter multiplexes frequency-base signals into time-base signals using an inverse discrete Fourier transformer (IDFT), while a receiver extracts frequency-base signals from received time-base signals using a discrete Fourier transformer (DFT). No further particulars of OFDM will be explained since OFDM is a well-known technique.

First Embodiment

Referring to FIG. 1, the configuration of a multi-carrier transmission system according to a first embodiment will be described. FIG. 1 is a block diagram illustrating a multi-carrier transmission system according to first and second embodiments of the invention.

The multi-carrier transmission system of the embodiments at least comprises a multi-carrier transmitter 10 and multi-carrier receiver 20.

The multi-carrier transmitter 10 at least includes an inverse discrete Fourier transformer (IDFT) 11 and transmission unit 12. The multi-carrier receiver 20 at least includes a receiving unit 21, synchronization circuit 22 and discrete Fourier transformer (DFT) 23. In the embodiment, the IDFT 11 and DFT 23 each have eight inputs and outputs as shown in FIG. 1. However, the number of the inputs (outputs) of each of the IDFT 11 and DFT 23 is not limited to 8, but may be set to an arbitrary value. Concerning this point, a detailed description will be given later using, for example, equations [14].

The IDFT 11 receives eight modulated signals as input signals, subjects them to inverse discrete Fourier transform, and outputs the transformed modulated signals as output signals. If the input signals of the IDFT 11 are defined as $X_0$, $X_1$, ..., $X_7$, the output signals are defined as $x_0$, $x_1$, ..., $x_7$, and $W=\exp(-j2\pi/8)$, $j^2=-1$, the relationships between the input and output signals are given by $$x_k = (1/8)(X_0 + W^{-k}X_1 + W^{-2k}X_2 + \ldots + W^{-7k}X_7) \quad [1]$$

$(k=0, 1, \ldots, 7)$ where, for example, $W^{-2k}=(W)^{-2k}$. The IDFT 11 transforms the modulated signals into those determined by the equation [1].

The transmission unit 12 uses, as one transmission symbol, the eight output signals $x_0$, $x_1$, ..., $x_7$ of the IDFT 11. Thus, the IDFT 11 successively generates transmission symbols, and the transmission unit 12 transmits a sequence of transmission symbols.

In the embodiment, two of the input signals of the IDFT 11, i.e., $X_0$ and $X_4$, are set as follows:

$$X_0=0, X_4=0 \quad [2]$$

If these values of X are substituted into the equation [1], constraints expressed by the following equations [3-1] and [3-2] are established:

$$x_0+x_2+x_4+x_6=0 \quad [3\text{-}1]$$

$$x_1+x_3+x_5+x_7=0 \quad [3\text{-}2]$$

The receiving unit 21 receives, as a signal sequence, a transmission symbol sequence having passed through a transmission channel 30. The synchronization circuit 22 receives the transmission symbol sequence from the receiving unit 21, extracts a series of eight signals from the transmission symbol sequence in the order of reception, and synchronizes the signal transmitted from the multi-carrier transmitter 10, with the signal received by the multi-carrier receiver 20.

Assume that a series of eight signals extracted by the synchronization circuit 22 at a certain point in time are $y_0$, $y_1$, ..., $y_7$. The DFT 23 subjects the signal sequence to inverse discrete Fourier transform, and outputs the resultant modulated signals as output signals. Assuming that the input and output signals of the DFT 23 are $y_0$, $y_1$, ..., $y_7$ and $Y_0$, $Y_1$, ..., $Y_7$, respectively, the input and output signals have the following relationships:

$$Y_k = y_0 + W^{1k}y_1 30\ W^{2k}y_2 + \ldots + W^{7k}y_7 \quad [4]$$

$(k=0, 1, \ldots, 7)$

Assume that an ideal transmission channel that is free from noise, multipath fading, etc. is used. In this case, if the output timing of eight signals from the IDFT 11 of the multi-carrier transmitter 10 is identical to the input timing of eight signals to the DFT 23 of the multi-carrier receiver 20, i.e., if symbol synchronization is established, the following relationships are established in the time-base input signal of the DFT 23:

$$y_0+y_2+y_4+y_6=0 \quad [5\text{-}1]$$

$$y_1+Y_3+y_5+y_7=0 \quad [5\text{-}2]$$

Further, the following relationships are established in the output frequency-base signal of the DFT 23:

$$Y_0=0, Y_4=0 \quad [6]$$

Since the input and output of the DFT 23 has a 1:1 relationship, if the equation concerning the input (or output) is established, the equation concerning the output (or input) is also established. On the other hand, if no symbol synchronization is established, none of the equations [5-1], [5-2] and [6] are established.

Referring now to FIG. 2, the synchronization operation of the synchronization circuit 22 will be described. FIG. 2 is a view useful in explaining the process performed by the synchronization circuit 22.

The synchronization circuit 22 extracts a sequence of received time-base signals in units of eight signals, while shifting the extraction position by one signal at a time. Specifically, as shown in FIG. 2, the circuit 22 firstly extracts a signal sequence sq1 of $x_0, x_1, \ldots, x_7$ as the $(n-1)^{th}$ output signal sequence of the IDFT 11. Subsequently, the circuit 22 shifts the to-be-extracted signal sequence by one signal, and extracts $x_1, \ldots, x_7$ included in the $(n-1)^{th}$ output signal sequence of the IDFT 11, and $x_0$ included in the $n^{th}$ output signal sequence of the IDFT 11. In this way, the circuit 22 successively extracts signal sequences. It extracts, for example, a signal sequence sq6 that is formed of $x_5, x_6$ and $x_7$ included in the $(n-1)^{th}$ output signal sequence of the IDFT 11, and $x_0, x_1, x_2, x_3$ and $x_4$ included in the $n^{th}$ output signal sequence of the IDFT 11.

After that, the synchronization circuit 22 determines, for each signal sequence formed of extracted eight signals, whether the equations [5-1] and [5-2] are established. Concerning, for example, the signal sequences shown in FIG. 2, the equations [5-1] and [5-2] are established between the signal sequence sq1, $x_0, x_1, \ldots, x_7$, as the $(n-1)^{th}$ output signal sequence of the IDFT 11, and the corresponding received signal sequence, $y_0, y_1, \ldots, y_7$. Similarly, the equations [5-1] and [5-2] are established between a signal sequence sq2, signal sequence sp9 and signal sequence sp10 and the respective corresponding received signal sequences.

Thus, by virtue of the synchronization circuit 22 for determining a sequence of eight time-base signals that satisfy the above-mentioned equations, correct timing in synchrony with the output of a transmission signal from the multi-carrier transmitter 10 can be acquired.

In an actual transmission channel, however, the equations [5-1] and [5-2] are not established because of noise, multipath fading, etc. In light of this, signals are extracted which require power smaller than a certain value of $v_2$, as shown in the following inequalities [7-1] and [7-2]:

$$(y_0+y_2+y_4+y_6)^2 < v_2 \quad [7\text{-}1]$$

$$(y_1+y_3+y_5+y_7)^2 < v_2 \quad [7\text{-}2]$$

Alternatively, $y_0, y_1, \ldots, y_7$ that minimize the value of $(y_0+y_2+y_4+y_6)$ and the value of $(y_1+y_3+y_5+y_7)$ may be detected, thereby determining synchronizing timing based on the detected signals.

Figure 3A:
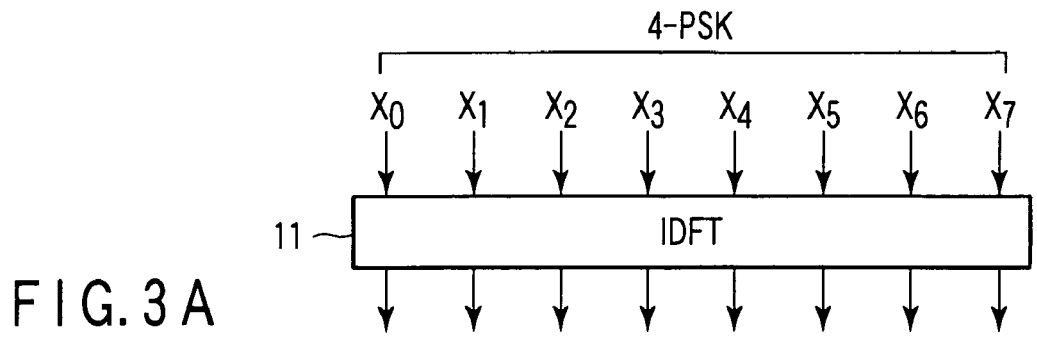
FIG. 3A is a view illustrating a case where modulated signals input to the IDFT appearing in FIG. 1 are all 4-PSK signals.
Figure 3B:
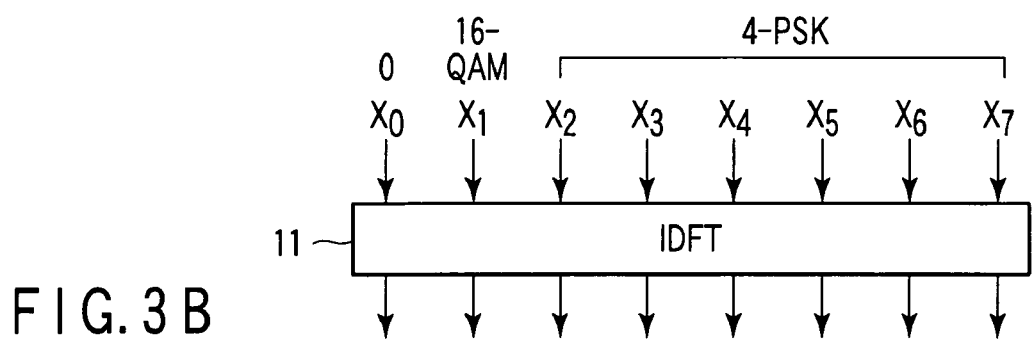
FIG. 3B is a view illustrating a case where one of the modulated signals shown in of FIG. 3A is a no-information signal.
Figure 3C:
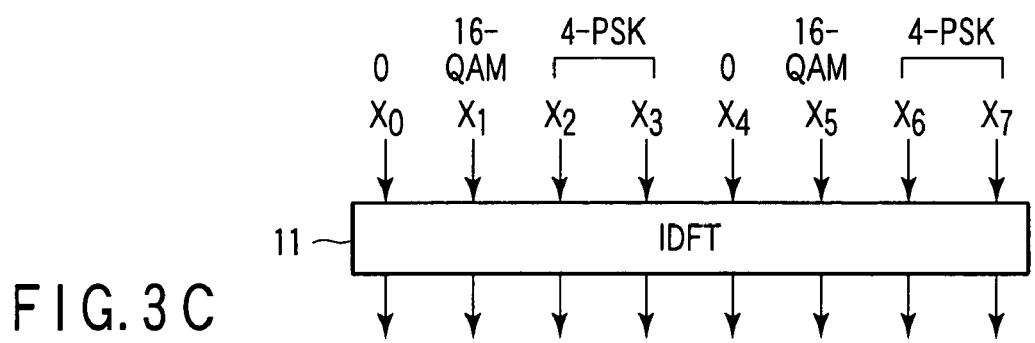
FIG. 3C is a view illustrating a case where two of the modulated signals shown in FIG. 3A are no-information signals.
Figure 3D:
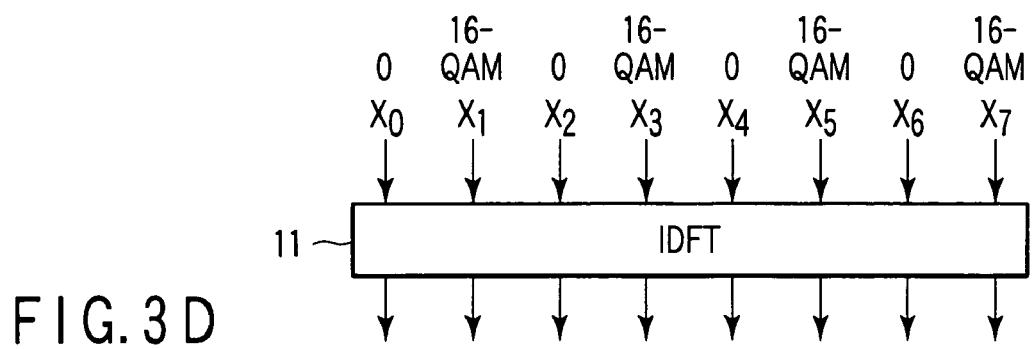
FIG. 3D is a view illustrating a case where four of the modulated signals shown in FIG. 3A are no-information signals.

Although the above case utilizes the constraints on the output signals of the DFT 23 required when two of the input signals of the IDFT 11 are set to a level of 0, the embodiment is not limited to this. It is not essential to set two of the input signals of the IDFT 11 to a level of 0. There can be other cases. Some specific cases will be described referring to FIGS. 3A, 3B, 3C and 3D. In the case of FIG. 3A, all modulated signals input to the IDFT 11 of FIG. 1 are 4-PSK (4-Phase-Shift Keying) signals. The case of FIG. 3B is obtained by changing one of the modulated signals shown in FIG. 3A from the 4-PSK signal to a no-information signal. Similarly, the case of FIG. 3C is obtained by changing two of the modulated signals shown in FIG. 3A to no-information signals. The case of FIG. 3D is obtained by changing four of the modulated signals shown in FIG. 3A to no-information signals. FIG. 3A corresponds to a prior art technique and illustrates a case where all input signals $X_0, X_1, \ldots, X_7$ contain information, i.e., none of the signals are no-information signals. FIGS. 3B, 3C and 3D correspond to the present embodiment.

(Case 1) Where only one of the input signals of the IDFT 11 is set to a level of 0 (corresponding to FIG. 3B), i.e., where $$X_0 = 0 \quad [8]$$

In this case, the constraint on the output signals of the IDFT 11 is given by $$x_0+x_1+x_2+x_3+x_4+x_5+x_6+x_7=0 \quad [9]$$

The following inequality, in which $v_1$ represents a certain power level, is used by the synchronization circuit 22 to detect a synchronization position:

$$(y_0+y_1+y_2+y_3+y_4+y_5+y_6+y_7)^2 < v_1 \quad [10]$$

(Case 2) Where two of the input signals of the IDFT 11 is set to a level of 0 (corresponding to FIG. 3C). This case corresponds to the aforementioned case explained with reference to FIG. 1. Under the constraint expressed by the equation [2], the equations [3-1] and [3-2] are established. In this case, the synchronization circuit 22 detects a synchronization position using the inequalities [7-1] and [7-2].

(Case 3) Where four of the input signals of the IDFT 11 is set to a level of 0 (corresponding to FIG. 3D), i.e., where $$X_0=0, X_2=0, X_4=0, X_6=0 \quad [11]$$

In this case, the following constraints are required for the output signals of the IDFT 11:

$$x_0+x_4=0 \quad [12\text{-}1]$$

$$x_1+x_5=0 \quad [12\text{-}2]$$

$$x_2+x_6=0 \quad [12\text{-}3]$$

$$x_3+x_7=0 \quad [12\text{-}4]$$

In this case, the synchronization circuit 22 detects a synchronization position using the following inequalities in which $v_4$ represents a certain power level:

$$(y_0+y_4)^2 < v_4 \quad [13\text{-}1]$$

$$(y_1+y_5)^2 < v_4 \quad [13\text{-}2]$$

$$(y_2+y_6)^2 < v_4 \quad [13\text{-}3]$$

$$(y_3+y_7)^2 < v_4 \quad [13\text{-}4]$$

Any one of the above equations enables symbol synchronization to be established between the multi-carrier transmitter 10 and multi-carrier receiver 20. As is understood from the above, the larger the number of 0-level signals, the more constraints can be acquired.

In a multipath transmission channel, there may exist a symbol that arrives later than another symbol. If such a delay symbol exists, there may be a case where, for example, $x_0$ included in the $n^{th}$ output signal sequence of the IDFT 11 coexists with $x_7$ included in the $(n-1)^{th}$ output signal sequence of the IDFT 11, resulting in inter-symbol interference. Depending upon the conditions for the transmission channel, even $x_1$ in the $n^{th}$ output signal sequence may interfere with $x_7$ included in the $(n-1)^{th}$ output signal sequence. Thus, a conditional expression for synchronization (relation expression established between output signals of the IDFT 11) that includes $x_0$, or $x_0$ and $x_1$ is easily influenced by inter-symbol interference, which makes it difficult to perform accurate synchronization. In particular, in the above case 1, there is only one conditional expression (i.e., only the equation [9]), which includes $x_0$, or $x_0$ and $x_1$. Therefore, it is difficult to eliminate the influence of the above-mentioned inter-symbol interference.

On the other hand, the case 2 has, as a conditional expression for synchronization, the equation [3-2] that does not include $x_0$. Therefore, symbol synchronization can be established using the inequality [7-2] acquired from the equation [3-2]. Further, the case 3 has, as conditional expressions for synchronization, the equations [12-2] to [12-4] that do not include $x_0$. Accordingly, symbol synchronization can be established using the inequalities [13-2] to [13-4] acquired from the equations [12-2] to [12-4]. Moreover, the case 3 has, as conditional expressions for synchronization, the equations [12-3] and [12-4] that do not include $x_0$ or $x_1$. Accordingly, symbol synchronization can be established using the inequalities [13-3] and [13-4] even when $x_1$ is also involved in inter-symbol interference.

Figure 4A:
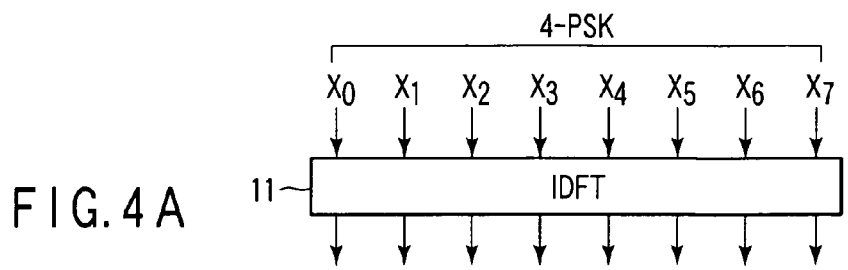
FIG. 4A is a view illustrating a case where modulated signals input to the IDFT appearing in FIG. 1 are all 4-PSK signals.
Figure 4B:
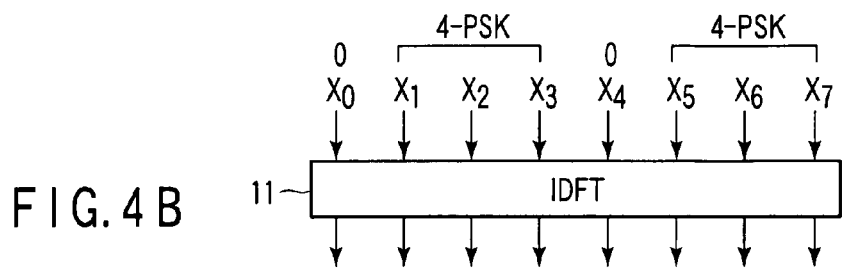
FIG. 4B is a view illustrating a case where two of the modulated signals shown in FIG. 4A are no-information signals, and the other six modulated signals are all 4-PSK signals.
Figure 4C:
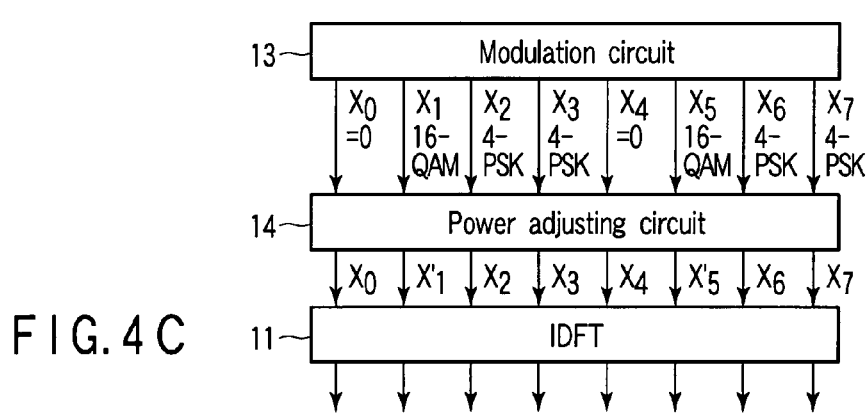
FIG. 4C is a view illustrating a case where two of the modulated signals shown in FIG. 4A are no-information signals, and other two modulated signals are 16-QAM signals.

Transmission efficiency will now be described with reference to FIGS. 4A, 4B and 4C. FIG. 4A is a view illustrating a case where modulated signals input to the IDFT 11 are all 4-PSK signals. FIG. 4B is a view illustrating a case where two of the modulated signals shown in FIG. 4A are no-information signals, and the other six modulated signals are all 4-PSK signals. FIG. 4C is a view illustrating a case where two of the modulated signals shown in FIG. 4A are no-information signals, and other two modulated signals are 16-QAM (Quadrature Amplitude Modulation) signals.

The transmission efficiency is lower by the transmission bits of input signals $X_0$ and $X_4$ in the case shown in FIG. 4B where the two input signals $X_0$ and $X_4$ included in the IDFT input signals $X_0, X_1, \ldots, X_7$ are signals with no information, than in the case shown in FIG. 4A where none of the IDFT input signals $X_0, X_1, \ldots, X_7$ contain information.

In light of this, in the embodiment, if one input signal is made as a no-information signal, the modulation circuit 13 modulates, into a signal with a larger number of transmission bits, one of the IDFT input signals other than the no-information signal, as is shown in FIG. 4C. The modulation circuit 13 is a circuit for modulating an input signal into a modulated signal corresponding to a predetermined modulation scheme.

For instance, the modulation circuit 13 modulates a 4-PSK signal into a 16-QAM signal or 64-QAM signal, etc., which has a larger number of transmission bits than the former.

FIG. 4C shows an example, where the number of transmission bits is identical to that in the example of FIG. 4A where all input signals $X_0, X_1, \ldots, X_7$ are 4-PSK signals. Since the number of transmission bits of a 16-QAM signal is double the number of transmission bits of a 4-PSK signal, two 4-PSK input signals $X_1, X_5$ are replaced with respective 16-QAM signals in the example of FIG. 4C where two input signals $X_0$, $X_4$ are no-information signals.

The case where only one of the input signals $X_0, X_1, \ldots, X_7$ is a no-information signal is shown in FIG. 3B. Similarly, the case where four of the input signals $X_0, X_1, \ldots, X_7$ are no-information signals is shown in FIG. 3D. These cases are applications of the case shown in FIG. 4C.

As above-mentioned, the embodiment is not limited to the use of the 16-QAM scheme as in the examples of FIG. 4C and FIG. 3B and 3D. For example, to make the number of transmission bits identical to that in the example of FIG. 4A, two 4-PSK signals included in $X_0, X_1, \ldots, X_7$ may be replaced with respective 8-PSK signals. Alternatively, one 4-PSK signal included in $X_0, X_1, \ldots, X_7$ may be replaced with a 64-QAM signal.

Further, if no-information signals are included in $X_0$, $X_1, \ldots, X_7$, and if the power is reduced by the number of the no-information signals, the resistance to errors is reduced. To prevent a reduction in resistance to errors, the embodiment employs a power-adjusting unit 14 for increasing the power of the modulated signals $X_1'$ and $X_5'$ of the 16-QAM scheme in order to make the total power of $X_0, X_1', \ldots, X_5', \ldots, X_7$ shown in FIG. 4C identical to that of $X_0, X_1, \ldots, X_7$ shown in FIG. 4A. If the former total power can be made identical to the latter, the resistance to errors can be made identical.

As described above, some of the IDFT input signals can be set to no-information signals without degrading the resistance to errors and without reducing the number of transmission bits per one symbol. In other words, the modulation scheme and power can be set on condition that the input signals of the IDFT 11 have the same number of bits and the same power.

However, if a reduction in the number of transmission bits by setting a certain 4-PSK input signal of the IDFT 11 to a level of 0 is allowed, it is not necessary to change the modulation scheme for another input signal to another multi-value modulation scheme. It is sufficient if the modulation scheme is kept at the 4-PSK scheme. Further, if a reduction in error ratio due to a change in modulation scheme for a certain input signal is allowed, no power adjustment is needed.

Figure 5A:
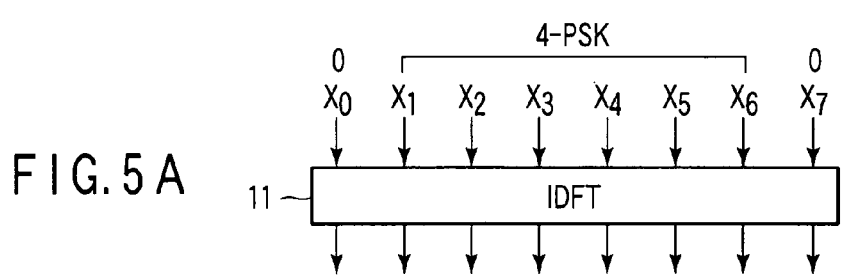
FIG. 5A is a view illustrating a case where those two of the modulated signals input to the IDFT appearing in FIG. 1, which are positioned at both ends, are no-information signals.
Figure 5B:
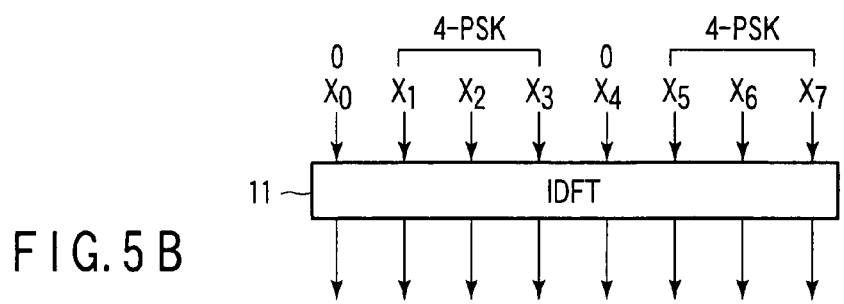
FIG. 5B is a view illustrating a case where the positional relationship of the no-information signals shown in FIG. 5A is changed.

Even in the standard OFDM transmission system, the input signals of the IDFT 11 may include a no-information signal. Referring then to FIGS. 5A and 5B, a description will be given of a case where the multi-carrier transmission system of the embodiment is applied to the OFDM transmission system. FIG. 5A is a view illustrating a case where those two of the modulated signals input to the IDFT 11, which are positioned at both ends, are no-information signals. FIG. 5B is a view illustrating a case where the positional relationship of the no-information signals shown in FIG. 5A is changed.

In the standard OFDM transmission system, when an IDFT having 2048 input/output points is utilized, there is a case where no signals are input to several hundreds of input/output points positioned at each end of the IDFT, i.e., no-information signals are input to those input/output points. FIG. 5A illustrates a typical case where the input signals $X_0$ and $X_7$ at both ends are no-information signals. If the present embodiment is applied to the input signal arrangement as shown in FIG. 5A, it is necessary to change the positional relationship of the no-information signals, as shown in FIG. 5B, so that the constraint on symbol synchronization (in this case, the constraint expressed by the equation [2]) can be satisfied. Since this change process is performed only by shifting the positions of no-information signals, the ratio of transmission bits to a symbol is unchanged, therefore the transmission efficiency is not reduced.

The number of no-information signals inserted can be varied in accordance with the state of the transmission channel. This will be described with reference to FIGS. 6A and 6B. FIG. 6A is a block diagram illustrating a multi-carrier transmission system in which a transmission channel from a base station 50 to a terminal 40 differs from that from the terminal 40 to the base station 50. FIG. 6B is a block diagram illustrating a multi-carrier transmission system in which a transmission channel from a base station 70 to a terminal 60 is identical to that from the terminal 60 to the base station 70.

The terminal 40 or the base station 70 detects the state of the transmission channel, and controls the modulation circuit contained in an OFDM transmitter 52 or 73. For example, if the multipath delay time is long, the base station controls the modulation circuit contained in the OFDM transmitter 52 or 73 to increase the number of no-information signals to be inserted. On the other hand, if the multipath delay time is short, the base station controls the modulation circuit to reduce the number of no-information signals to be inserted. The base station detects the state of the transmission channel in the manner stated below.

FIG. 6A illustrates frequency division duplex (FDD) communication in which up-link and down-link transmission channels are used between the base station 50 and terminal 40. In this case, when OFDM transmission is performed from the base station 50 to the terminal 40 using the down-link transmission channel, the base station 50 instructs the terminal 40 to inform the base station of the transmission condition for the down-link transmission channel via the up-link transmission channel. Based on the transmission condition for the down-link transmission channel supplied from the terminal 40, the base station 50 executes OFDM transmission.

More specifically, for instance, in the terminal 40, a down-link transmission channel estimation unit 42 estimates the state of the down-link transmission channel based on a signal received by the OFDM receiver 41. Subsequently, a transmitter 43 transmits, to the base station 50, information concerning the state of the down-link transmission channel estimated by the estimation unit 42. In the base station 50, a receiver 51 receives the information concerning the state of the down-link transmission channel, and outputs the information to the OFDM transmitter 52. The OFDM transmitter 52 transmits a signal to the terminal 40, based on the input information concerning the state of the down-link transmission channel.

On the other hand, FIG. 6B illustrates time division duplex (TDD) communication in which only a single transmission channel is used as both an up-link transmission channel and down-link transmission channel between the base station 70 and terminal 60. In this case, when OFDM transmission is performed from the base station 70 to the terminal 60, the base station 70 detects a transmission condition for the down-link transmission channel, from the characteristics of a signal received. Based on the detected transmission condition for the down-link transmission channel, the base station 70 executes OFDM transmission.

More specifically, for instance, in the base station 70, a down-link transmission-channel estimation unit 72 estimates the state of the down-link transmission channel from a signal received by a receiver 71. Based on the estimated state, the OFDM transmitter 73 transmits a signal to the terminal 60.

Although the above-described embodiment employs an IDFT and DFT having eight input/output points, it is a matter of course that the number of the input/output points is not limited to eight, but may be set to an arbitrary value. Specifically, in a transmitter, assuming that $X_{pk}$ (p=0, 1, . . . , N−1, M=KN, N=$2^n$) included in the input signals $X_0, X_1, \ldots, X_{M-1}$ of an IDFT with M input/output points (M=$2^m$) is set to a level of 0, the output signals $x_0, x_1, \ldots, x_{M-1}$ satisfy the following equations:

$$x_p + x_{p+N} + \ldots + X_{p+(K-1)N} = 0 \qquad [14]$$

(p=0, 1, . . . , N−1)

Accordingly, symbol synchronization can be realized by detecting received signals $y_0, y_1, \ldots, y_{M-1}$ that have passed through the transmission channel and satisfy the following inequalities:

$$(y_p + Y_{p+N} + \ldots + Y_{p+(K-1)N})^2 < v \qquad [15]$$

(k=0, 1, . . . , N−1)

where v represents a small power value.

For example, when M=2048, N=256 and K=8, $X_0, X_8, X_{16}, \ldots, X_{2032}, X_{2030}$ included in the input signals $X_0, X_1, X_2, \ldots, X_{2046}$ and $X_{2047}$ of an IDFT having 2048 input/output points are set to a level of 0. In this case, the following 256 equations are acquired as constraints on the output signals $x_0, x_1, x_2, \ldots, x_{2046}$ and $x_{2047}$ of the IDFT having 2048 output points:

$$x_0 + x_{256} + x_{512} + \ldots + x_{1536} + x_{1792} = 0 \qquad [16\text{-}1]$$

$$x_1 + x_{257} + x_{513} + \ldots + x_{1537} + x_{1793} = 0 \qquad [16\text{-}2]$$

$$x_2 + x_{258} + x_{514} + \ldots + x_{1538} + x_{1794} = 0 \qquad [16\text{-}3]$$

$$x_{254} + x_{510} + x_{766} + \ldots + x_{1790} + x_{2046} = 0 \qquad [16\text{-}255]$$

$$x_{255} + x_{511} + x_{767} + \ldots + x_{1791} + x_{2047} = 0 \qquad [16\text{-}256]$$

Accordingly, the synchronization circuit detects symbol synchronization positions by performing the following calculations on received signals $y_0, y_1, y_2, \ldots, Y_{2046}$ and $Y_{2047}$:

$$(y_0 + y_{256} + y_{512} + \ldots + y_{1536} + y_{1792})^2 < v \qquad [17\text{-}1]$$

$$(y_1 + y_{257} + y_{513} + \ldots + y_{1537} + y_{1793})^2 < v \qquad [17\text{-}2]$$

$$(y_2 + y_{258} + y_{514} + \ldots + y_{1538} + y_{1794})^2 < v \qquad [17\text{-}3]$$

$$(y_{254} + y_{510} + y_{766} + \ldots + y_{1790} + y_{2046})^2 < v \qquad [17\text{-}255]$$

$$(y_{255} + Y_{511} + y_{767} + \ldots + y_{1791} + y_{2047})^2 < v \qquad [17\text{-}256]$$

A method using a voltage instead of the power value v may be possible.

Further, for a DFT and IDFT having a large number of input/output points, algorithms based on fast Fourier transformer (FFT) and inverse fast Fourier transformer (IFFT) are utilized.

Second Embodiment

In the first embodiment, in the transmitter, every $k^{th}$ $X_{pk}$ (p=0, 1, . . . , N−1; M=KN; N=$2^n$), which is included in the input signals $X_0, X_1, \ldots, X_{M-1}$ of the IDFT with M input/output points (M=$2^m$) and begins from $X_0$, is set to a level of 0. In the second embodiment, the contents of the first embodiment are generalized, and every $k^{th}$ $X_{i+pk}$, beginning not from $X_0$ but from $X_i$ (i=0, 1, . . . , K−1), is set to a level of 0.

Assuming that the input signals of the IDFT are $X_0, X_1, \ldots, X_{M-1}$, the output signals of the IDFT are $x_0, x_1, \ldots, x_{M-1}$, $W_M = \exp(-j2\pi/M)$, and $j^2 = -1$, the relationships between the input and output signals are given by $$x_k = (1/M)(X_0 + W_M^{-k}X_1 + W_M^{-2k}X_2 + \ldots + W_M^{-(M-1)k}X_{M-1}) \qquad [18]$$

(k represents an integer, and 0≦k≦M−1)

Further, $u_p$ are defined for the output signals $x_0, x_1, \ldots, x_{M-1}$ of the IDFT, using the following equations:

$$u_p = W_M^{pi}x_p + W_M^{(p+N)i}x_{p+N} + W_M^{(p+2N)i}x_{p+2N} + \ldots + W_M^{(p+(K-1)N)i}x_{p+(K-1)N} \qquad [19]$$

(p represents an integer, and 0≦p≦N−1)

If $u_0, u_1, \ldots, u_{N-1}$ are input to a DFT with N input/output points, the output signal $U_k$ (k represents an integer, and 0≦k≦M−1) of the DFT are given by $$U_k = u_0 + W_N^k u_1 + W_N^{2k} u_2 + \ldots + W_N^{(N-1)k} u_{N-1} \qquad [20]$$

where $W_N = \exp(-j2\pi/N) = W_M^K$. Using the equations [19], the equations [20] can be modified in the following manner:

$$U_k = x_0 + W_M^{(i+kK)}x_1 + W_M^{2(i+kK)}x_2 + \ldots + W_M^{(M-1)(i+kK)}x_{M-1} \qquad [21]$$

On the other hand, if $x_0, x_1, \ldots, x_{M-1}$ are input to a DFT with M input/output points, the output signal $X_k$ (k represents an integer, and 0≦k≦M−1) of the DFT are given by $$X_k = x_0 + W_M^k x_1 + W_M^{2k} x_2 + \ldots + W_M^{(M-1)k} x_{M-1} \qquad [22]$$

From the equations [21] and [22], the followings are acquired:

$$X_{i+pK} = U_p \qquad [23]$$

(p=0, 1, . . . , N−1; i=0, 1, . . . , K−1)

In the equations [23], if $X_{i+pk} = U_p = 0$, the output signal $u_p$ of an IDFT with N input/output points assumed when $U_0, U_1, \ldots, U_{N-1}$ are input thereto are naturally $u_p = 0$ (p=0, 1, . . . , N−1). Accordingly, from the equation [19], the followings are acquired:

$$W_M^{pi} x_p + W_M^{(p+N)i} x_{p+N} + \quad [24]$$
$$W_M^{(p+2N)i} x_{p+2N} + \ldots + W_M^{(p+(K-1)N)i} x_{p+(K-1)N} = 0$$
$$(p = 0, 1, \ldots, N-1; i = 0, 1, \ldots, K-1)$$

This equations [24] are used as constraints on the output signals of the IDFT with the M input/output points when $X_{i+pk}$ (i=0, 1, ..., K−1, p=0, 1, ..., N−1, M=KN, N=$2^n$) are set to a level of 0.

If, for example, i=0, the followings are acquired:

$$x_p + x_{p+N} + x_{p+2N} + \ldots + x_{p+(K-1)N} = 0 \quad [25]$$

(p=0, 1, ..., N−1)

These are constraints identical to those in the first embodiment. If, for example, M=8 and N=4, K is 2, and accordingly the equations [25] become:

$$x_p + x_{p+4} = 0 \, (p=0, 1, 2, 3) \quad [26]$$

Thus, the equations [26] are equivalent to the equations [12-1] to [12-4] derived in the first embodiment.

In general, symbol synchronization is performed by presetting, for M received signals $y_0, y_1, \ldots, y_{M-1}$, a small power value v that can be detected by the synchronization circuit, and detecting received signals that satisfy the following inequalities [27]:

$$W_M^{pi} y_p + W_M^{(p+N)i} y_{p+N} + \quad [27]$$
$$W_M^{(p+2N)i} y_{p+2N} + \ldots + W_M^{(p+(K-1)N)i} y_{p+(K-1)N} < v$$
$$(p = 0, 1, \ldots, N-1; i = 0, 1, \ldots, K-1)$$

Figure 7A:
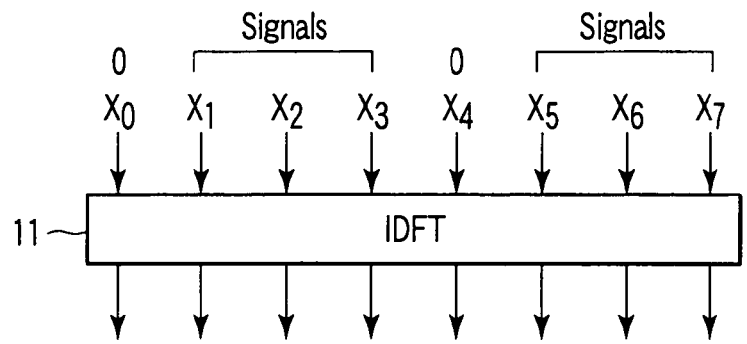
FIG. 7A is a view of a multi-carrier transmission system according to the second embodiment, illustrating a case where two no-information signals are input.
Figure 7B:
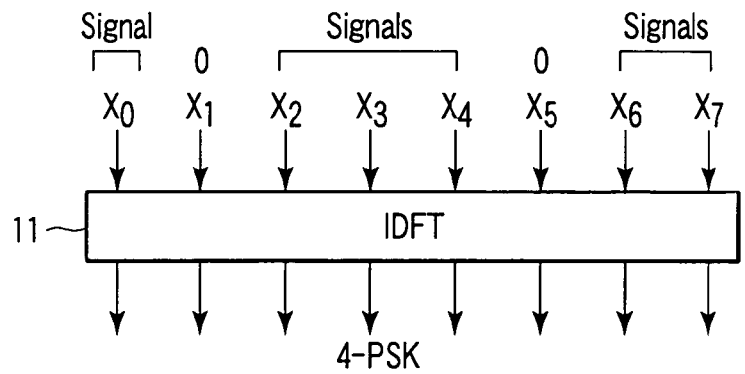
FIG. 7B is a view illustrating a case where the position of each no-information signal is shifted by one signal from the position shown in FIG. 7A.
Figure 7C:
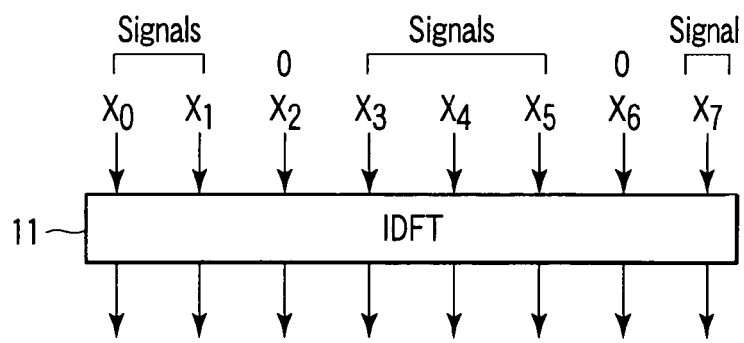
FIG. 7C is a view illustrating a case where the position of each no-information signal is shifted by two signals from the position shown in FIG. 7A.
Figure 7D:
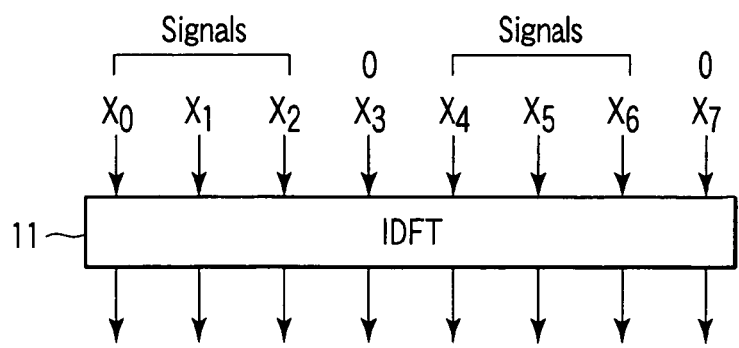
FIG. 7D is a view illustrating a case where the position of each no-information signal is shifted by three signals from the position shown in FIG. 7A.

Referring to FIGS. 7A, 7B, 7C and 7D, a specific example will be described. FIG. 7A is a view of a multi-carrier transmission system according to the second embodiment, illustrating a case where two no-information signals are input. FIG. 7B illustrates a case where the position of each no-information signal is shifted by one signal from the position shown in FIG. 7A. FIG. 7C illustrates a case where the position of each no-information signal is shifted by two signals from the position shown in FIG. 7A. FIG. 7D illustrates a case where the position of each no-information signal is shifted by three signals from the position shown in FIG. 7A.

FIGS. 7A, 7B, 7C and 7D show the cases where M=8, N=2 and K=4, which correspond to i=0, 1, 2 and 3, respectively. FIG. 7A corresponds to i=0, and the conditional expressions for synchronization are the equations [25], as described above. If 8, 2 and 4 are substituted for M, N and K, respectively, in the equations [25], the followings are acquired:

$$x_p + x_{p+2} + x_{p+4} + x_{p+6} = 0 \, (p=0, 1) \quad [28]$$

The equations [28] are equivalent to the equations [5-1] and [5-2] derived in the first embodiment.

The case where i=1 corresponds to FIG. 7B. From the equations [24], the constraints on synchronization are:

$$W_M^p x_p + W_M^{(p+N)} x_{p+N} + \quad [29]$$
$$W_M^{(p+2N)} x_{p+2N} + \ldots + W_M^{(p+(K-1)N)} x_{p+(K-1)N} = 0$$

If 8, 2 and 4 are substituted for M, N and K, respectively, in the equations [29], the followings are acquired:

$$W_M^p x_p + W_M^{(p+2)} x_{p+2} + W_M^{(p+4)} x_{p+4} + W_M^{(p+6)} x_{p+6} = 0 \quad [30]$$
$$(p = 0, 1)$$

These equations are a conditional expression required for synchronization when i=1, M=8, N=2 and K=4.

The case where i=2 corresponds to FIG. 7C. From the equations [24], the conditional expressions for synchronization are:

$$W_M^{2p} x_p + W_M^{2(p+N)} x_{p+N} + \quad [31]$$
$$W_M^{2(p+2N)} x_{p+2N} + \ldots + W_M^{2(p+(K-1)N)} x_{p+(K-1)N} = 0$$

If 8, 2 and 4 are substituted for M, N and K, respectively, in the equations [31], the followings are acquired:

$$W_M^{2p} x_p + W_M^{2(p+2)} x_{p+2} + W_M^{2(p+4)} x_{p+4} + W_M^{2(p+6)} x_{p+6} = 0 \quad [32]$$
$$(p = 0, 1)$$

These equations are conditional expressions required for synchronization when i=2, M=8, N=2 and K=4.

The case where i=3 corresponds to FIG. 7C. From the equations [24], the conditional expressions for synchronization are:

$$W_M^{3p} x_p + W_M^{3(p+N)} x_{p+N} + W_M^{3(p+2N)} x_{p+2N} + \ldots + \quad [33]$$
$$W_M^{3(p+(K-1)N)} x_{p+(K-1)N} = 0$$

If 8, 2 and 4 are substituted for M, N and K, respectively, in the equations [33], the followings are acquired:

$$W_M^{3p} x_p + W_M^{3(p+2)} x_{p+2} + W_M^{3(p+4)} x_{p+4} + W_M^{3(p+6)} x_{p+6} = 0 \quad [34]$$
$$(p = 0, 1)$$

These equations are conditional expressions required for synchronization when i=3, M=8, N=2 and K=4.

As described above, in the second embodiment, the position of a no-information signal can be changed in a desired manner.

Third Embodiment

A third embodiment of the invention is acquired by combining the first embodiment with a synchronization detection method using a guard symbol. In the synchronization detection method using a guard symbol, the signals output from some latter output points of an IDFT are copied, and the copies are positioned before the signal output from the first output point, and are used as guard symbol points. Symbol synchronization is established using the correlation between the guard symbol points and original signals.

Figure 8:
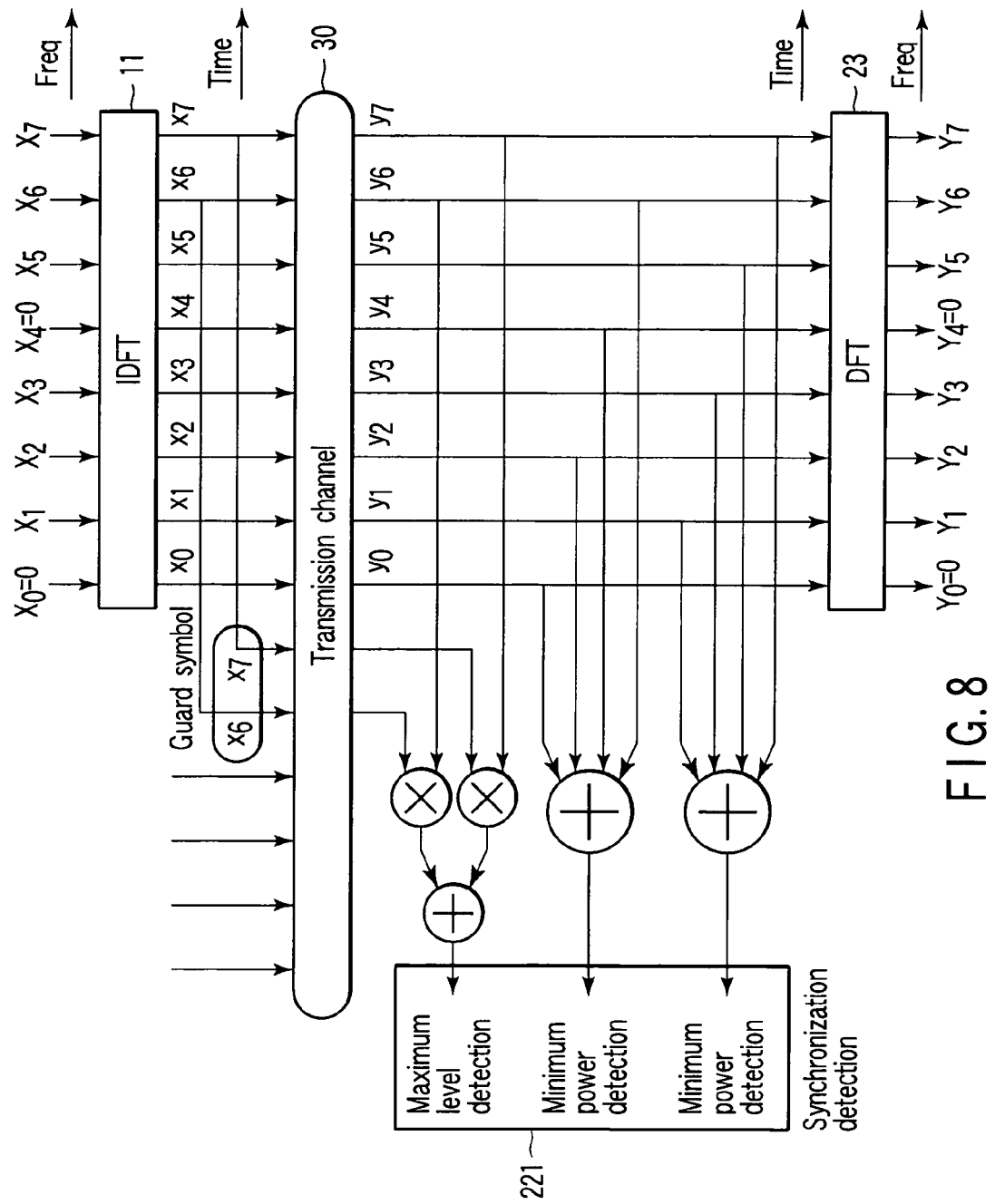
FIG. 8 is a block diagram illustrating a multi-carrier transmission system according to a third embodiment of the invention.

In the third embodiment, a detailed description will be given of a case, similar to the case of the first embodiment, where a transmitter has an IDFT 11 with eight input/output points, and a receiver has a DFT 23 with eight input/output points, referring to FIG. 8. FIG. 8 is a block diagram illustrating a multi-carrier transmission system according to the third embodiment of the invention. In the transmitter, the input signals are defined as $X_0, X_1, \ldots, X_7$, and the output signals as $x_0, x_1, \ldots, x_7$. As in the first embodiment, input signals $X_0$ and $X_4$ are set to a level of 0. In this case, the output signals of the IDFT 11 satisfy the equations [3-1] and [3-2]. That is, the following equations are satisfied:

$$x_0+x_2+x_4+x_6=0$$

$$x_1+x_3+x_5+x_7=0$$

In the third embodiment, to set a guard symbol, $x_6$ and $x_7$ are copied and positioned before $X_0$, as shown in FIG. 8. More specifically, the last two of $x_0, x_1, \ldots, x_7$, i.e., $x_6$ and $x_7$, are positioned before $x_0$ and used as a guard symbol. As a result, the combination of $x_6, x_7, x_0, x_1, x_2, x_3, x_4, x_5, x_6$ and $x_7$ is used as a single transmission symbol. Thus, transmission symbols are sequentially generated and a resultant transmission symbol sequence is transmitted via the transmission channel 30.

The receiver receives the transmission symbol sequence as an adjacent signal sequence, and extracts therefrom eight sequential signals at certain timing, and regards them as received signals $y_0, y_1, \ldots, y_7$. If this extraction is performed at correct timing where there is no noise or multipath fading, the followings are established:

$$y_0+y_2+y_4+y_6=0$$

$$y_1+y_3+y_5+y_7=0$$

While the position of extraction of eight signals is shifted, the timing at which the signals that satisfy the above equations are extracted is detected as synchronization timing. However, in actual transmission, in which noises, for example, are mixed, a synchronization circuit 221 detects, as synchronization timing, the detection timing of the signals that satisfy the above equations, the total power of which is minimum. Alternatively, synchronization timing may be extracted by extracting signals, the total power of which is lower than a certain power value as in the inequalities [7-1] and [7-2].

On the other hand, since the transmission symbol is the combination of $x_6, x_7, x_0, x_1, x_2, x_3, x_4, x_5, x_6$ and $x_7$, the received symbol has $y_6$ and $y_7$ placed before the combination of $y_1, y_1, \ldots, y_7$. Accordingly, when eight signals are extracted at correct timing, the last two signals of the eight signals are identical to the two signals placed before the eight signals. In other words, the same combinations of signals $Y_6$ and $y_7$ exist with six signals $y_0, y_1, y_2, y_3, y_4$ and $y_5$ interposed therebetween.

Using this regularity, the synchronization circuit 221 extracts the combination of two signals while shifting the position of extraction, thereby detecting, as synchronization timing, the timing at which the correlation of such combinations of two signals is maximum, i.e., the timing at which the addition result of multiplied values is maximum.

In actual degraded transmission in which noise and multipath fading, etc. exist, the power of the total sum of the received signals in the above relational expressions employed in the first embodiment is increased, and the correlation value is reduced in the synchronization detection method using a guard symbol. Utilizing these features, degradation of the synchronization detection accuracy in a degraded transmission environment can be suppressed.

For instance, the synchronization circuit 221 executes synchronization detection using a guard symbol in a relatively satisfactory transmission environment, and executes both the method using a guard symbol and the synchronization detection method employed in the first embodiment, in a degraded transmission environment. In the latter case, the position which both the above two methods regard as a synchronization position is used as a synchronization position.

Fourth Embodiment

Figure 9:
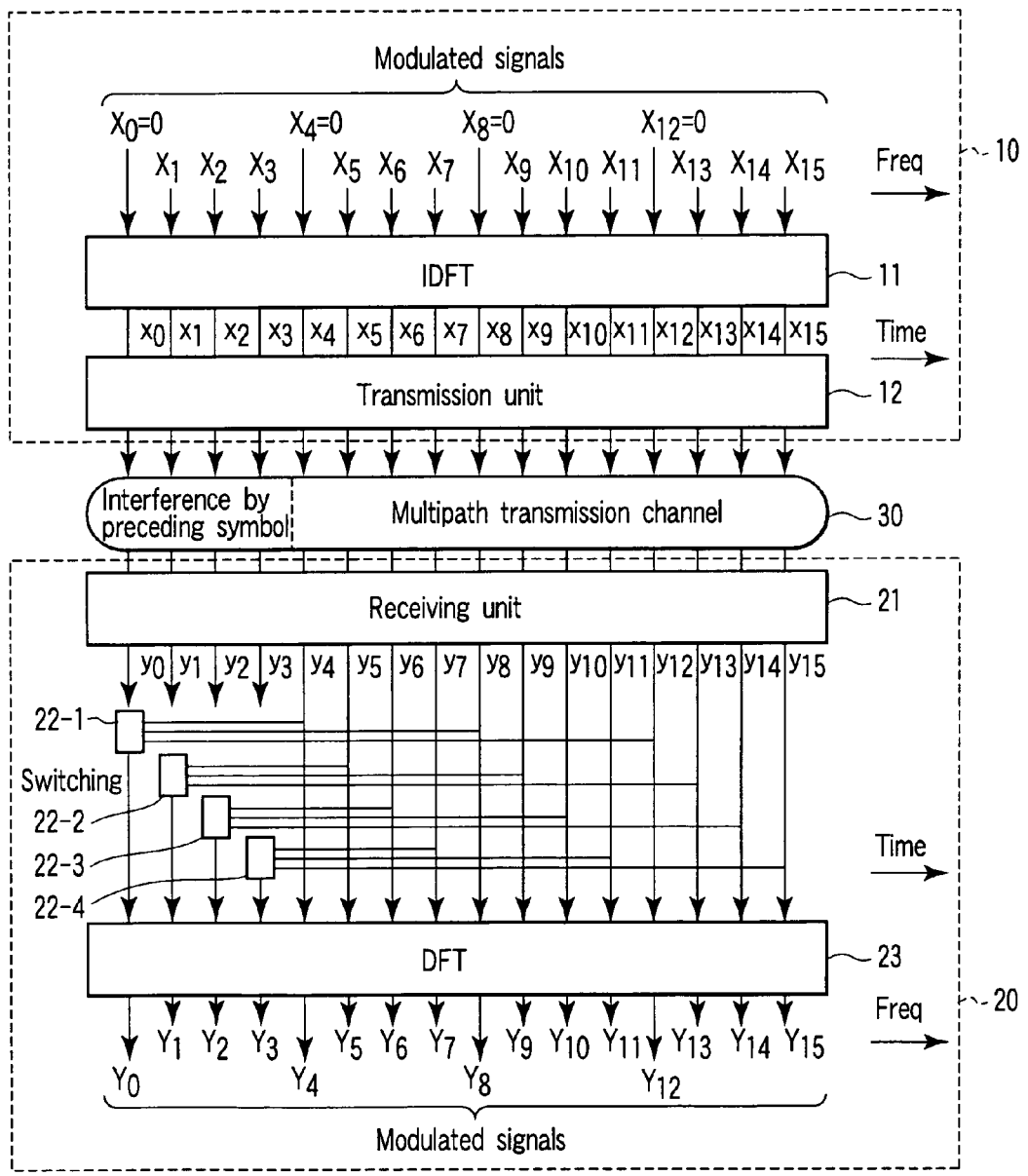
FIG. 9 is a block diagram illustrating a multi-carrier transmission system according to a fourth embodiment of the invention.

Referring to FIG. 9, the configuration of a multi-carrier transmission system according to a fourth embodiment will be described. FIG. 9 shows the multi-carrier transmission system of the fourth embodiment.

As shown, a multi-carrier transmitter 10 at least includes an inverse discrete Fourier transformer (IDFT) 11 and transmission unit 12. A multi-carrier receiver 20 at least includes a receiving unit 21, switching units (22-1, 2-3, 22-3, 22-4) and discrete Fourier transformer (DFT) 23. In the fourth embodiment, the IDFT 11 and DFT 23 each have sixteen inputs and outputs as shown in FIG. 9. However, the number of the inputs (outputs) of each of the IDFT 11 and DFT 23 is not limited to 16, but may be set to an arbitrary value. Concerning this point, a detailed description will be given later using, for example, equations [A8-1], [A8-2], [A8-3], and [A8-4].

The IDFT 11 receives sixteen modulated signals as input signals, subjects them to inverse discrete Fourier transform, and outputs the transformed modulated signals as output signals. If the input signals of the IDFT 11 are defined as $X_0, X_1, \ldots, X_{15}$, the output signals are defined as $x_0, x_1, \ldots, x_{15}$, and $W=\exp(-j2\pi/16)$, $j^2=-1$, the relationships between the input and output signals are given by $$x_k = (1/16)(X_0 + W_{16}^{-k}x_1 + W_{16}^{-2k}x_2 + \ldots + W_{16}^{-16k}x_{16}) \quad [A1]$$

$$(k = 0, 1, \ldots, 15)$$

where, for example, $W^{-2k}=(W)^{-2k}$. The IDFT 11 transforms the modulated signals into those determined by the equation [A1].

The transmission unit 12 uses, as one transmission symbol, the sixteen output signals $x_0, x_1, \ldots, x_{15}$ of the IDFT 11. Thus, the IDFT 11 successively generates transmission symbols, and the transmission unit 12 transmits a sequence of transmission symbols.

In the fourth embodiment, four of the input signals of the IDFT 11, i.e., $X_0, X_4, X_8$ and $X_{12}$, are set as follows:

$$X_0=0, X_4=0, X_8=0, X_{12}=0 \quad [A2]$$

If these values of X are substituted into the equation [A1], constraints expressed by the following equations [A3-1] to [A3-4] are established, as are also expressed by equations [A35]:

$$x_0+x_4+x_8+x_{12}=0 \quad [A3-1]$$

$$x_1+x_5+x_9+x_{13}=0 \quad [A3-2]$$

$$x_2+x_6+x_{10}+x_{14}=0 \quad [A3-3]$$

$$x_3+x_7+x_{11}+x_{15}=0 \quad [A3-4]$$

The receiving unit 21 receives, as a signal sequence $y_0, y_1, \ldots, y_{15}$, a transmission symbol sequence having passed through a transmission channel 30. The switching units (22-1, 2-3, 22-3, 22-4) are connected to positions of a transmission symbol that are expected to be inter-symbol interference occurrence positions. In the example of FIG. 9, $y_0, y_1, y_2$ and $y_3$ included in received signals $y_0, y_1, \ldots, Y_{15}$ are input to the switching units. Each switching unit performs switching utilizing the constraints.

Assuming here that the transmission channel 30 is an ideal channel free from noise, multipath fading, etc., if a boundary between two symbols is detected at correct timing in the symbol sequence received by the multi-carrier receiver 20, i.e., if accurate symbol synchronization is performed, the followings are established between the time-base signals:

$$x_k = y_k (k=0, 1, \ldots, 15) \quad [A4\text{-}1]$$

Similarly, the followings are established between the frequency-base signals:

$$X_k = Y_k (k=0, 1, \ldots, 15) \quad [A4\text{-}2]$$

Since, in general, each input and corresponding output of a DFT is in a one for one relationship, if the equation concerning the input or output is established, the other equation is also established. On the other hand, if signal transmission is out of synchrony with signal reception, i.e., if symbol synchronization is not established, the above equations [A4-1] or [A4-2] are not established.

Accordingly, if the transmission channel is an ideal one, constraints expressed by the following equations are established between the received signals $y_0, y_1, \ldots, Y_{15}$ from the above equations [A3-1] to [A3-4], [A4-1] and [A4-2]:

$$y_0 + y_4 + y_8 + y_{12} = 0 \quad [A5\text{-}1]$$

$$y_1 + y_5 + y_9 + y_{13} = 0 \quad [A5\text{-}2]$$

$$y_2 + y_6 + y_{10} + y_{14} = 0 \quad [A5\text{-}3]$$

$$y_3 + y_7 + y_{11} + y_{15} = 0 \quad [A5\text{-}4]$$

Utilizing the equations [A5-1] to [A5-4] established between the received signals $y_0, y_1, \ldots, y_{15}$, each of $y_0, y_1, y_2$ and $y_3$ is switched to another. Specifically, each of $y_0, y_1, Y_2$ and $y_3$ is switched to a combination of other received signals, using the following equations:

$$y_0 = -y_4 - y_8 - y_{12} \quad [A6\text{-}1]$$

$$y_1 = -y_5 - y_9 - y_{13} \quad [A6\text{-}2]$$

$$y_2 = -y_6 - y_{10} - y_{14} \quad [A6\text{-}3]$$

$$y_3 = -y_7 - y_{11} - y_{15} \quad [A6\text{-}4]$$

Since it is estimated that inter-symbol interference occurs at $y_0, y_1, y_2$ and $y_3$, these received signals $y_0, y_1, y_2$ and $y_3$ are not reliable signals. However, when signal transmission is performed under the constraint expressed by the equation [A1], the above equations [A6-1] to [A6-4] are established if the transmission channel is an ideal one. The received signals $y_4, y_5, \ldots, Y_{15}$ are considered reliable since they are substantially free from inter-symbol interference. Therefore, if $y_0, y_1, y_2$ and $y_3$ are replaced with other signals using the equations [A6-1] to [A6-4], signals $y_0', y_1', y_2'$ and $y_3'$ corresponding to $y_0, y_1, y_2$ and $y_3$ and free from inter-symbol interference can be acquired.

The DFT 23 performs discrete Fourier transform on a signal sequence, and outputs the resultant signal sequence as an output signal sequence. Specifically, assuming that the input and output signals of the DFT 23 are $y_0', y_1', y_2', Y_3', Y_4', \ldots, y_7$ and $Y_0, Y_1, Y_2, Y_3, Y_4, \ldots, Y_7$, respectively, the input and output signals have the following relationships:

$$Y_k = y_0' + w_8^k y_1' + w_8^{2k} y_2' + w_8^{3k} y_3' + w_8^{4k} y_4 + \ldots + w_8^{7k} y_7 \quad [A7]$$

$$(k = 0, 1, \ldots, 7)$$

Some examples in which the switching units (22-1, 2-3, 22-3, 22-4) perform switching of received signals will be described. In the above-mentioned example, the received signals $y_0, y_1, y_2$ and $y_3$ are interfered by the preceding transmission symbol. Other types of inter-symbol interference may occur.

Example (1-1): Assume that, in an ideal transmission channel, the received signals $y_0$ and $y_1$ are interfered by the preceding transmission symbol, and the received signal $y_{15}$ is interfered by the next transmission symbol. In this case, the following inequalities and equation are established:

$$y_0 + y_4 + y_8 + y_{12} \neq 0 \quad [A8\text{-}1]$$

$$y_1 + y_5 + y_9 + y_{13} \neq 0 \quad [A8\text{-}2]$$

$$y_2 + y_6 + y_{10} + y_{14} = 0 \quad [A8\text{-}3]$$

$$y_3 + y_7 + y_{11} + y_{15} \neq 0 \quad [A8\text{-}4]$$

This inter-symbol interference can be eliminated using the equations [A6-1] and [A6-2] and the following equation [A9] that is acquired from the equation [A5-4].

$$y_{15} = -y_3 - y_7 - y_{11} \quad [A9]$$

Thus, inter-symbol interference can be eliminated without a guard symbol, if the received signals are switched appropriately using the constraints established therebetween.

The transmission channel 30 is assumed so far to be an ideal one. Actually, however, noise may well exist in the transmission channel 30. Therefore, it is needed to determine whether the channel is an ideal one. To this end, some of the equations [A5-1] to [A5-4] as the constraints on noise determination are utilized. Specifically, since it is known, depending upon the transmission/reception system used, at which received signals inter-symbol interference occurs, noise determination is performed, using equations that express constraints concerning received signals free from inter-symbol interference.

Example (1-2): Assume that, the received signals $y_0$ and $Y_1$ are interfered by the preceding transmission symbol, the received signal $Y_{15}$ is interfered by the next transmission symbol, and noise exists in the transmission channel. In this case, the following inequalities and equation are established:

$$y_0 + y_4 + y_8 + y_{12} \neq 0 \quad [A10\text{-}1]$$

$$y_1 + y_5 + y_9 + Y_{13} \neq 0 \quad [A10\text{-}2]$$

$$y_2 + y_6 + y_{10} + Y_{14} = v \neq 0 \quad [A10\text{-}3]$$

$$y_3 + y_7 + y_{11} + y_{15} \neq 0 \quad [A10\text{-}4]$$

The inequalities [A10-1] and [A10-2] express cases in which no constraint is established because of the influence of inter-symbol interference and noise. The equation [A10-3] expresses a case where inter-symbol interference does not exist but noise exists. If the transmission channel is an ideal one in which no noise exists, the equation [A10-3] is identical to the equation [A5-3]. Therefore, the closer to 0 the left part of the equation [A10-3], the lower the noise. Conversely, the remoter from 0, the higher the noise. In light of this, the degree of influence of noise can be determined from a value of power at which any constraint, which is established between received signals that are detected in an ideal transmission channel and are free from inter-symbol interference, is not established. In the example (1-2), the influence of noise is determined from whether the value v of the equation [A10-3] is high or low.

For example, if v is less than a certain value, noise is considered to be low, thereby regarding the transmission channel 30 as ideal. After that, like the example (1-1), the received signals $y_0$, $y_1$ and $y_{15}$ are replaced with other appropriate signals, using the equations [A6-1] and [A6-2] and the equation [A9] acquired from the equation [A5-4], thereby appropriately eliminating inter-symbol interference. On the other hand, if v is not less than the certain value, noise is considered to be high, thereby determining that the transmission channel 30 cannot be regarded as ideal. In this case, control is performed so as not to perform the elimination of inter-symbol interference based on the equations [A6-1] and [A6-2] and the equation [A9] acquired from the equation [A5-4]. This is because noise is too high and therefore a significant error may occur if it is assumed that the constraints are established. The value v is preset in accordance with, for example, the level of a signal transmitted from a transmitter, or the performance of a receiver.

In the above-described examples, four no-information signals are assigned to each transmission symbol. However, the number of no-information signals is not limited to 4. Variations will now be described.

Example (2-1): Where only one input signal input to the IDFT 11 is set to a no-information signal, as expressed by, for example, the following equation:

$$X_0=0 \quad [A11]$$

In this case, the constraint established between the output signals of the IDFT 11 is given by $$x_0+x_1+x_2+\ldots+x_{14}+x_1=0 \quad [A12]$$

This constraint can be used where a single received signal is interfered. More specifically, the constraint can be used when only $y_0$ is interfered by the preceding transmission symbol, or only $y_{15}$ is interfered by the next transmission symbol. Further, when inter-symbol interference exists, the level of noise may be determined depending upon the constraint.

Example (2-2): Where two input signals input to the IDFT 11 are set to no-information signals, as given by, for example, the following equations:

$$X_0=0, X_8=0 \quad [A13]$$

In this case, the constraints expressed by the following equations are established between the output signals of the IDFT 11:

$$x_0+x_2+x_4+\ldots+x_{12}+x_{14}=0 \quad [A14-1]$$

$$x_1+x_3+x_5+\ldots+x_{13}+x_{15}=0 \quad [A14-2]$$

These constraints can be used where two received signals are interfered. More specifically, the constraints can be used when $y_0$ and $y_1$ are interfered by the preceding transmission symbol, or $y_{14}$ and $y_{15}$ are interfered by the next transmission symbol. Further, if a single received signal is interfered by the preceding or next transmission symbol where two constraints exist, the level of noise can be determined using the constraint equations irrelevant to the signal. For example, where it is known that only $y_0$ is interfered, it is checked how far the value of $$y_1+y_3+y_5+\ldots+y_{13}+y_{15} \quad [A14-2-1]$$

corresponding to the left part of the equation [A14-2] is from 0. If it is determined that noise does not have a significant impact as stated above, it is sufficient if the following equation [A14-1-1]

$$y_0=-y_2-y_4-y_6-\ldots-y_{12}-y_{14} \quad [A14-1-2]$$

is extracted from the equation [A14-1], thereby correct $y_0$. On the other hand, the value of [A14-2-1] is far from 0, which means that noise has a significant impact and hence unignorable, no correction for $y_0$ is performed.

Example (2-3): Where four input signals input to the IDFT 11 are set to no-information signals ($X_0=0$, $X_4=0$, $X_8=0$, $X_{12}=0$). This case has already been described in detail with reference to the equations [A2] et seq.

Example (2-4): Where eight input signals input to the IDFT 11 are set to no-information signals, for example, in the following manner:

$$X_0=0, X_2=0, X_4=0, X_6=0, X_8=0, X_{10}=0, X_{12}=0,$$
$$X_{14}=0 \quad [A15]$$

In this case, the constraints expressed by the following equations are established between the output signals of the IDFT 11:

$$x_0+x_8=0 \quad [A16-1]$$

$$x_1+x_9=0 \quad [A16-2]$$

$$x_2+x_{10}=0 \quad [A16-3]$$

$$x_3+x_{11}=0 \quad [A16-4]$$

$$x_4+x_{12}=0 \quad [A16-5]$$

$$x_5+x_{13}=0 \quad [A16-6]$$

$$x_6+x_{14}=0 \quad [A16-7]$$

$$x_7+x_{15}=0 \quad [A16-8]$$

In this case, eight interfered received signals, at maximum, can be corrected. For example, if received signals $y_0$, $y_1,\ldots,y_6$ and $y_7$ are interfered by the preceding transmission symbol, they can be corrected, using the following equations:

$$y_0=-y_8, y_1=-y_9, y_2=-y_{10}, y_3=-y_{11}, y_4=-y_{12}, y_5=-y_{13},$$
$$y_6=-y_{14}, y_7=-y_{15} \quad [A17]$$

Further, if, for example, received signals $y_0$, $y_1$, $y_2$ and $y_3$ are interfered by the preceding transmission symbol, and received signals $y_{14}$ and $y_{15}$ are interfered by the next transmission symbol, these received signals can be corrected, using the following equations:

$$y_0=-y_8, y_1=-y_9, y_2=-y_{10}, y_3=-y_{11}, y_{14}=-Y_6, y_{15}=-y_7 \quad [A18]$$

In this case, two constraints included in the constraints expressed by equations [A16-1] to [A16-8] are not used for correcting inter-symbol interference. Therefore, these two constrains can be utilized for determining the influence of noise. Specifically, it is determined whether each of u and v in the following equations [A19] are not less than a given value.

$$y_4+y_{12}=u, y_5+y_{13}=v \quad [A19]$$

If each of u and v is not less than the given value, it is determined that the noise level is high, and equations [A18] are not utilized. On the other hand, each of u and v is less than the given value, it is determined that the noise level is low, and equations [A18] are utilized to correct interfered signals. Further, if either u or v is less than the given value, control is performed in which, for example, the difference between u and v is measured, and only when this difference is relatively small, interfered received signals are corrected.

As described above, the larger the number of no-information signals, the larger the number of acquired constraints independent of each other, and the larger the number of interfered signals that can be corrected.

Figure 10A:
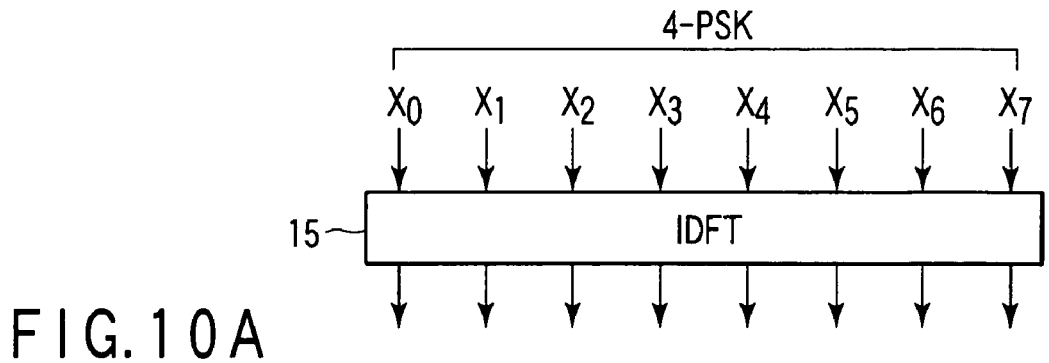
FIG. 10A is a view illustrating a case where modulated signals input to an IDFT with eight input/output points are all 4-PSK signals.
Figure 10B:
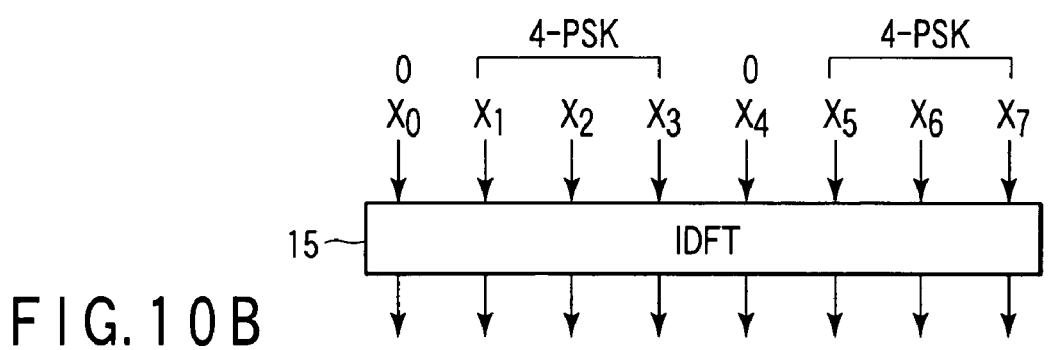
FIG. 10B is a view illustrating a case where two of the modulated signals shown in FIG. 10A are no-information signals, and the other six modulated signals are all 4-PSK signals.
Figure 10C:
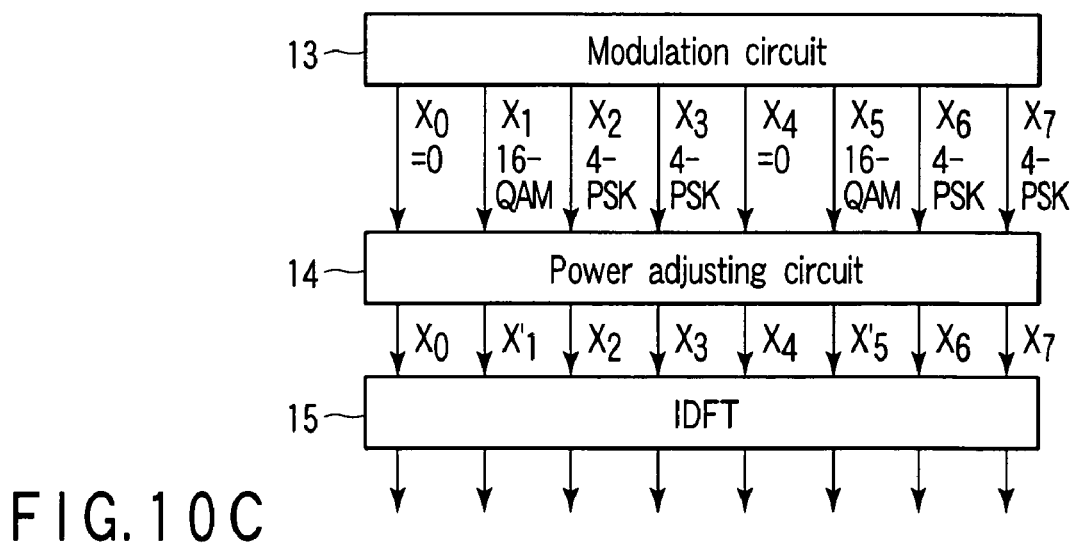
FIG. 10C is a view illustrating a case where two of the modulated signals shown in FIG. 10A are no-information signals, and other two modulated signals are 16-QAM signals.

However, as the number of no-information signals is increased, the transmission efficiency is reduced. Referring now to FIGS. 10A, 10B and 10C, a method for preventing the transmission efficiency from reduction will be described. Although an IDFT 15 described below has eight input/output points, the number of input/output points is not limited to this. The method is applicable to an IDFT with an arbitrary number of input/output points. FIG. 10A is a view illustrating a case where modulated signals input to the IDFT 15 with eight input/output points are all 4-PSK signals. FIG. 10B is a view illustrating a case where two of the modulated signals shown in FIG. 10A are no-information signals, and the other six modulated signals are all 4-PSK signals. FIG. 10C is a view illustrating a case where two of the modulated signals shown in FIG. 10A are no-information signals, and other two modulated signals are 16-QAM signals.

Compared to the case of FIG. 10A where none of the input signals $X_0, X_1, \ldots, X_7$ of the IDFT 15 are no-information signals, the transmission efficiency is reduced, in the case of FIG. 10B where $X_0$ and $X_4$ included in the input signals $X_0, X_1, \ldots, X_7$ of the IDFT 15, by the number of transmission bits of $X_0$ and $X_4$.

In light of this, in the fourth embodiment, if one input signal is made as a no-information signal, the modulation circuit 13 modulates, into a signal with a larger number of transmission bits, one of the IDFT input signals other than the no-information signal. The modulation circuit 13 is a circuit for modulating an input signal into a modulated signal corresponding to a predetermined modulation scheme.

For instance, the modulation circuit 13 modulates a 4-PSK signal into a 16-QAM signal or 64-QAM signal, etc., which has a larger number of transmission bits than the former.

FIG. 10C shows an example where the number of transmission bits is identical to that in the example of FIG. 10A where all input signals $X_0, X_1, \ldots, X_7$ are 4-PSK signals. Since the number of transmission bits of a 16-QAM signal is double the number of transmission bits of a 4-PSK signal, two 4-PSK input signals are replaced with respective 16-QAM signals in the example of FIG. 10C where two no-information signals are input.

The fourth embodiment is not limited to the use of the 16-QAM scheme as in the example of FIG. 10C. For example, to make the number of transmission bits identical to that in the example of FIG. 10A, two 4-PSK signals included in $X_0, X_1, \ldots, X_7$ may be replaced with respective 8-PSK signals. Alternatively, one 4-PSK signal included in $X_0, X_1, \ldots, X_7$ may be replaced with a 64-QAM signal.

Further, if no-information signals are included in $X_0, X_1, \ldots, X_7$, and if the power is reduced by the number of the no-information signals, the resistance to errors is reduced. To prevent a reduction in resistance to errors, the embodiment employs a power-adjusting unit 14 for increasing the power of the modulated signals $X_1'$ and $X_5'$ of the 16-QAM scheme in order to make the total power of $X_0, X_1', \ldots, X_5', \ldots, X_7$ shown in FIG. 10C identical to that of $X_0, X_1, \ldots, X_7$ shown in FIG. 10A. If the former total power can be made identical to the latter, the resistance to errors can be made identical.

As described above, some of the IDFT input signals can be set to no-information signals without degrading the resistance to errors and without reducing the number of transmission bits per one symbol. In other words, the modulation scheme and power can be set on condition that the input signals of the IDFT 15 have the same number of bits and the same power.

However, if a reduction in the number of transmission bits by setting a certain 4-PSK input signal of the IDFT 11 to a level of 0 is allowed, it is not necessary to change the modulation scheme for another input signal to another multi-value modulation scheme. It is sufficient if the modulation scheme is kept at the 4-PSK scheme. Further, if a reduction in error ratio due to a change in modulation scheme for a certain input signal is allowed, no power adjustment is needed.

Figure 11A:
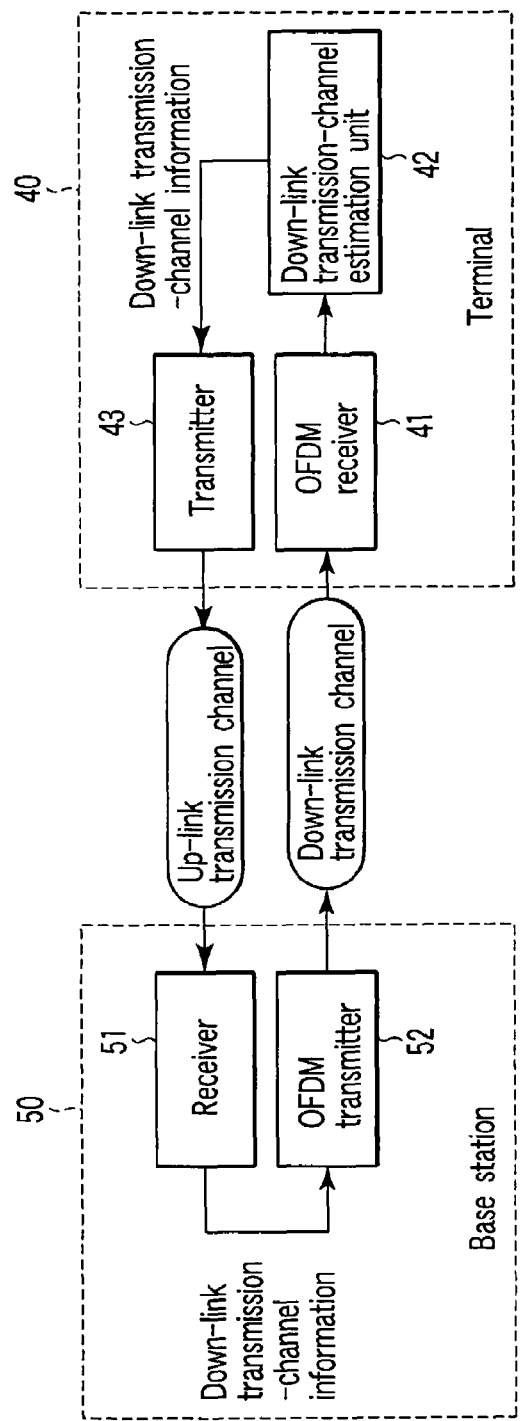
FIG. 11A is a block diagram illustrating a multi-carrier transmission system in which a transmission channel from a base station to a terminal differs from that from the terminal to the base station.
Figure 11B:
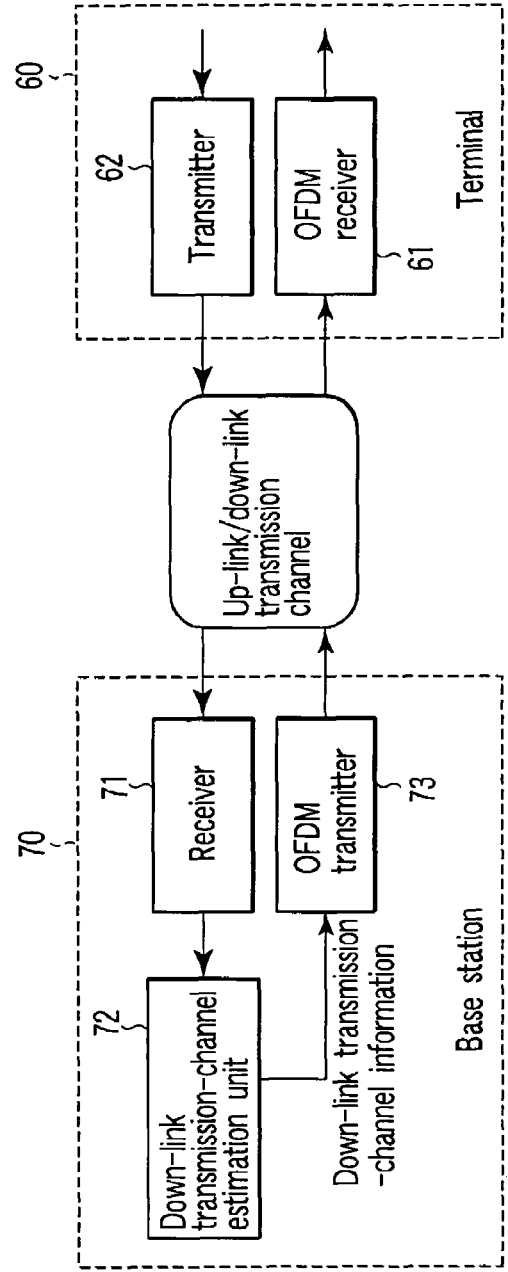
FIG. 11B is a block diagram illustrating a multi-carrier transmission system in which a transmission channel from a base station to a terminal is identical to that from the terminal to the base station.

The number of no-information signals input to the IDFT 11 can be varied in accordance with the state of the transmission channel. This will be described with reference to FIGS. 11A and 11B. FIG. 11A is a block diagram illustrating a multi-carrier transmission system in which a transmission channel from a base station 50 to a terminal 40 differs from that from the terminal 40 to the base station 50. FIG. 11B is a block diagram illustrating a multi-carrier transmission system in which a transmission channel from a base station 70 to a terminal 60 is identical to that from the terminal 60 to the base station 70.

The terminal 40 or the base station 70 detects the state of the transmission channel, and controls the modulation circuit contained in an OFDM transmitter 52 or 73. For example, if the multipath delay time is long, the base station controls the modulation circuit contained in the OFDM transmitter 52 or 73 to increase the number of no-information signals to be inserted. On the other hand, if the multipath delay time is short, the base station controls the modulation circuit to reduce the number of no-information signals to be inserted. The base station detects the state of the transmission channel in the manner stated below.

FIG. 11A illustrates frequency division duplex (FDD) communication in which up-link and down-link transmission channels are used between the base station 50 and terminal 40. In this case, when OFDM transmission is performed from the base station 50 to the terminal 40 using the down-link transmission channel, the base station 50 instructs the terminal 40 to inform the base station of the transmission condition for the down-link transmission channel via the up-link transmission channel. Based on the transmission condition for the down transmission channel supplied from the terminal 40, the base station 50 executes OFDM transmission.

More specifically, for instance, in the terminal 40, a down-link transmission channel estimation unit 42 estimates the state of the down-link transmission channel based on a signal received by the OFDM receiver 41. Subsequently, a transmitter 43 transmits, to the base station 50, information concerning the state of the down-link transmission channel estimated by the estimation unit 42. In the base station 50, a receiver 51 receives the information concerning the state of the down-link transmission channel, and outputs the information to the OFDM transmitter 52. The OFDM transmitter 52 transmits a signal to the terminal 40, based on the input information concerning the state of the down-link transmission channel.

On the other hand, FIG. 11B illustrates time division duplex (TDD) communication in which only a single transmission channel is used as both an up-link transmission channel and down-link transmission channel between the base station 70 and terminal 60. In this case, when OFDM transmission is performed from the base station 70 to the terminal 60, the base station 70 detects a transmission condition for the down-link transmission channel, from the characteristics of a signal received. Based on the detected transmission condition for the down-link transmission channel, the base station 70 executes OFDM transmission.

More specifically, for instance, in the base station 70, a down-link transmission-channel estimation unit 72 estimates the state of the down-link transmission channel from a signal received by a receiver 71. Based on the estimated state, the OFDM transmitter 73 transmits a signal to the terminal 60.

Although the above-described embodiment employs an IDFT and DFT having sixteen input/output points, it is a matter of course that the number of the input/output points is not limited to sixteen, but may be set to an arbitrary value. Specifically, in a transmitter, assuming that $X_{pk}$ (p=0, 1, . . . , N-1, M=KN, N=2$^n$) included in the input signals $X_0$, $X_1$, . . . , $X_{M-1}$ of an IDFT with M input/output points (M=2$^m$) is set to a level of 0, the output signals $x_0, x_1, \ldots, x_{M-1}$ satisfy the following equations:

$$x_p + x_{p+N} + \ldots + x_{p+(K-1)N} = 0 \quad [A20]$$

(p=0, 1, . . . , N-1)

Accordingly, assuming that the received signals having passed through the transmission channel are $y_0, y_1, \ldots, y_{M-1}$, v is fine power, and the noise level is low, maximum number N interfered received signals can be corrected, using the following equations:

$$y_p + y_{p+N} + \ldots + y_{p+(K-1)N} \approx 0 \quad [A22]$$

(p=0, 1, . . . , N-1)

For example, when M=2048, N=256 and K=8, $X_0, X_8, X_{16}, \ldots, X_{2032}, X_{2030}$ included in the input signals $X_0, X_1, X_2, \ldots, X_{2046}$ and $X_{2047}$ of an IDFT having 2048 input/output points are set to a level of 0. In this case, the following 256 equations are acquired as constraints on the output signals $x_0, x_1, x_2, \ldots, x_{2046}$ and $x_{2047}$ of the IDFT having 2048 input/output points:

$$x_0 + x_{256} + x_{512} + \ldots + x_{1536} + x_{1792} = 0 \quad [A22\text{-}1]$$

$$x_1 + x_{257} + x_{513} + \ldots + x_{1537} + x_{1793} = 0 \quad [A22\text{-}2]$$

$$x_2 + x_{258} + x_{514} + \ldots + x_{1538} + x_{1794} = 0 \quad [A22\text{-}3]$$

$$x_{254} + x_{510} + x_{766} + \ldots + x_{1790} + x_{2046} = 0 \quad [A22\text{-}255]$$

$$x_{255} + x_{511} + x_{767} + \ldots + x_{1791} + x_{2047} = 0 \quad [A22\text{-}256]$$

Accordingly, the receiver can correct 256 interfered received signals, at maximum, included in the received signals $y_0, y_1, y_2, \ldots, y_{2046}$ and $Y_{2047}$, utilizing the constraints expressed by the following equations:

$$y_0 + y_{256} + y_{512} + \ldots + y_{1536} + y_{1792} \approx 0 \quad [A23\text{-}1]$$

$$y_1 + y_{257} + y_{513} + \ldots + y_{1537} + y_{1793} \approx 0 \quad [A23\text{-}2]$$

$$y_2 + y_{258} + y_{514} + \ldots + y_{1538} + y_{1794} \approx 0 \quad [A23\text{-}3]$$

$$y_{254} + y_{510} + y_{766} + \ldots + y_{1790} + y_{2046} \approx 0 \quad [A23\text{-}255]$$

$$y_{255} + y_{511} + y_{767} + \ldots + y_{1791} + y_{2047} \approx 0 \quad [A23\text{-}256]$$

Further, DFTs and IDFTs with a large number of input/output points utilize algorithms of fast Fourier transform (FFT) and inverse FFT.

Fifth Embodiment

Figure 12:
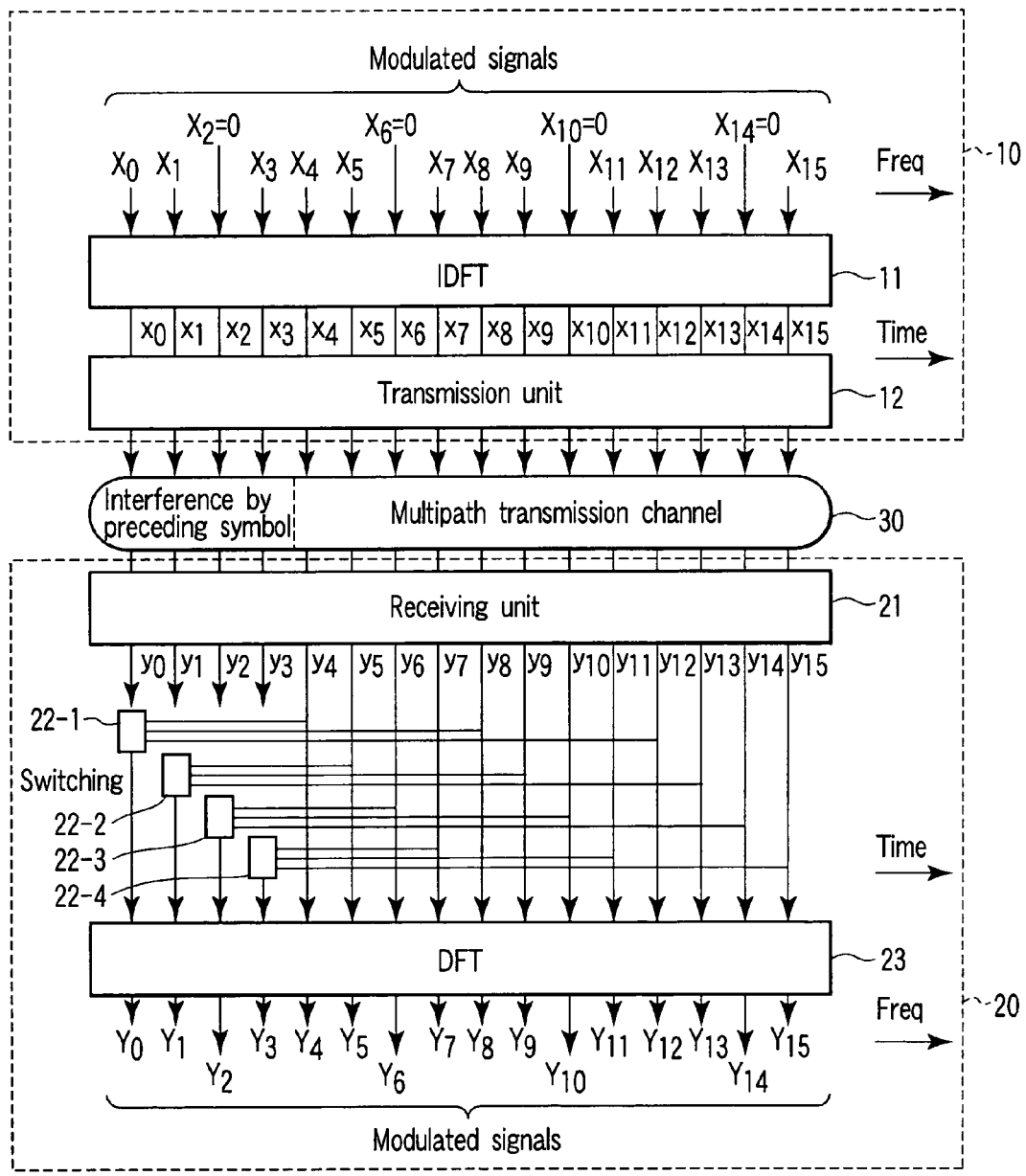
FIG. 12 is a block diagram illustrating a multi-carrier transmission system according to a fifth embodiment of the invention.

In the above-described fourth embodiment, in the transmitter, every $k^{th}$ $X_{pk}$ (p=0, 1, . . . , N-1, M=KN, N=2$^n$), which is included in the input signals $X_0, X_1, \ldots, X_{M-1}$ of the IDFT with M input/output points (M=2$^m$) and begins from $X_0$, is set to a level of 0. In the fifth embodiment, the contents of the fourth embodiment are generalized, and every $k^{th}$ $X_{L+pk}$, beginning not from $X_0$ but from $X_L$ (L=0, 1, . . . , K-1), is set to a level of 0. FIG. 12 is a block diagram illustrating a multi-carrier transmission system according to the fifth embodiment of the invention. FIG. 12 shows a case where every fourth signal beginning from $X_2$ is set to a level of 0, i.e., where L=2 and K=4. Referring to the example of FIG. 12, a description will be given of a case where L and K assume respective arbitrary values.

Assuming that the input signals of the IDFT are $X_0, X_1, \ldots, X_{M-1}$, the output signals of the IDFT are $x_0, x_1, \ldots, x_{M-1}$, $W_M = \exp(-j2\pi/M)$, and $j^2 = -1$, the relationships between the input and output signals are given by $$x_k = (1/M)(X_0 + W_M^{-k}X_1 + W_M^{-2k}X_2 + \ldots + W_M^{-(M-1)k}X_{M-1}), \quad [A24]$$

(k represents an integer, and $0 \leq k \leq M-1$)

Further, up is defined for the output signals $x_0, x_1, \ldots, x_{M-1}$ of the IDFT, using the following equations:

$$u_p = W_M^{pL} x_p + W_M^{(p+N)L} x_{p+N} + \quad [A25]$$
$$W_M^{(p+2N)L} x_{p+2N} + \ldots + W_M^{(p+(K-1)N)L} x_{p+(K-1)N},$$

(p represents an integer, and $0 \leq p \leq N-1$)

If $u_0, u_1, \ldots, u_{N-1}$ is input to a DFT with N input/output points, the output signal $U_k$ (k represents an integer, and $0 \leq k \leq M-1$) of the DFT are given by $$U_k = u_0 + W_N^k u_1 + W_N^{2k} u_2 + \ldots + W_N^{(N-1)k} u_{N-1} \quad [A26]$$

where $W_N = \exp(-j2\pi/N) = W_M^K$. Using the equations [A25], the equations [A26] can be modified in the following manner:

$$U_k = x_0 + W_M^{(L+kK)} x_1 + W_M^{2(L+kK)} x_2 + \ldots + W_M^{(M-1)(L+kK)} x_{M-1}) \quad [A27]$$

On the other hand, if $x_0, x_1, \ldots, x_{M-1}$ is input to a DFT with M input/output points, the output signal $X_k$ (k represents an integer, and $0 \leq k \leq M-1$) of the DFT is given by $$X_k = x_0 + W_M^k x_1 + W_M^{2k} x_2 + \ldots + W_M^{(M-1)k} x_{M-1} \quad [A28]$$

From the equations [A27] and [A28], the followings are acquired:

$$X_{L+pK} = U_p \quad [A29]$$

(p=0, 1, . . . , N-1, i=0, 1, . . . , K-1)

In the equations [A29], if $X_{L+pK} = U_p = 0$, the output signal up of an IDFT with N input/output points assumed when $U_0, U_1, \ldots, U_{N-1}$ are input thereto is naturally $u_p = 0$ (p=0, 1, . . . , N-1). Accordingly, from the equations [A25], the followings are acquired:

$$W_M^{pL} x_p + W_M^{(p+N)L} x_{p+N} + \quad [A30]$$
$$W_M^{(p+2N)L} x_{p+2N} + \ldots + W_M^{(p+(K-1)N)L} x_{p+(K-1)N} = 0$$

(p = 0, 1, . . . , N - 1, L = 0, 1, . . . , K - 1)

Each of the left and right parts of each of the equations [A30] is divided by $W_M^{pL}$. Further, if $W_M^N=\exp(-j2\pi N/M)=\exp(-j2\pi/K)=W_K$ is considered, then the following equations are acquired from the above equation [A30]:

$$x_p + W_K^L x_{p+N} + W_K^{2L} x_{p+2N} + \ldots + W_K^{(K-1)L} x_{p+(K-1)N} = 0 \quad [A31]$$

$$(p = 0, 1, \ldots, N-1; L = 0, 1, \ldots, K-1)$$

The equations [A31] are used as constraints on the output signals of the IDFT with the M input/output points when $X_{L+pk}$ (L=0, 1, ..., K−1, p=0, 1, ..., N−1, M=KN, N=$2^n$) is set to a level of 0.

In the example of FIG. 12, M=16, L=2 and K=4, therefore N=4. Accordingly, the equations [A31] become:

$$x_p + W_4^2 x_{p+4} + W_4^4 x_{p+8} + W_4^6 x_{p+12} = 0 \quad [A32]$$

(p=0, 1, 2, 3, L=0, 1, 2, 3)

If L=0, the equations [A31] become:

$$x_p + x_{p+N} + x_{p+2N} + \ldots + x_{p+(K-1)N} = 0 \quad [A33]$$

(p=0, 1, ..., N−1)

These equations express the constraint employed in the fourth embodiment. If M=16 and N=4, K=4. Accordingly, the equations [A33] become:

$$x_p + x_{p+4} + x_{p+8} + x_{p+12} = 0 \quad [A34]$$

(p=0, 1, 2, 3)

Thus, the equations [A33] are identical to the equations [A3-1], [A3-2], [A3-3] and [A3-4] extracted in the fourth embodiment.

From the equations [A31], the following equations are established for a series of received signals $y_0, Y_1, \ldots, Y_{M-1}$:

$$y_p + W_K^L y_{p+N} + W_K^{2L} y_{p+2N} + \ldots + W_K^{(K-1)L} y_{p+(K-1)N} = 0 \quad [A35]$$

$$(p = 0, 1, \ldots, N-1, L = 0, 1, \ldots, K-1)$$

The equations [A35] enable maximum number N interfered signals to be corrected. In the fifth embodiment, the degree of freedom in positioning a no-information signal at the transmit side is increased compared to the fourth embodiment.

In the example of FIG. 12, M=16, L=2 and K=4, therefore N=2 and the following equations are established:

$$y_p + W_4^2 y_{p+4} + W_4^4 y_{p+8} + W_4^6 y_{p+12} = 0 \quad [A36]$$

(p=0, 1, 2, 3, L=0, 1, 2, 3)

The equations [A36] enable four interfered signals, at maximum, to be corrected.

Sixth Embodiment

The sixth embodiment is obtained by combining the fourth embodiment with an inter-symbol interference reduction method using a guard symbol. In the inter-symbol interference reduction method using a guard symbol, the last several ones of the output signals of an IDFT are copied before the first output signal and used as a guard symbol, thereby absorbing any inter-symbol interference that may occur on the guard symbol, to protect information generated by a transmitter. Even if the guard symbol copied before the original output signals is interfered by the preceding transmission symbol, the information contained in the original signals located after the guard symbol is protected from the interference.

Figure 13:
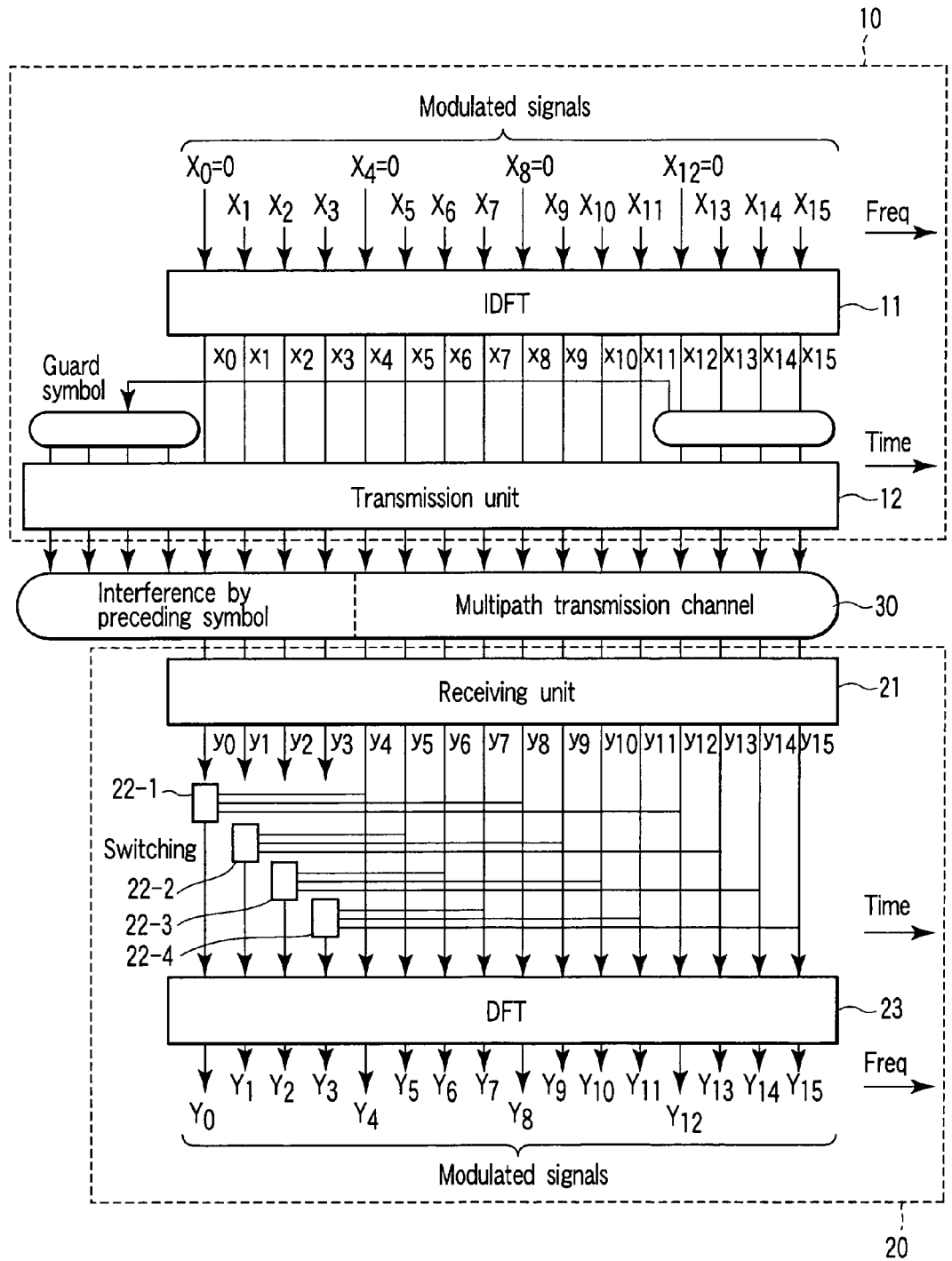
FIG. 13 is a block diagram illustrating a multi-carrier transmission system according to a sixth embodiment of the invention.

Referring now to FIG. 13, a detailed description will be given of a multi-carrier transmission system according to the sixth embodiment in which a multi-carrier transmitter 10 has an IDFT 11 with sixteen input/output points and a multi-carrier receiver 20 has a DFT 23 with sixteen input/output points, as in the fourth embodiment. FIG. 13 is a block diagram illustrating the multi-carrier transmission system of the sixth embodiment. In the transmitter 10 of the system, the input signals of the IDFT 11 are defined as $X_0, X_1, \ldots, X_{15}$, the output signals are defined as $x_0, x_1, \ldots, x_{15}$. Further, it is assumed that $X_0=0$, $X_4=0$, $X_8=0$ and $X_{12}=0$. In this case, the constraints expressed by the following equations are established between the output signals of the IDFT 11 as in the fourth embodiment:

$$x_0 + x_4 + x_8 + x_{12} = 0 \quad [A3-1]$$

$$x_1 + x_5 + x_9 + x_{13} = 0 \quad [A3-2]$$

$$x_2 + x_6 + x_{10} + x_{14} = 0 \quad [A3-3]$$

$$x_3 + x_7 + x_{11} + x_{15} = 0 \quad [A3-4]$$

In the sixth embodiment, to set a guard symbol, copies of $x_{12}, x_{13}, x_{14}$ and $x_{15}$ are positioned immediately before $x_0$ as shown in FIG. 13. More specifically, wiring is made such that the last four signals $x_{12}, x_{13}, x_{14}$ and $x_{15}$ included in the output signals $x_0, x_1, x_2, x_3, x_4, x_5, x_6, x_7, x_8, x_9, x_{10}, x_{11}, X_{12}, x_{13}, x_{14}$ and $x_{15}$ of the IDFT 11 are copied and positions as a guard symbol before $x_0, x_1, x_2, x_3, x_4, x_5, x_6, x_7, x_8, x_9, x_{10}, x_{11}, x_{12}, x_{13}, x_{14}$ and $x_{15}$. As a result, a signal sequence of $x_{12}, x_{13}, x_{14}, x_{15}, x_0, x_1, x_2, x_3, x_4, x_5, x_6, x_7, x_8, x_9, x_{10}, x_{11}, x_{12}, x_{13}, x_{14}$ and $x_{15}$ is used as a single transmission symbol. Similar transmission symbols are successively generated and transmitted as a transmission symbol sequence through the transmission channel 30.

The multi-carrier receiver 20 receives, as an adjacent signal sequence, the transmission symbol sequence supplied through the transmission channel, thereby extracting a sequence of sixteen signals at certain timing, and regarding it as a received-signal sequence of $y_0, y_1, \ldots, Y_{15}$. In other words, the multi-carrier receiver 20 extracts, as $y_0, y_1, \ldots, y_{15}$, received signals detected immediately after each guard symbol. As a result, even if the four signals included in each guard symbol are interfered ones, they are not extracted by the receiver 20, which means that the influence of inter-symbol interference can be avoided.

The sixth embodiment is characterized in that if inter-symbol interference occurs at signals positioned after each guard symbol, the signals interfered by the inter-symbol interference are corrected. Specifically, as shown in FIG. 13, interfered signals $y_0, y_1, y_2, y_3$ are corrected, utilizing the equations [A6-1] to [A6-4] employed in the fourth embodiment. Thus, the sixth embodiment is useful in a case where inter-symbol interference may well occur at signals positioned after a guard symbol. The manner of correction performed in this case is similar to that described in the fourth embodiment, therefore no detailed description is given thereof.

Seventh Embodiment

Referring to FIG. 14, the configuration of a multi-carrier transmission system according to a seventh embodiment will be described. FIG. 14 is a block diagram illustrating the common configuration of multi-carrier transmission systems according to seventh and eighth embodiments of the invention.

The multi-carrier transmission system of the embodiment at least comprises a multi-carrier transmitter 10 and multi-carrier receiver 20.

The multi-carrier transmitter 10 at least includes an inverse discrete Fourier transformer (IDFT) 11 and transmitting unit 12. The multi-carrier receiver 20 at least includes a receiving unit 21, amplitude detector 22, determination unit 23, switch unit 24, discrete Fourier transformer (DFT) 25, IDFT 26, memory 27 and controller 28. In the embodiment, the IDFTs 11 and 26 and DFT 25 each have eight inputs and outputs as shown in FIG. 14. However, the number of the inputs (outputs) of each of the IDFTs 11 and 26 and DFT 25 is not limited to 8, but may be set to an arbitrary value. Concerning this point, a detailed description will be given later using, for example, equations [B17].

The IDFT 11 receives eight modulated signals as input signals, subjects them to inverse discrete Fourier transform, and outputs the transformed modulated signals as output signals. If the input signals of the IDFT 11 are defined as $X_0, X_1, \ldots, X_7$, the output signals are defined as $x_0, x_1, \ldots, x_7$, and $W_8 = \exp(-j2\pi/8)$, $j^2 = -1$, the relationship between the input and output signals is given by $$x_k = (1/8)(X_0 + W_8^{-k} X_1 + W_8^{-2k} X_2 + \ldots + W_8^{-7k} X_7) \quad [B1]$$

$(k=0, 1, \ldots, 7)$ where, for example, $W_8^{-2k} = (W_8)^{-2k}$. The IDFT 11 transforms the modulated signals into those determined by the equation [B1].

The transmitting unit 12 uses, as one transmission symbol, the eight output signals $x_0, x_1, \ldots, x_7$ of the IDFT 11. Thus, the IDFT 11 successively generates transmission symbols, and the transmitting unit 12 transmits a sequence of transmission symbols.

In the seventh embodiment, two of the input signals of the IDFT 11, i.e., $X_0$ and $X_4$, are set as follows:

$$X_0 = 0, X_4 = 0 \quad [B2]$$

If these values of X are substituted into the equations [B1], constraints expressed by the following equations [B3-1] and [B3-2] are established:

$$x_0 + x_2 + x_4 + x_6 = 0 \quad [B3-1]$$

$$x_1 + x_3 + x_5 + x_7 = 0 \quad [B3-2]$$

The receiving unit 21 receives, as an adjacent signal sequence, a transmission symbol sequence having passed through a transmission channel (not shown). In the seventh embodiment, the receiving unit 21 is formed of a receiving amplifier with a saturation input/output characteristic. Alternatively, an analog-to-digital (A/D) converter of a limited level is interposed between the IDFT 11 and the output of the receiving unit 21. The amplitude detector 22 detects distorted signals included in the output signals of the receiving unit 21. However, the amplitude detector 22 cannot detect the amplitude of a large-amplitude signal that is not distorted. When there exists such a receiving amplifier of a saturation input/output characteristic or level-limited AD converter as stated above, if the output signals of the IDFT 11 include a so-called large-amplitude signal having an amplitude larger than a value determined by the receiving amplifier or AD converter, the amplitude detector 22 cannot detect the accurate amplitude of the large-amplitude signal. This will be described with reference to FIGS. 15A, 15B and 15C.

Assuming that an ideal transmission channel that is free from noise, multipath fading, etc., if a boundary between the two symbols is detected at correct timing in the symbol sequence received by the multi-carrier receiver 20, i.e., if accurate symbol synchronization is performed, the following is established concerning the time-based signal:

$$x_k = y_k (k=0, 1, \ldots, 7) \quad [B4-1]$$

Similarly, the following is established concerning the frequency-based signal:

$$X_k = Y_k (k=0, 1, \ldots, 7) \quad [B4-2]$$

Since each input and corresponding output of a DFT is in a one for one relationship, if the equations concerning the input or output are established, the other equations are also established. On the other hand, if signal transmission is not in synchrony with signal reception, i.e., if symbol synchronization is not established, the above equations [B4-1] or [B4-2] are not established.

Accordingly, when an ideal transmission channel is used, constraints given by the following equations are established between the received signals $y_0, y_1, \ldots, y_7$ from the equations [B3-1], [B3-2] and [B4-1]:

$$y_0 + y_2 + y_4 + y_6 = 0 \quad [B5-1]$$

$$y_1 + y_3 + y_5 + y_7 = 0 \quad [B5-2]$$

The determination unit 23 determines, in units of transmission symbols, which one of the eight signals received by the receiving unit 21 is a large-amplitude signal (i.e., which signal is distorted), and executes a predetermined process based on the determination result. If a large-amplitude signal is included in the received signals, the constraints given by the equations [B5-1] and [B5-2] are used to determine whether the received signal determined to be a large-amplitude signal can be replaced with a received signal determined not to be a large-amplitude signal. For example, if the amplitude detector 22 determines that $y_1$ and $y_4$ are large-amplitude signals as shown in FIG. 14, $y_1$ and $y_4$ can be replaced with other signals in the following manners, using the equations [B5-1] and [B5-2]:

$$y_4 = -y_0 - y_2 - y_6 \quad [B6-1]$$

$$y_1 = -y_3 - y_5 - y_7 \quad [B6-2]$$

Thus, $y_1$ and $y_4$ can be replaced with $y_0, y_2, y_3, y_5, y_6$ and $y_7$ determined not to be large-amplitude signals. Since it is considered that the signals determined not to be large-amplitude signals are correctly received ones, they are reliable signals. On the other hand, it is considered that the received signals $y_1$ and $y_4$ determined to be large-amplitude signals are distorted and different from the original. This means that they are not reliable signals. If the received signals $y_1$ and $y_4$ can be replaced with other reliable signals as indicated by the equations [B6-1] and [B6-2] acquired from the equations [B5-1] and [B5-2], it is considered that they are corrected. Thus, reliable signals can be acquired if any received signal determined to be a large-amplitude signal can be replaced with received signals determined not to be large-amplitude signals, using a constraint.

Further, assume that received signals determined to be large-amplitude signals cannot be replaced with received signals determined not to be large-amplitude signals, using constraints. In this case, the determination unit 23 performs the following. The number of unreliable received signals is minimized in a pre-process, using a constraint, whereby a particular one of the output signals of the DFT 25 is input to the IDFT 26, and one of the output signals of the IDFT 26 that corresponds to each unreliable received signal is input to the DFT 25. Particulars concerning this process will be described later with reference to FIGS. 16 and 17. If this process is repeated a predetermined number of times, any unreliable received signal can be replaced with a reliable one. However, unless the number of no-information signals set in one transmission symbol is larger than that of pre-processed signals (i.e., the number of unreliable received signals), it is not guaranteed whether all received signals can be replaced with respective reliable signals. This problem of guarantee will be described later with reference to FIG. 18.

The switch unit 24 uses constraints established between received signals to replace received signals determined to be large-amplitude signals with received signals determined not to be large-amplitude signals. For instance, in the case of FIG. 14, the received signal $y_1$ is replaced with the right part of the equation [B6-2], while $y_4$ is replaced with the right part of the equation [B6-1]. The switch unit 24 receives, from the determination unit 23, a result of determination as to whether which one(s) of the received signals is a large-amplitude signal, and replaces the large-amplitude received signal(s), using the constraints.

The DFT 25 subjects a signal sequence to discrete Fourier transform, and outputs the resultant modulated signals as output signals. Assuming that the input and output signals of the DFT 25 are $y_0, y_1, \ldots, y_7$ and $Y_0, Y_1, \ldots, Y_7$, respectively, the input and output signals have the following relationship:

$$Y_k = y_0 + W_8^{1k} y_1 + W_8^{2k} y_2 + \ldots + W_8^{7k} y_7 \quad [B7]$$

(k=0, 1, ..., 7)

The IDFT 26 receives the output signals of the DFT 25, subjects them to inverse discrete Fourier transform, and outputs those of the transformed signals that correspond to the received signals determined to be large-amplitude signals by the amplitude detector 22. In the example of FIG. 14, for example, the output signals $Y_0, Y_1, \ldots, Y_7$ of the DFT 25 are input as input signals $U_0, U_1, \ldots, U_7$ to the IDFT 26. Since $Y_0=0$ and $Y_4=0$ from the equations [B2] and [B4-2], $U_0=0$ and $U_4=0$. Assuming that the output signals of the IDFT 26 corresponding to $U_0, U_1, \ldots, U_7$ are $u_0, u_1, \ldots, u_7$, the input and output signals of the IDFT 26 have the following relationships:

$$u_k = (1/8)(U_0 + W_8^{-k} U_1 + W_8^{-2k} U_2 + \ldots + W_8^{-7k} U_7) \quad [B8]$$

(k=0, 1, ..., 7)

The signals included in $u_k$ (k=0, 1, ..., 7) and determined to be large-amplitude signals by the amplitude detector 22 are output to the DFT 25. In the example of FIG. 14, since the received signals $y_1$ and $Y_4$ determined to be large-amplitude signals are already replaced with reliable signals in the pre-process using constraints, it is not necessary to correct the received signals $y_1$ and $y_4$ using the IDFT 26. In this case, the determination unit 23 supplies the controller 28 with a control signal indicating that the IDFT 26 should be turned off. The controller 28, in turn, outputs a control signal to the IDFT 26 to turn off the IDFT 26.

The memory 27 stores the levels (e.g. amplitudes) of all signals output from the IDFT 26. The memory 27 is used to monitor any signal level that is input from the IDFT 26 to the DFT 25 and processed by the DFT 25, and stores signal levels so that which one of the is received signals included in each transmission symbol is indicated by one of the signal levels. More specifically, concerning each transmission symbol, the memory 27 stores two signals, i.e., a signal that has been just processed by the IDFT 26 and output from the DFT 25, and a signal output from the DFT 24 and having processed by the IDFT 26 a number of times (including 0 time) smaller by one time than the first-mentioned signal.

The controller 28 receives the two output signal levels and calculates the absolute value of the difference therebetween. If the absolute value of the difference is not higher than a predetermined value, the controller 28 supplies the IDFT 26 with a signal for turning off the IDFT 26. The controller estimates the degree of correction performed by the IDFT 26 on received signals determined to be large-amplitude signals (i.e., determined to be distorted signals), thereby determining when the process of operating the IDFT 26 should be stopped.

Alternatively, the time when the process of operating the IDFT 26 is stopped may be determined from the number of occasions in which the IDFT 26 and/or DFT 25 is operated for each transmission symbol. The controller 28 supplies the DFT 25 and IDFT 26 with respective operation signals for causing them to operate. The controller 28 includes, for example, a counter for holding the number of occasions in which each operation signal is output, and where each operation signal is output. As a result, the controller 28 can monitor the number of occasions in which each operation signal is output for each transmission symbol.

The above-described structure can correct any large-amplitude received signal (i.e., any distorted received signal), thereby providing accurate received signals.

Figure 15A:
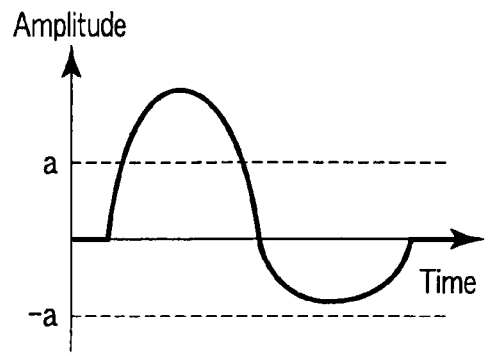
FIG. 15A is a graph illustrating the relationship between the time before an input signal is input to a receiving unit including a non-linear circuit, and the amplitude of the input signal.
Figure 15B:
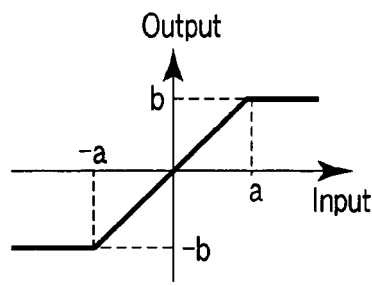
FIG. 15B is a graph illustrating the input/output characteristic of a non-linear circuit having a saturation characteristic (clipping characteristic)
Figure 15C:
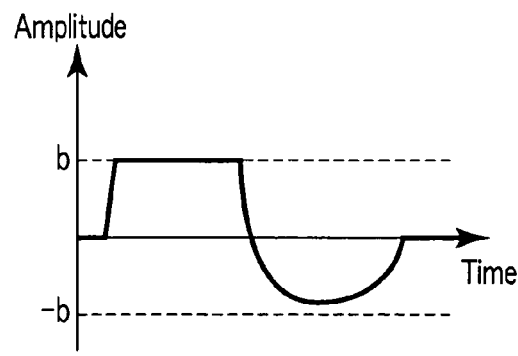
FIG. 15C is a graph illustrating the relationship between the time and the amplitude of a signal output from the receiving unit including the non-linear circuit.

Referring now to FIGS. 15A, 15B and 15C, a description will be given of the mechanism of occurrence of a distorted received signal detected by the amplitude detector 22. FIG. 15A is a graph illustrating the relationship between the time before an input signal is input to the receiving unit 21 including a non-linear circuit, and the amplitude of the input signal. FIG. 15B is a graph illustrating the input/output characteristic of a non-linear circuit having a saturation characteristic (clipping characteristic). FIG. 15C is a graph illustrating the relationship between the time and the amplitude of a signal output from the receiving unit 21 including the non-linear circuit.

If the receiving unit 21 has a non-linear circuit of a clipping characteristic as shown in FIG. 15B, and if the input signal level of the non-linear circuit is higher than a value of a, the output signal level of the non-linear circuit always becomes a value of b. Further, if the input signal level of the non-linear circuit is higher than a value of −a, the output signal level of the non-linear circuit always becomes a value of −b. Accordingly, if the signal as shown in FIG. 15A is input to a non-linear circuit of the clipping characteristic as shown in FIG. 15B, the signal as shown in FIG. 15C is output from the non-linear circuit. When the amplitude detector 22 detects a signal having a non-smooth portion (more particularly, a non-differentiable portion) as shown in FIG. 15C, it determines that the signal is a distorted received signal.

On the other hand, if the input signal level of the non-linear circuit falls between −a and a, an output signal level proportional to the input signal level is output. For example, in FIG. 15A, the signal portion having a negative amplitude that falls between −a and a is output as a smooth signal portion that reproduces the original input signal, as is shown in FIG. 15C.

Figure 16:
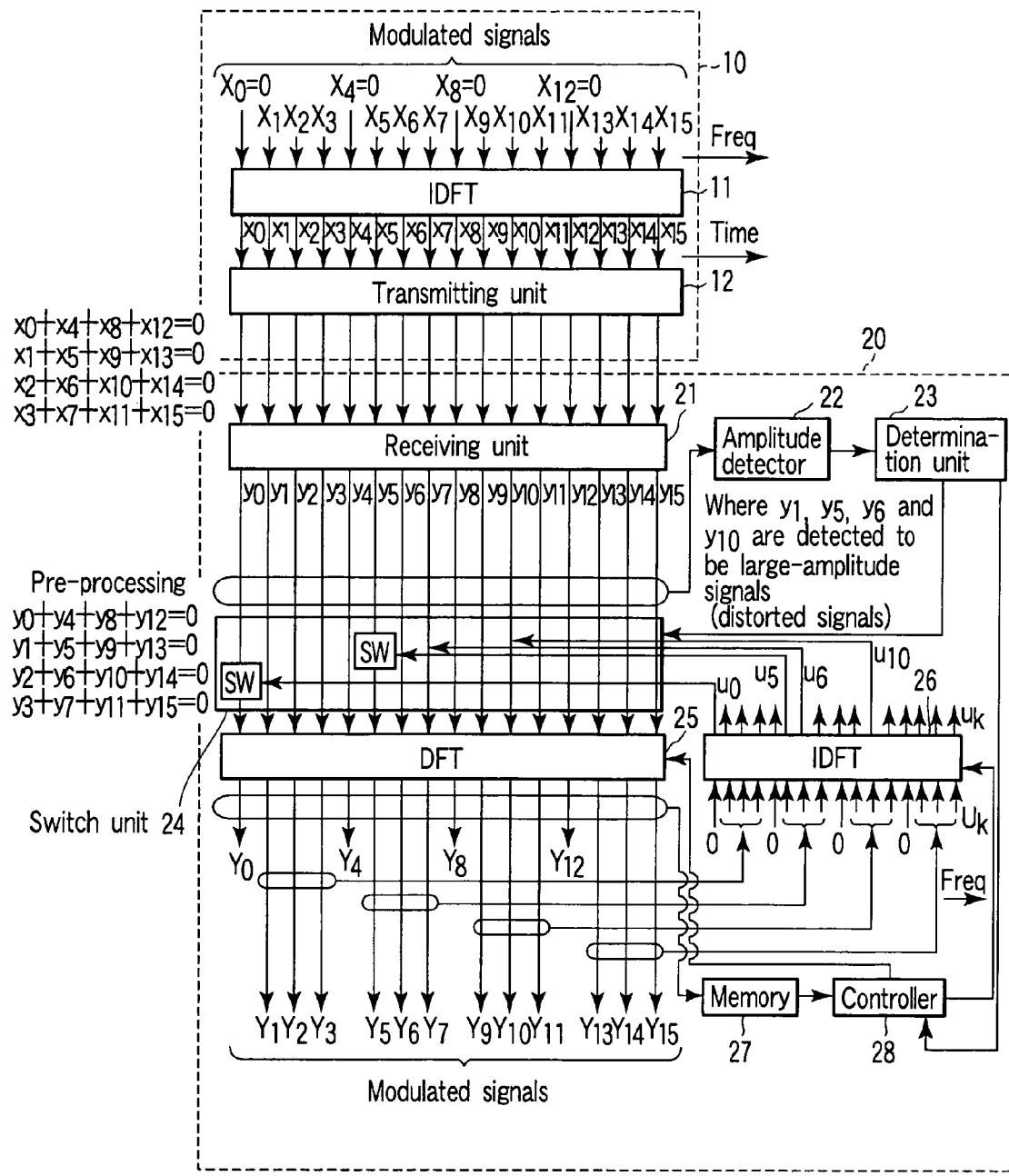
FIG. 16 is a block diagram illustrating a structural example used for performing pre-processing and correcting for a received signal utilizing an IDFT.

In the example described so far with reference to FIG. 14, each unreliable received signal can be corrected simply by a pre-process. A description will now be given of a case where signal correction is performed not only by the pre-process but also by the use of the IDFT 26, referring to FIG. 16. FIG. 16 is a block diagram illustrating a structural example used for performing the pre-process and correcting received signals utilizing the IDFT 26. The block diagram of FIG. 16 differs from that of FIG. 14, in that in the former, each transmission symbol processed by the multi-carrier transmitter 10 and multi-carrier receiver 20 includes sixteen signals. Accordingly, in the case of FIG. 16, each of the IDFT 11, transmitting unit 12, receiving unit 21, DFT 25 and IDFT 26 has sixteen input/output points.

In the example of FIG. 16, the IDFT 11 receives sixteen modulated signals as input signals, subjects them to inverse discrete Fourier transform, and outputs the transformed modulated signals as output signals. If the input signals of the IDFT 11 are defined as $X_0, X_1, \ldots, X_{15}$, the output signals are defined as $x_0, x_1, \ldots, x_{15}$, and $W_{16} = \exp(-j2\pi/16)$, $j^2 = -1$, the relationship between the input and output signals is given by $$x_k = (1/16)(X_0 + W_{16}^{-k}X_1 + W_{16}^{-2k}X_2 + \ldots + W_{16}^{-15k}X_{15}) \quad [B9]$$

$(k=0, 1, \ldots, 15)$

In the example of FIG. 16, four input signals included in input signals $X_0, X_1, \ldots, X_{15}$ of the IDFT 11 are set to no-information signals as expressed by the following equations:

$$X_0=0, X_4=0, X_8=0, X_{12}=0 \quad [B10]$$

If these values of X are substituted into the equations [B9], constraints expressed by the following equations [B11-1] to [B11-4] are established between the output signals of the IDFT 11, as is also given by equations [B26] recited later:

$$x_0+x_4+x_8+x_{12}=0 \quad [B11-1]$$

$$x_1+x_5+x_9+x_{13}=0 \quad [B11-2]$$

$$x_2+x_6+x_{10}+x_{14}=0 \quad [B11-3]$$

$$x_3+x_7+x_{11}+x_{15}=0 \quad [B11-4]$$

Assuming that an ideal transmission channel that is free from noise, multipath fading, etc., as in the case of FIG. 14, if a boundary between the two symbols is detected at correct timing in the symbol sequence received by the multi-carrier receiver 20, i.e., if accurate symbol synchronization is performed, the following is established concerning the time-based signal:

$$x_k = y_k (k=0, 1, \ldots, 15) \quad [B12-1]$$

Similarly, the following is established concerning the frequency-based signal:

$$X_k = Y_k (k=0, 1, \ldots, 15) \quad [B12-2]$$

Since each input and corresponding output of a DFT is in a one for one relationship, if the equations concerning the input or output are established, the other equations are also established. On the other hand, if signal transmission is not in synchrony with signal reception, i.e., if symbol synchronization is not established, the above equations [B12-1] or [B12-2] are not established.

Accordingly, if the transmission channel is an ideal one, constraints expressed by the following equations are established between the received signals $y_0, y_1, \ldots, y_{15}$ from the above equations [B11-1] to [B11-4], [B12-1] and [B12-2]:

$$y_0+y_4+y_8+y_{12}=0 \quad [B13-1]$$

$$y_1+y_5+y_9+y_{13}=0 \quad [B13-2]$$

$$y_2+y_6+y_{10}+y_{14}=0 \quad [B13-3]$$

$$y_3+y_7+y_{11}+y_{15}=0 \quad [B13-4]$$

In the example of FIG. 16, the amplitude detector 22 determines that the received signals $y_0$, $y_5$, $y_6$ and $y_{10}$ are large-amplitude signals. The received signals $y_0$ and $y_5$ can be appropriately corrected using the equations [B13-1] and [B13-2], as in the case of FIG. 14. In other words, the received signals $y_0$ and $y_5$ can be replaced with reliable signals. However, each of the received signals $y_6$ and $y_{10}$ cannot be corrected since they are both included in the equation [B13-3]. Therefore, in this example, the IDFT 26 is used to correct the received signals $Y_6$ and $y_{10}$.

To correct the received signals $Y_6$ and $y_{10}$, the determination unit 23 operates the DFT 25 and IDFT 26 via the controller 28. Assume that the frequency-based input signals of the IDFT 26 are $U_0, U_1, \ldots, U_{15}$, and the time-based output signals of the IDFT 26 are $u_0, u_1, \ldots, u_{15}$.

(Step 1) Received signal $Y_k$ ($k=0, 1, \ldots, 15$) is expressed by the following:

$$U_k = Y_k (k=0, 1, \ldots, 15) \quad [B14]$$

Further, from the equations [B10] and [B12-1], the followings are established:

$$U_0=0, U_4=0, U_8=0, U_{12}=0 \quad [B15]$$

After that, the IDFT 26 executes an IDFT operation to generate $u_0, u_1, \ldots, u_{15}$. Among $u_0, u_1, \ldots, u_{15}$, only $u_6$ and $u_{10}$ corresponding to the to-be-corrected $y_6$ and $y_{10}$ are output to the DFT 25. That is, the following is established:

$$y_6 = u_6, y_{10} = u_{10} \quad [B16]$$

(Step 2) The received signals $y_6$ and $y_{10}$ are input to the DFT 25 after they are processed using the equations [B16]. Concerning the other received signals $y_0, y_1, y_2, y_3, y_4, y_5, y_7, y_8, y_9, y_{11}, y_{12}, y_{13}, y_{14}$ and $y_{15}$, i.e., the pre-processed signals and the reliable signals that do not have to be pre-processed, the outputs of the receiving unit 21 are directly input to the DFT 25. The DFT 25 performs DFT operations on those input signals.

By the repetition of the steps 1 and 2, the received signals $Y_0, Y_4, Y_8$ and $Y_{12}$ become closer to 0. This is equivalent to that the received signals $Y_6$ and $Y_{10}$ become closer to their respective levels assumed before the signals are distorted. Thus, repetition of the steps 1 and 2 enables acquisition of the levels of the signals assumed before they are distorted.

As shown in FIG. 17, DFT and IDFT operations are repeated to eliminate distortions, based on the time-based constraint that the received signals other than the received signals $y_6$ and $y_{10}$ are not distorted, i.e., the actual levels of the received signals other than the received signals $y_6$ and $y_{10}$ are known, and the frequency-based constraint that $y_6=0$, $y_4=0$, $y_8=0$, $Y_{12}=0$, and the actual levels of the received signals other than the received signals $Y_6$ and $Y_{10}$ are known.

FIG. 17 is a view illustrating the operations for eliminating distortions in each distorted received signal.

This principal is described as a method for correcting a degraded image signal in, for example, the following documents 1 and 2:

1. A. Papoulis, "A new algorithm in spectrum analysis and band-limited extrapolation", IEEE Trans. Circuits & Syst., vol. CAS-22, No. 9, pp. 735-742, Septmeber 1975

2. S. Kawada and Y. Ichioka, "Iterative image restoration for linearly degraded images", J. Opt., Soc. Am., vol. 70, No. 7, pp. 762-768, July 1980

These documents describe image signal correcting methods in which DFT and IDFT operations are repeated based on time-based and frequency-based constraints, thereby correcting degraded image signals.

From these documents, the following is understood: When the frequency-based input signals of the IDFT of a transmitter include N no-information signals, the constraint that the frequency-based output signals of the DFT of a receiver include N no-information signals occurs. If predetermined operations are executed using, as unknown signals, the maximum number N distorted signals included in the time-based input signals of the IDFT of the receiver, the unknown signals can be corrected. Therefore, actually, in the case of, for example, FIG. 14 where N=2 and two distorted received signals exist, the distorted received signals can be corrected simply by executing the above-described steps, i.e., without pre-processing. Similarly, in the case of FIG. 16, where N=4 and four distorted received signals exist, the distorted received signals can be corrected simply by executing the above-described steps, i.e., without pre-processing.

However, in the case of correcting a received signal by pre-processing, simple numerical value replacement is performed. Therefore, the required processing speed and throughput are significantly lower than in the case of executing the above-described steps. Even in the case of executing the above-described steps, the smaller the number of to-be-corrected received signals, the earlier the correction process is finished, i.e., the smaller the number of repetitions of the steps. Thus, it is preferable that the above steps be executed when necessary after pre-processing is performed as far as possible.

It has been assumed so far that the transmission channel is an ideal one. In actual transmission channels, however, noise may well exist. Therefore, it is necessary to determine whether the transmission channel is an ideal one. For noise determination, some of the equations [B13-1] to [B13-4] as constraints are utilized. In the case of FIG. 16, since $y_0, y_5, y_6$ and $y_{10}$ are distorted received signals, the equations [B13-4] are relational expressions that are related only to received signals of reliable levels, i.e., non-distorted received signals. Accordingly, if the equation [B13-4] is not established, i.e., if $y_3+y_7+y_{11}+y_{15} \neq 0$, it is estimated that there is an influence of noise in the transmission channel. Since the equation [B13-4] is established in an ideal channel, it is considered that the closer to 0 the left part of the equation [B13-4], the lower the level of noise. Conversely, the remoter from 0, the higher the level of the noise. In light of this, the degree of influence of noise can be determined from a value of power at which any constraint, which is established between received signals that are detected in an ideal transmission channel, is not established. In this case, the influence of noise is determined from whether the value v of $(y_3+y_7+y_{11}+y_{15})$ is high or low.

For example, if v is less than a certain value, noise is considered to be low, and the transmission channel 30 is regarded as ideal. After that, the received signals $y_0, y_1$ and $y_{15}$ are replaced, as pre-processing, with other appropriate signals, using the equations [B13-1] to [B13-4], thereby appropriately correcting the distorted received signals $y_0$ and $y_5$. On the other hand, if v is not less than the certain value, noise is considered to be high, thereby determining that the transmission channel cannot be regarded as ideal, and performing no pre-processing that uses the equations [B13-1] to [B13-4]. In this case, noise is too high to estimate that the constraints are established. The value v is preset in accordance with, for example, the level of a signal transmitted from a transmitter, or the performance of a receiver.

If it is determined that the noise level in the transmission channel is high and hence pre-processing cannot be performed, the above-described steps 1 and 2 are repeated without executing pre-processing. Since pre-processing is not executed, replacement in the equations [B16] is not performed. Thus, any received signal detected as a large-amplitude signal (distorted signal) by the amplitude detector 22 is corrected.

Figure 18:
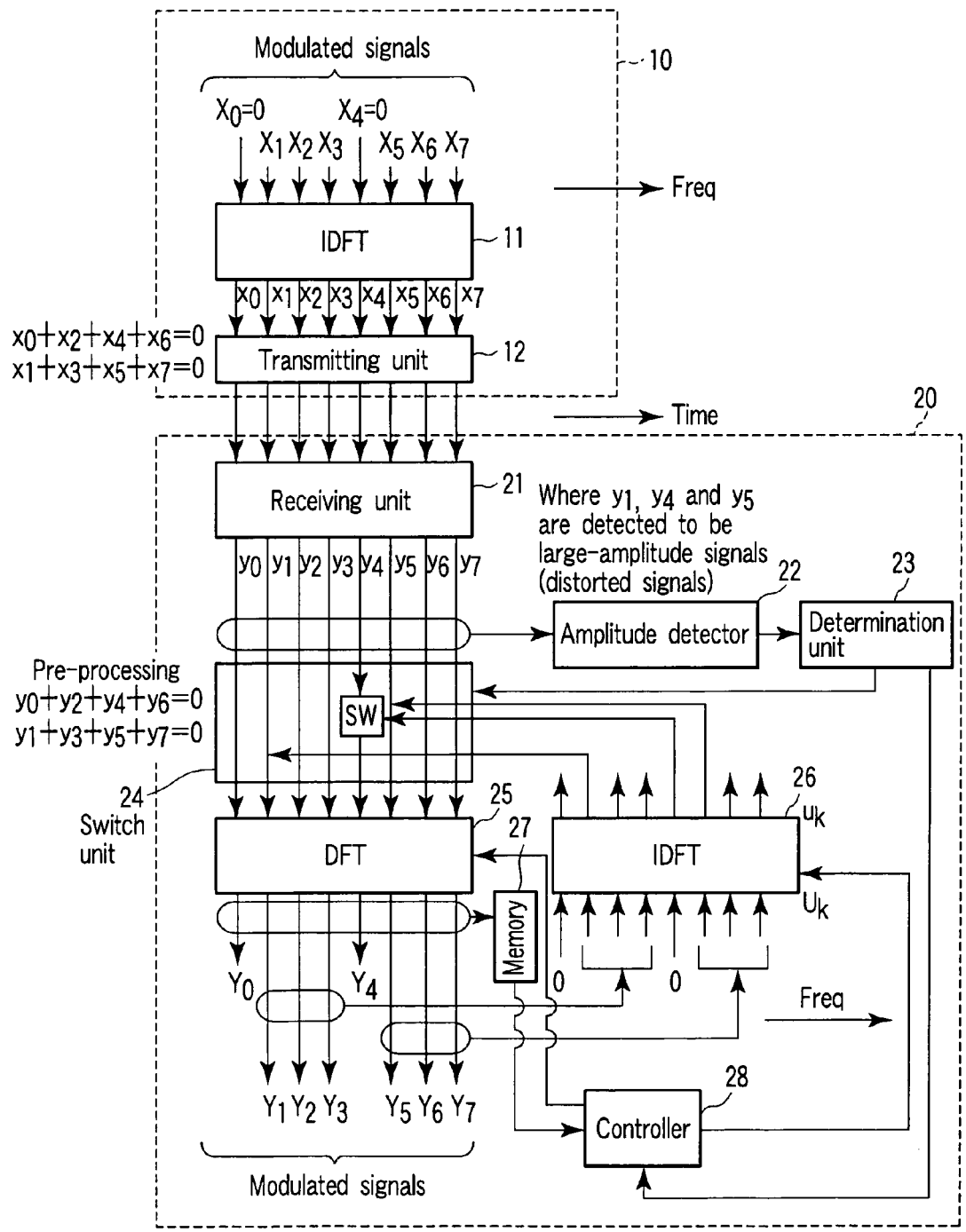
FIG. 18 is a block diagram illustrating an example where it is detected that the received signal $y_s$ appearing in FIG. 14 is distorted.

In the above cases, the number of distorted received signals included in one transmission symbol is not more than the number of no-information signals included in one transmission symbol. Referring now to FIG. 18, a description will be given of a case where the number of distorted received signals included in one transmission symbol is more than the number of no-information signals included in one transmission symbol, for example, the former is 3 and the latter is 2. The example of FIG. 18 is similar to the example of FIG. 14 except that the received signals detected as large-amplitude signals (i.e., distorted signals) by the amplitude detector 22 are $y_1, y_4$ and $y_5$. In the description below, only the points differing from those in the example of FIG. 14 will be described in detail.

The receiving unit 21 of the multi-carrier receiver 20 receives, as received signals $y_0, y_1, \ldots, y_7$, a single transmission symbol transmitted from the multi-carrier transmitter 10. The equations [B5-1] and [B5-2] are established between the received signals. The amplitude detector 22 detects that $y_1, y_4$ and $y_5$ included in $y_0, y_1, \ldots, y_7$ are large-amplitude signals. The determination unit 23 determines that $y_1, y_4$ and $y_5$ are large-amplitude signals, and also determines whether each signal determined to be a large-amplitude one can be replaced with signals determined not to be large-amplitude signals. In the example of FIG. 18, the received signal $y_4$ can be replaced with only reliable signals (signals determined not to be large-amplitude ones), as is evident from the equations [B5-1] and [B6-1]. On the other hand, both $y_1$ and $y_5$ are both included in the equation [B5-2], and therefore cannot be replaced with only reliable signals.

Thus, three large-amplitude signals can be reduced to two large-amplitude signals by executing pre-processing. In the example of FIG. 18, one transmission symbol contains two no-information signals and it is considered that the number of large-amplitude signals (non-corrected signals) can be reduced to 2. Accordingly, the received signal $y_1$ and $y_5$ can be corrected by twice repeating the above-mentioned steps 1 and 2.

Figure 19A:
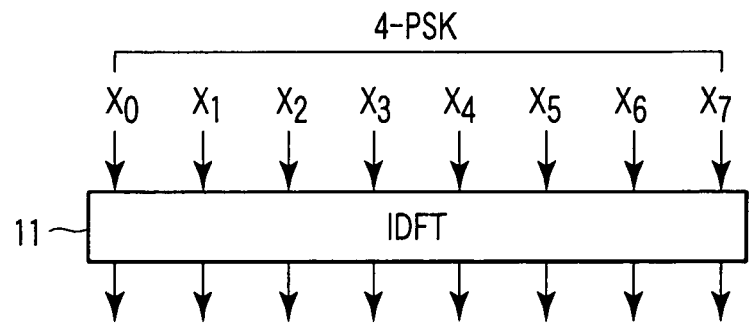
FIG. 19A is a view illustrating a case where modulated signals input to the IDFT appearing in FIG. 14 are all 4-PSK signals.
Figure 19B:
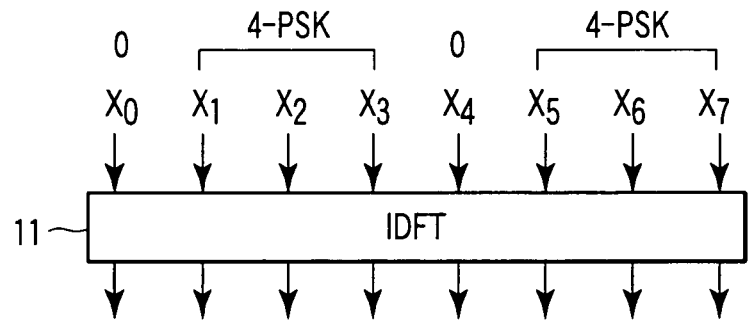
FIG. 19B is a view illustrating a case where two of the modulated signals shown in FIG. 19A are no-information signals, and the other six modulated signals are all 4-PSK signals.
Figure 19C:
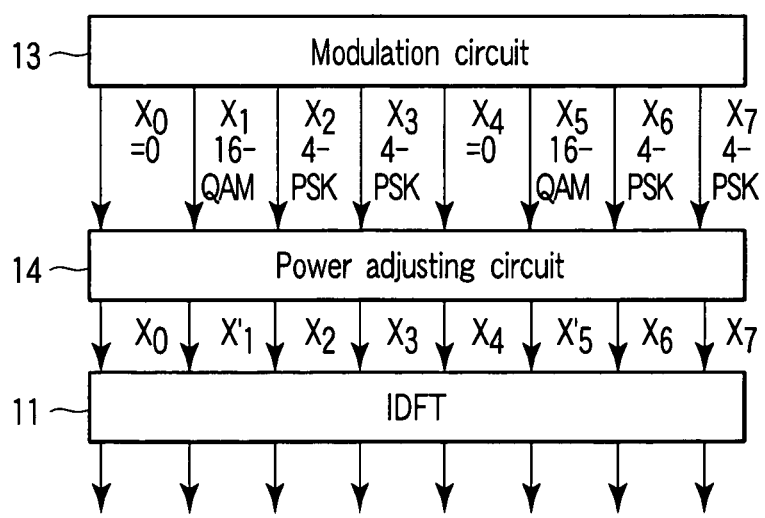
FIG. 19C is a view illustrating a case where two of the modulated signals shown in FIG. 19A are no-information signals, and other two modulated signals are 16-QAM signals.

Referring to FIGS. 19A, 19B and 19C, the transmission efficiency will be described. FIG. 19A is a view illustrating a case where modulated signals input to the IDFT appearing in FIG. 14 are all 4-PSK signals. FIG. 19B is a view illustrating a case where two of the modulated signals shown in FIG. 19A are no-information signals, and the other six modulated signals are all 4-PSK signals. FIG. 19C is a view illustrating a case where two of the modulated signals shown in FIG. 19A are no-information signals, and other two modulated signals are 16-QAM signals.

In the case shown in FIG. 19B where $X_0$ and $X_4$ included in the input signals $X_0, X_1, \ldots, X_7$ of the IDFT 11 are no-information signals, the transmission efficiency is lower by the transmission bits of the no-information signals $X_0$ and $X_4$ than the case shown in FIG. 19A where none of the input signals X0, X1, . . . , X7 are no-information signals.

In light of this, in the embodiment, when one input signal is set to a no-information signal, the modulation circuit 13 modulates, into a signal of a larger number of bits, one of the input signals of the IDFT 11 other than the no-information signal, as is shown in FIG. 19C. The modulation circuit 13 is a circuit for modulating an input signal into a modulated signal corresponding to a predetermined modulation scheme.

For instance, the modulation circuit 13 modulates a 4-PSK signal into a 16-QAM signal or 64-QAM signal, etc., which has a larger number of transmission bits than the former.

FIG. 19C shows an example, where the number of transmission bits is identical to that in the example of FIG. 19A where all input signals $X_0, X_1, \ldots, X_7$ are 4-PSK signals.

Since the number of transmission bits of a 16-QAM signal is double the number of transmission bits of a 4-PSK signal, two 4-PSK input signals are replaced with respective 16-QAM signals in the example of FIG. 19C where two input signals are no-information signals.

As above-mentioned, the embodiment is not limited to the use of the 16-QAM scheme as in the examples of FIG. 19C. For example, to make the number of transmission bits identical to that in the example of FIG. 19A, two 4-PSK signals included in $X_0, X_1, \ldots, X_7$ may be replaced with respective 8-PSK signals. Alternatively, one 4-PSK signal included in $X_0, X_1, \ldots, X_7$ may be replaced with a 64-QAM signal.

Further, if no-information signals are included in $X_0, X_1, \ldots, X_7$, and if the power is reduced by the number of the no-information signals, the resistance to errors is reduced. To prevent a reduction in resistance to errors, the embodiment employs a power-adjusting unit 14 for increasing the power of the modulated signals $X_1'$ and $X_5'$ of the 16-QAM scheme in order to make the total power of $X_0, X_1', \ldots, X_5', \ldots, X_7$ shown in FIG. 19C identical to that of $X_0, X_1, \ldots, X_7$ shown in FIG. 19A. If the former total power can be made identical to the latter, the resistance to errors can be made identical.

As described above, some of the IDFT input signals can be set to no-information signals without degrading the resistance to errors and without reducing the number of transmission bits per one symbol. In other words, the modulation scheme and power can be set on condition that the input signals of the IDFT 11 have the same number of bits and the same power.

However, if a reduction in the number of transmission bits by setting a certain 4-PSK input signal of the IDFT 11 to a level of 0 is allowed, it is not necessary to change the modulation scheme for another input signal to another multi-value modulation scheme. It is sufficient if the modulation scheme is kept at the 4-PSK scheme. Further, if a reduction in error ratio due to a change in modulation scheme for a certain input signal is allowed, no power adjustment is needed.

The number of no-information signals included in each transmission symbol input to the IDFT 11 can be changed in accordance with the state of the transmission channel. This will be explained referring to FIGS. 20A and 20B. FIG. 20A is a block diagram illustrating a multi-carrier transmission system in which a transmission channel from a base station 50 to a terminal 40 differs from that from the terminal 40 to the base station 50. FIG. 20B is a block diagram illustrating a multi-carrier transmission system in which a transmission channel from a base station 70 to a terminal 60 is identical to that from the terminal 60 to the base station 70.

The terminal 40 or the base station 70 detects the state of the transmission channel, and controls the modulation circuit contained in an OFDM transmitter 52 or 73. For example, if the multipath delay time is long, the base station controls the modulation circuit contained in the OFDM transmitter 52 or 73 to increase the number of no-information signals to be inserted. On the other hand, if the multipath delay time is short, the base station controls the modulation circuit to reduce the number of no-information signals to be inserted. The base station detects the state of the transmission channel in the manner stated below.

FIG. 20A illustrates frequency division duplex (FDD) communication in which up-link and down-link transmission channels are used between the base station 50 and terminal 40. In this case, when OFDM transmission is performed from the base station 50 to the terminal 40 using the down-link transmission channel, the base station 50 instructs the terminal 40 to inform the base station of the transmission condition for the down-link transmission channel via the up-link transmission channel. Based on the transmission condition for the down-link transmission channel supplied from the terminal 40, the base station 50 executes OFDM transmission.

More specifically, for instance, in the terminal 40, a down-link transmission channel estimation unit 42 estimates the state of the down-link transmission channel based on a signal received by the OFDM receiver 41. Subsequently, a transmitter 43 transmits, to the base station 50, information concerning the state of the down-link transmission channel estimated by the estimation unit 42. In the base station 50, a receiver 51 receives the information concerning the state of the down-link transmission channel, and outputs the information to the OFDM transmitter 52. The OFDM transmitter 52 transmits a signal to the terminal 40, based on the input information concerning the state of the down-link transmission channel.

On the other hand, FIG. 20B illustrates time division duplex (TDD) communication in which only a single transmission channel is used as both an up-link transmission channel and down-link transmission channel between the base station 70 and terminal 60. In this case, when OFDM transmission is performed from the base station 70 to the terminal 60, the base station 70 detects a transmission condition for the down-link transmission channel, from the characteristics of a signal received. Based on the detected transmission condition for the down-link transmission channel, the base station 70 executes OFDM transmission.

More specifically, for instance, in the base station 70, a down-link transmission-channel estimation unit 72 estimates the state of the down-link transmission channel from a signal received by a receiver 71. Based on the estimated state, the OFDM transmitter 73 transmits a signal to the terminal 60.

In the cases shown in FIGS. 14, 16 and 18, reverse discrete Fourier converters having eight or sixteen input/output points are employed. A description will now be given of an IDFT having M input/output points ($M=2^m$; m is a positive integer).

In the multi-carrier transmitter 10, every $k^{th}$ signal that is included in the input signals $X0, X1, \ldots, X_{M-1}$ of the IDFT with the M ($M=2^m$) input/output points and begins from $X_L$, i.e., $X_{L+pK}$ ($L=0, 1, \ldots, K-1; p=0, 1, \ldots, N-1; M=KN; N=2^n$) is set to a no-information signal.

Assuming that the input signals of the IDFT are $X_0, X_1, \ldots, X_{M-1}$, the output signals of the IDFT are $x_0, x_1, \ldots, x_{M-1}$ (M=8 in the cases of FIGS. 14 and 18, and M=16 in the case of FIG. 16), $W_M = \exp(-j2\pi/M)$, and $j^2 = -1$, the relationship between the input and output signals is given by $$x_k = \quad\quad [\text{B17}]$$
$$(1/M)\left(X_0 + W_M^{-k} X_1 + W_M^{-2k} X_2 + \ldots + W_M^{-(M-1)k} X_{M-1}\right)$$

($\underline{k}$ represents an integer, and $0 \leq k \leq M-1$)

Further, $u_p$ is defined for the output signals $x_0, x_1, \ldots, x_{M-1}$ of the IDFT, using the following equations:

$$u_p = W_M^{pi} x_p + W_M^{(p+N)i} x_{p+N} + \quad\quad [\text{B18}]$$
$$W_M^{(p+2N)i} x_{p+2N} + \ldots + W_M^{(p+(K-1)N)i} x_{p+(K-1)N}$$

($\underline{p}$ represents an integer, and $0 \leq p \leq N-1$)

If $u_0, u_1, \ldots, u_{N-1}$ is input to a DFT with N input points, the output signal $U_k$ (k represents an integer, and $0 \leq k \leq M-1$) of the DFT is given by $$U_k = u_0 + W_N^k u_1 + W_N^{2k} u_2 + \ldots + W_N^{(N-1)k} u_{N-1} \quad [B19]$$

where $W_N = \exp(-j2\pi/N) = W_M^K$. Using the equations [B19], the equations [B20] can be modified as follows:

$$U_k = x_0 + W_M^{(i+kK)} x_1 + W_M^{2(i+kK)} x_2 + \ldots + W_M^{(M-1)(i+kK)} x_{M-1} \quad [B20]$$

On the other hand, if $x_0, x_1, \ldots, x_{M-1}$ is input to a DFT with M input points, the output signal $X_k$ (k represents an integer, and $0 \leq k \leq M-1$) of the DFT is given by $$X_k = x_0 + W_M^k x_1 + W_M^{2k} x_2 + \ldots + W_M^{(M-1)k} x_{M-1} \quad [B21]$$

From the equations [B20] and [B21], the followings are acquired:

$$X_{i+pK} = U_p \quad [B22]$$

(p=0, 1, ..., N−1, i=0, 1, ..., K−1)

In the equations [B22], if $X_{i+pk} = U_p = 0$, the output signal $u_p$ of an IDFT with N input/output points assumed when $U_0, {}_1, \ldots, U_{N-1}$ are input thereto is naturally $u_p = 0$ (p=0, 1, ..., N−1). Accordingly, from the equations [B18], the followings are acquired:

$$W_M^{pL} x_p + W_M^{(p+N)L} x_{p+N} + \quad [B23]$$
$$W_M^{(p+2N)L} x_{p+2N} + \ldots + W_M^{(p+(K-1)N)L} x_{p+(K-1)N} = 0$$
$$(p = 0, 1, \ldots, N-1; L = 0, 1, \ldots, K-1)$$

Each of the left and right parts of each of the equations [B23] is divided by $W_M^{pL}$. Further, if $W_M^{pL} = \exp(-j2\pi N/M) = \exp(-j2\pi/K) = W_K$ is considered, then the following equations are acquired from the above equations [B23]:

$$x_p + W_K^L x_{p+N} + W_K^{2L} x_{p+2N} + \ldots + W_K^{(K-1)L} x_{p+(K-1)N} = 0 \quad [B24]$$
$$(p = 0, 1, \ldots, N-1; L = 0, 1, \ldots, K-1)$$

These equations [B24] are use as a constraint on the output signals of the IDFT with the M input/output points when $X_{L+pk}$ (L=0, 1, ..., K−1; p=0, 1, ..., N−1; M=KN, N=$2^n$) is set to a level of 0.

If, for example, L=0, the following is acquired:

$$x_p + x_{p+N} + x_{p+2N} + \ldots + x_{p+(K-1)N} = 0 \quad [B25]$$

(p=0, 1, ..., N−1)

These are constraints on the systems shown in FIGS. 14, 16 and 18. If, for example, M=16 and N=4, K is 4, and accordingly the equations [B25] become:

$$x_p + x_{p+4} + x_{p+8} + x_{p+12} = 0 \quad [B26]$$

(p=0, 1, 2, 3)

Thus, the equations [B26] are equivalent to the equations [B11-1] to [B11-4] derived in the seventh embodiment.

From the equations [B24], the relationships expressed by the following equations are established between M serial received signals $y_0, y_1, \ldots, y_{M-1}$:

$$y_p + W_K^L y_{p+N} + W_K^{2L} y_{p+2N} + \ldots + W_K^{(K-1)L} y_{p+(K-1)N} = 0 \quad [B27]$$
$$(p = 0, 1, \ldots, N-1; L = 0, 1, \ldots, K-1)$$

Using the equations [B27], maximum number N large-amplitude received signals can be corrected.

Large-amplitude received signals are subjected to pre-processing that uses the equations [B27], and any received signal that cannot be corrected by pre-processing is subjected to the above-described steps.

As described above, even if a receiver having a saturation characteristic is used, received signals free from distortion can be acquired. Further, if the frequency-based input signals of the IDFT of a transmitter include N no-information signals, the constraint that N signals included in the frequency-based output signals of the DFT of a receiver have a level of 0 occurs. In this case, when maximum number N distorted signals included in the time-based input signals of the IDFT of the receiver are regarded as unknown signals and corrected by repeating a certain operation, the number of repeated operations can be reduced by beforehand replacing some of the unknown signals with known signals using the IDFT input constraint. As a result, the entire signal process can be performed quickly.

Eigth Embodiment

Even in a standard OFDM transmission system, the input signals of the IDFT 11 may include a no-information signal. Referring then to FIGS. 21A and 21B, a description will be given of a case where a multi-carrier transmission system according to an eighth embodiment is applied to the OFDM transmission system. FIG. 21A is a view illustrating a case where those two of the modulated signals input to the IDFT 11, which are positioned at both ends, are no-information signals. FIG. 21B is a view illustrating a case where the positional relationship of the no-information signals shown in FIG. 21A is changed.

In the standard OFDM transmission system, when an IDFT having 2048 input/output points is used, there is a case where no signals are input to several hundreds of input points positioned at each end of the IDFT, i.e., no-information signals are input to those input points. FIG. 21A illustrates a typical case where input signals $X_0$ and $X_7$ at both ends are no-information signals. In the case of FIG. 21A, the constraint that the input signals located at the opposite ends are no-information signals exists, therefore two distorted received signals, at maximum, can be corrected by repeating the steps 1 and 2 described in the seventh embodiment. However, in the arrangement shown in FIG. 21A, in which every $A^{th}$ (A=2, 4, 8) signal is set to a no-information signal, the constraints on pre-processing described in the seventh embodiment are not satisfied. Accordingly, the speedup of the entire process as realized in the seventh embodiment is impossible.

Therefore, to establish the pre-processing constraints described in the seventh embodiment, the signal $X_4$ input to the IDFT 11 is set to a no-information signal as shown in FIG. 21B. In this case, if the transmission channel is an ideal one, the constraints expressed by the following equations are established between the input signals $y_k$ (k=0, 1, ..., 7) of the DFT of the receiver as in the seventh embodiment:

$$y_0+y_2+y_4+y_6=0 \quad [\text{B5-1}]$$

$$y_1+y_3+y_5+y_7=0 \quad [\text{B5-2}]$$

By using these constraints as pre-processing before executing the steps 1 and 2, distorted received signals can be corrected.

Furthermore, fast Fourier transformers (FFT) and inverse fast Fourier transformers (IFFT) may be utilized instead of all DFTs and IDFTs employed in the seventh and eighth embodiments.

Ninth Embodiment

Referring to FIG. 22, the configuration of a multi-carrier transmission system according to a ninth embodiment will be described. FIG. 22 is a block diagram illustrating the configuration of the multi-carrier transmission systems.

The multi-carrier transmission system of the embodiment at least comprises a multi-carrier transmitter 10 and multi-carrier receiver 20.

The multi-carrier transmitter 10 at least includes an inverse discrete Fourier transformer (IDFT) 11 and transmitting unit 12. The multi-carrier receiver 20 at least includes a receiving unit 21, extracting unit 22, four-point discrete Fourier transformer (4-DFT) 23, estimation circuit 24 and DFT 25. In the ninth embodiment, the IDFT 11 and DFT 25 each have eight inputs and outputs as shown in FIG. 22. However, the number of the inputs (outputs) of each of the IDFT 11 and DFT 25 is not limited to 8, but may be set to an arbitrary value. Concerning this point, a detailed description will be given later using, for example, equations [C8].

The IDFT 11 receives eight modulated signals as input signals, subjects them to inverse discrete Fourier transform, and outputs the transformed modulated signals as output signals. If the input signals of the IDFT 11 are defined as $X_0, X_1, \ldots, X_7$, the output signals are defined as $x_0, x_1, \ldots, x_7$, and $W_8=\exp(-j2\pi/8)$, $j_2=1$, the relationship between the input and output signals is given by $$x_k=(1/8)(X_0+W_8^{-k}X_1+W_8^{-2k}X_2+\ldots+W_8^{-7k}X_7) \text{ (k=0, 1, ..., 7)} \quad [\text{C1}]$$

where, for example, $W_8^{-2k}=(W_8)^{-2k}$. The IDFT 11 transforms the modulated signals into those determined by the equations [C1].

The transmitting unit 12 uses, as one transmission symbol, the eight output signals $x_0, x_1, \ldots, x_7$ of the IDFT 11. Thus, the IDFT 11 successively generates transmission symbols, and the transmitting unit 12 transmits a sequence of transmission symbols.

In the seventh embodiment, two of the input signals of the IDFT 11 are set to no-information signals. More specifically, every $k^{th}$ signal included in the input signals $X_0, X_1, \ldots, X_{M-1}$ of the IDFT, and beginning from $X_L$, i.e., $X_{L+pK}$ (L=0, 1, ..., K-1; p=0, 1, ..., N-1; M=KN; N=$2^n$; m=3; n=1; accordingly, M=8, N=2 and K=4), is set to a no-information signal. In other words, $X_L$ and $X_{L+4}$ are set to no-information signals. Mathematically, the two input signals $X_0$ and $X_4$ of the IDFT are set to satisfy the following equations:

$$X_L=0, X_{L+4}=0 \quad [\text{C2}]$$

FIG. 22 shows a case where L=0. From the equations [C1] and [C2], constraints given by the following relational expressions [C3-1] and [C3-2] are established between the output signals of the IDFT 11 on condition that $W_4=\exp(-j2\pi/4)$, as indicated by equations [C15] used in a tenth embodiment, described later:

$$x_0+W_4^L x_2+W_4^{2L} x_4+W_4^{3L} x_6=0 \quad [\text{C3-1}]$$

$$x_1+W_4^L x_3+W_4^{2L} x_5+W_4^{3L} x_7=0 \quad [\text{C3-2}]$$

The receiving unit 21 receives, as an adjacent signal sequence of $y_0, y_1, \ldots, y_7$, a transmission symbol sequence having passed through a transmission channel 30. The extraction unit 22 receives the transmission symbol sequence from the receiving unit 21, extracts, therefrom, signal sequences of $y_p, y_{p+2}, y_{p+4}$ and $y_{p+6}$ (p: 0, 1), and outputs the extracted signal sequences to the 4-DFT 23. Assuming here that the transmission channel 30 is an ideal one free from noise, multipath fading, etc., if a boundary between the two symbols is detected at correct timing in the symbol sequence received by the multi-carrier receiver 20, i.e., if accurate symbol synchronization is performed, the following is established between the time-base signals:

$$x_k=y_k \text{ (k=0, 1, ..., 7)} \quad [\text{C4-1}]$$

Similarly, the following is established between the frequency-base signals:

$$X_k=Y_k, \text{ (k=0, 1, ..., 7)} \quad [\text{C4-2}]$$

Since, in general, each input and corresponding output of a DFT is in a one for one relationship, if the equations concerning the input or output are established, the other equations are also established. On the other hand, if signal transmission is out of synchrony with signal reception, i.e., if symbol synchronization is not established, the above equations [C4-1] or [C4-2] are not established.

The 4-DFT 23 has four input/output points and receives the signal sequence of $y_p, y_{p+2}, y_{p+4}$ and $y_{p+6}$. The 4-DFT 23 performs DFT transform on the signals to calculate $S_{P,L}$ using the following equations:

$$S_{p,L}=y_p+W_4^L y_{p+2}+W_4^{2L} y_{p+4}+W_4^{3L} y_{p+6} \text{ (p=0, 1)} \quad [\text{C5}]$$

Thus, the 4-DFT 23, receiving the signal sequence of $y_p, y_{p+2}, y_{p+4}$ and $y_{p+6}$, performs discrete Fourier transform concerning the signals input to the 4 (=K) input/output points, and outputs a signal sequence of $S_{p,0}, S_{p,1}, S_{p,2}$ and $S_{p,3}$. Since in the ninth embodiment, p=0, 1, the 4-DFT 23 performs four-point discrete Fourier transform twice (=N). The 4-DFT 23 outputs the calculated $S_{p,L}$ to the estimation circuit 24. $S_{p,L}=0$ (p=0, 1) is a constraint on the equations [C3-1] and [C3-2]. The estimation circuit 24 sequentially receives $S_{p,L}$ (p=0, 1; L=0, 1, 2, 3), thereby determining whether each $S_{p,L}$ is 0, and estimating the value of L. In other words, the estimation circuit 24 estimates the value of L that makes $S_{p,L}$ 0 when p=0, 1.

Accordingly, even if the multi-carrier receiver 20 cannot detect those two (=N) of the eight (=M) modulated signals input to the IDFT 11 of the multi-carrier transmitter 10, which are set to a level of 0, i.e., even if the receiver cannot detect the value of the non-negative integer L not higher than N−1 and included in the equations [C2], the estimation circuit 24 can estimate the value of L. Specifically, the estimation circuit 24 examines which ones of the four output signals $S_{p,0}, S_{p,1}, S_{p,2}$ and $S_{p,3}$ (p=0, 1) output when the four signals $y_p, y_{p+2}, y_{p+4}$ and $y_{p+6}$ are input to the 4-DFT 23 with four (=K) input/output points are 0, thereby estimating the value of L included in $S_{p,L}$ with the level of 0. Thus, the estimation circuit 24 can detect the two (=N) of the eight (=M) modulated signals input to the IDFT 11, which are set to a level of 0. This will be described later in more detail with reference to FIGS. 23A, 23B, 23C and 23D and 24.

The DFT 25 performs discrete Fourier transform on a signal sequence, and outputs the transformed signals as output signals. Assuming that the input and output signals of the DFT 25 are $y_0, y_1, \ldots, y_7$ and $y_0, y_1, \ldots, y_7$, respectively, the input and output signals have the following relationship:

$$Y_k = y_0 + W_8^k y_1 + W_8^{2k} y_2 + \ldots + W_8^{7k} y_7 \; (k=0, 1, \ldots, 7) \quad [C6]$$

Figure 23A:
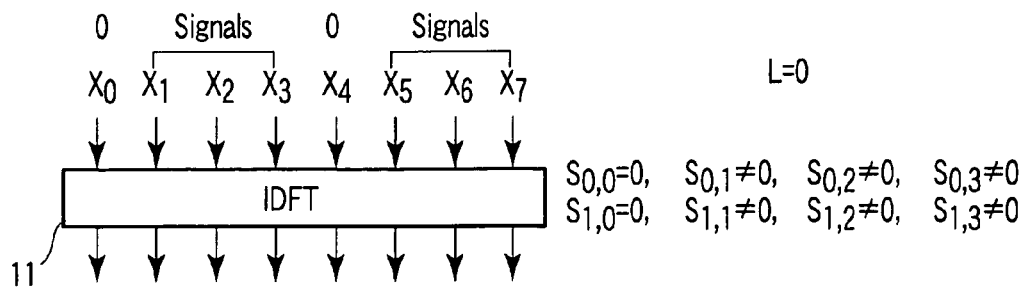
FIG. 23A is a view illustrating the relationship between no-information signals in IDFT 11 and $S_{p,L}$ (p=0, 1; L=0, 1, 2, 3) when the value of L that makes $S_{p,L}$ 0 is 0.
Figure 23B:
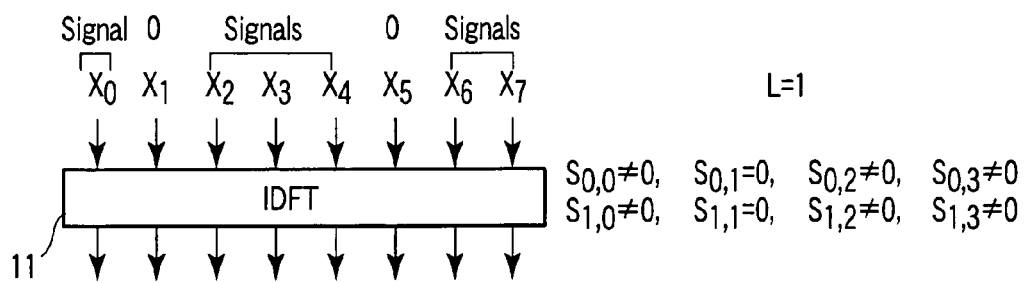
FIG. 23B is a view illustrating the relationship between no-information signals in IDFT 11 and $S_{p,L}$ (p=0, 1; L=0, 1, 2, 3) when the value of L that makes $S_{p,L}$ 0 is 1.
Figure 23C:
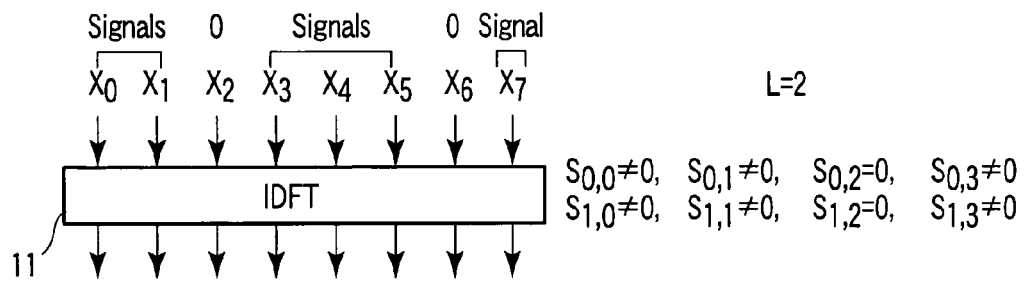
FIG. 23C is a view illustrating the relationship between no-information signals in IDFT 11 and $S_{p,L}$ (p=0, 1; L=0, 1, 2, 3) when the value of L that makes $S_{p,L}$ 0 is 2.
Figure 23D:
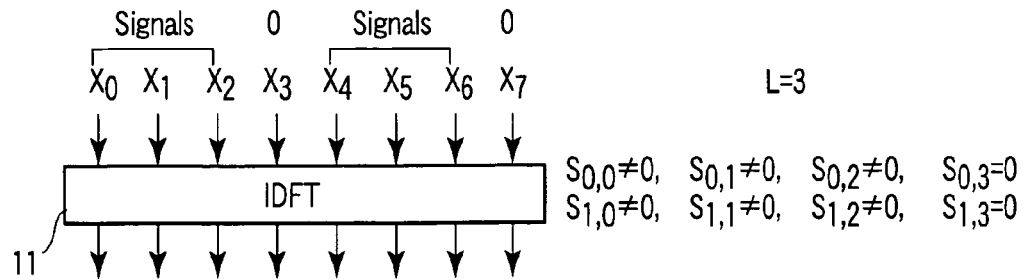
FIG. 23D is a view illustrating the relationship between no-information signals in IDFT 11 and $S_{p,L}$ (p=0, 1; L=0, 1, 2, 3) when the value of L that makes $S_{p,L}$ 0 is 3.

Referring now to FIGS. 23A, 23B, 23C and 23D, a description will be given of the principle used by the estimation circuit 24 to estimate the value of L. FIG. 23A is a view illustrating the relationship between no-information signals in IDFT 11 and $S_{p,L}$ (p=0, 1; L=0, 1, 2, 3) when the value of L that makes $S_{p,L}$ 0 is 0. FIG. 23B is a view illustrating the relationship between no-information signals in IDFT 11 and $S_{p,L}$ (p=0, 1; L=0, 1, 2, 3) when the value of L that makes $S_{p,L}$ 0 is 1. FIG. 23C is a view illustrating the relationship between no-information signals in IDFT 11 and $S_{p,L}$ (p=0, 1; L=0, 1, 2, 3) when the value of L that makes $S_{p,L}$ 0 is 2. FIG. 23D is a view illustrating the relationship between no-information signals in IDFT 11 and $S_{p,L}$ (p=0, 1; L=0, 1, 2, 3) when the value of L that makes $S_{p,L}$ 0 is 3.

The estimation circuit 24 receives $S_{p,0}, S_{p,1}, S_{p,2}$ and $S_{p,3}$ from the 4-DFT 23 with the four input/output points. Since the 4-DFT 23 simultaneously outputs four signals $S_{p,o}, S_{p,1}, S_{p,2}$ and $S_{p,3}$, the estimation circuit 24 simultaneously receives them. Accordingly, in the ninth embodiment, the estimation circuit 24 receives all signals $S_{p,L}$ (p=0, 1; L=0, 1, 2, 3) required for determining the value of L, after the 4-DFT 23 performs discrete Fourier transform twice.

For example, in the case shown in FIG. 23A, where $X_0=0$ and $X_4=0$, the estimation circuit 24 receives, from the 4-DFT 23, $S_{p,0}=0$ (p=0, 1) and $S_{p,L} \neq 0$ (p=0, 1; L=1, 2, 3). Similarly, in the case shown in FIG. 23B, where $X_1=0$ and $X_5=0$, the estimation circuit 24 receives, from the 4-DFT 23, $S_{p,1}=0$ (p=0, 1) and $S_{p,L} \neq 0$ (p=0, 1; L=0, 2, 3). In the case shown in FIG. 23C, where $X_2=0$ and $X_6=0$, the estimation circuit 24 receives, from the 4-DFT 23, $S_{p,2}=0$ (p=0, 1) and $S_{p,L} \neq 0$ (p=0, 1; L=0, 1, 3). In the case shown in FIG. 23D, where $X_3=0$ and $X_7=0$, the estimation circuit 24 receives, from the 4-DFT 23, $S_{p,3}=0$ (p=0, 1) and $S_{p,L} \neq 0$ (p=0, 1; L=0, 1, 2).

Conversely, if it can be determined whether the value of $S_{p,L}$ (p=0, 1; L=0, 1, 2, 3) is 0, which ones of $X_0, X_1, \ldots, X_7$ are set to a level of 0, i.e., the value of L, can be determined.

Figure 24:
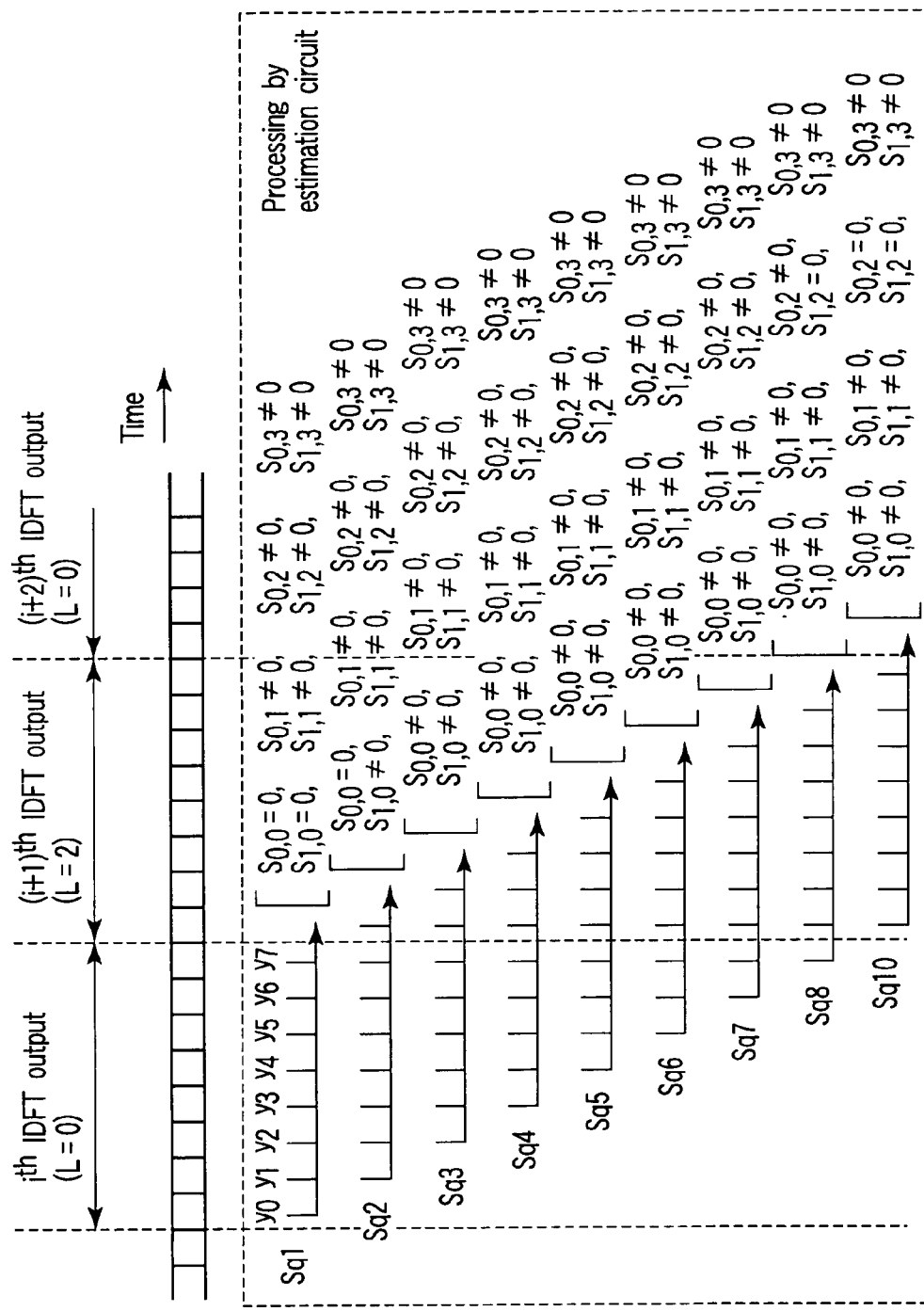
FIG. 24 is a view useful in explaining successive reception of transmission symbols by a multi-carrier receiver, and determination of a value L for each transmission symbol by an estimation circuit.

Referring then to FIG. 24, a description will be given of how the multi-carrier receiver 20 estimates the value of L included in received signals. FIG. 24 is a view useful in explaining successive reception of transmission symbols by the multi-carrier receiver 20, and determination of a value L for each transmission symbol by the estimation circuit 24. In the case of FIG. 24, the insertion positions of no-information signals are changed in units of transmission symbols. Specifically, in the $i^{th}$ transmission symbol, no-information signals are inserted at the position L=0. In the $(i+1)^{th}$ transmission symbol, no-information signals are inserted at the position L=2. Further, in the $(i+2)^{th}$ transmission symbol, no-information signals are inserted at the position L=0.

Concerning received time-base signals $y_0, y_1, y_2, y_3, y_4, y_5, y_6$ and $y_7$, the extraction unit 22 extracts a sequence of signals in units of eight signals, while shifting the extraction position by one signal at a time. For instance, as shown in FIG. 24, firstly, a signal sequence sq1 of received signals $y_0, y_1, y_2, y_3, y_4, y_5, y_6$ and $y_7$ as the $i^{th}$ output signal sequence of the IDFT 11 is extracted. Subsequently, the extraction position is shifted by one signal, and the next signal sequence sq2 is extracted, which is formed of the received signals $y_1, y_2, y_3, y_4, y_5$ and $y_6$ of the $i^{th}$ output signal sequence of the IDFT 11, and the received signal $y_0$ of the $(i+1)^{th}$ output signal sequence of the IDFT 11. The extraction unit 22 repeats the same extraction as the above. Thus, the extraction unit 22 extracts, for example, a signal sequence sq6 that is formed of the received signals $y_5, y_6$ and $y_7$ of the $i^{th}$ output signal sequence of the IDFT 11, and the received signals $y_0, Y_1, y_2, y_3$ and $y_4$ of the $(i+1)^{th}$ output signal sequence of the IDFT 11.

The extraction unit 22 reorders each extracted sequence of eight signals into $y_0, y_1, y_2, y_3, y_4, y_5, y_6$ and $y_7$, and extracts a signal sequence of $y_p, y_{p+2}, y_{p+4}$ and $y_{p+6}$ in which p is 0, and a signal sequence of $y_p, y_{p+2}, y_{p+4}$ and $y_{p+6}$ in which p is 1. The unit 22 outputs these signal sequences to the 4-DFT 23. More specifically, in the case of the signal sequence sq6 in FIG. 24, $y_5, y_6$ and $y_7$ of the $i^{th}$ output signal sequence of the IDFT 11, and $y_0, y_1, y_2, y_3$ and $y_4$ of the $(i+1)^{th}$ output signal sequence of the IDFT 11 are reordered into $y_0, y_1, y_2, y_3, y_4, y_5, y_6$ and $y_7$. That is, $y_5$ of the $i^{th}$ output signal sequence is replaced with $y_0$, $y_6$ of the $i^{th}$ output signal sequence with $y_1$, $y_7$ of the $i^{th}$ output signal sequence with $y_2$, $y_0$ of the $(i+1)^{th}$ output signal sequence with $y_3$, $y_1$ of the $(i+1)^{th}$ output signal sequence with $y_4$, $y_2$ of the $(i+1)^{th}$ output signal sequence with $y_5$, $y_3$ of the $(i+1)^{th}$ output signal sequence with $y_6$, and $y_4$ of the $(i+1)^{th}$ output signal sequence with $y_7$. After that, a signal sequence of $y_p, y_{p+2}, y_{p+4}$ and $y_{p+6}$, in which p is 0, and a signal sequence of $y_p, y_{p+2}, y_{p+4}$ and $y_{p+6}$, in which p is 1, are extracted from the signal sequence of $y_0, y_1, y_2, y_3, y_4, y_5, y_6$ and $y_7$, and are output to the 4-DFT 23.

Based on the signal sequence of $y_p, y_{p+2}, y_{p+4}$ and $y_{p+6}$ (p=1, 0), the 4-DFT 23 calculates $S_{P,L}$ (p=0, 1; L=0, 1, 2, 3), and outputs it to the estimation circuit 24. The estimation circuit 24, in turn, determines whether $S_{P,L}$ is 0 (p=0, 1; L=0, 1, 2, 3), thereby acquiring the value of L that satisfies $S_{P,L}=0$ (p=0, 1) on condition that the other values of L do not make $S_{P,L}$ 0.

For example, in the case of the signal sequence sq1, $S_{p,0}=0$ (p=0, 1) and $S_{P,L}=0$ (p=0, 1; L=1, 2, 3). Accordingly, the estimation circuit 24 estimates that L=0. Similarly, in the case of a signal sequence sq10, $S_{p,2}=0$ (p=0, 1) and $S_{P,L}=0$ (p=0, 1; L=0, 1, 3). Accordingly, the estimation circuit 24 estimates that L=2. In the signal sequences sq1 to sq10 shown in FIG. 24, any other value of L does not satisfy $S_{P,L}=0$ (p=0, 1).

Thus, the estimation circuit 24 can determine the value of L that satisfies $S_{P,L}=0$ (p=0, 1) on condition that the other values of L do not make $S_{P,L}$ 0. Accordingly, even if the multi-carrier receiver 20 cannot detect those two (=N) of the eight (=M) modulated signals input to the IDFT 11 of the multi-carrier transmitter 10, which are set to a level of 0, i.e., even if the receiver cannot detect the value of the non-negative integer L not higher than N−1 and included in the equations [C2], the estimation circuit 24 can estimate the value of L.

In an actual transmission channel, the equations [C4-1] and [C4-2] are not satisfied because of the influence of noise, multipath fading, etc. Therefore, a certain value $v_2$ is preset, and if the power level is slower than $v_2$, as is given by the following inequality, $S_{P,L}$ is considered to be 0, thereby determining the value of L:

$$(S_{P,L})^2 < v^2 \quad [C7]$$

There is another method for determining the value of L. In this method, in each signal sequence of $y_p, y_{p+2}, y_{p+4}$ and $y_{p+6}$ (p=0, 1) output from the extraction unit 22, if the output signals $S_{0,L}$ (L=0, 1, 2, 3) and $S_{1,L}$ (L=0, 1, 2, 3) output from the 4-DFT 23 have respective minimum power levels, they are regarded as 0, thereby determining the value of L. More specifically, the one of the four signals $S_{p,L}$ (p=0; L=0, 1, 2, 3) output from the 4-DFT 23, which has the minimum power level, is regarded as 0, and the one of the next four signals $S_{p,L}$ (p=1; L=0, 1, 2, 3) output from the 4-DFT 23, which has the minimum power level, is also regarded as 0. If a value of L is found which satisfies $S_{P,L}=0$ (p=0, 1) on condition that the other values of L do not make $S_{P,L}$ 0, it is regarded as the target value of L.

Figure 25:
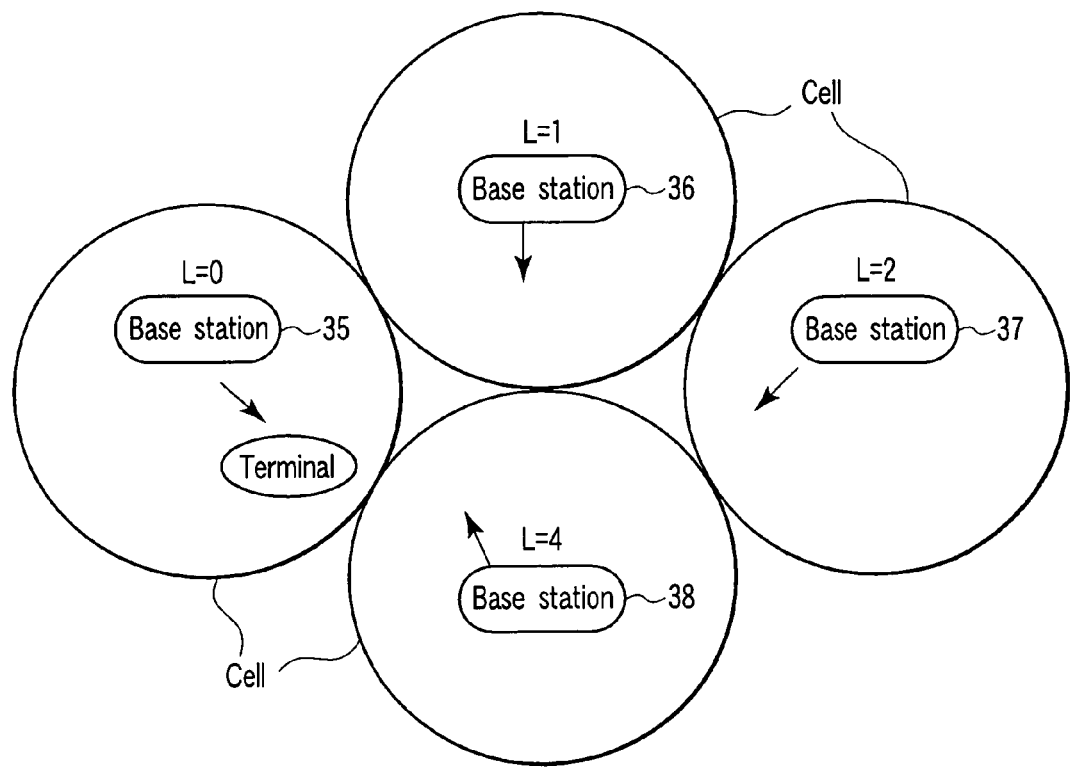
FIG. 25 is a view illustrating an example case where unique values of L are assigned to respective stations.

Referring now to FIG. 25, a description will be given of an information example contained in a transmission symbol by setting a value L in the symbol. FIG. 25 is a view illustrating an example case where unique values of L are assigned to respective base stations.

In the case of FIG. 25, different base stations transmit signals using different values of L. In other words, in different base stations, the insertion position of each no-information signal differs. In this case, different values of L are assigned to different cells that indicate the service areas of the base stations. Each terminal prestores, in its memory, a table, for example, which stores base stations and their values of L so that it can detect, from each value of L, the base station from which it has received a transmission symbol. By virtue of this, mobile terminals can detect the base station they are now accessing, i.e., the cell they now belong to. In the example of FIG. 25, the terminal is receiving a symbol of L=0, therefore detects that it belongs to the cell of a base station 35. Further, if the terminal shifts to the cell of another base terminal and receives a transmission symbol therefrom, it can detect the cell to which it belongs.

Although in the example of FIG. 25, the terminal recognizes each base station (cell) by changing the value of L between 0, 1, 2 and 3, the embodiment is not limited to this. For example, the terminal can detect the base station that has sent a transmission symbol thereto, from a pattern of values of L included in transmission symbols. Specifically, the terminal can detect to which cell it now belongs, from a pattern of, for example, three values of L included in three successive transmission symbols. For example, the base station 35 utilizes a pattern of values of L included in three successive transmission symbols, i.e., 0, 2 and 0. Similarly, the base station 36 utilizes a pattern of 2, 1 and 3, the base station 37 a pattern of 2, 2 and 2, and the base station 38 a pattern of 3, 0 and 2. Thus, if L has four values of 0, 1, 2 and 3, and three successive transmission symbols are utilized to discriminate each cell (base station), 64 (=4×4×4) cells (base stations) can be discriminated at maximum. The larger the range of the values of L, and the larger the number of successive transmission symbols, the larger the number of recognizable cells (base stations).

Other than the above, various types of information can be assigned to transmission symbols using the values of L. For example, when a plurality of transmission symbols are sent to a terminal, the values of L can indicate the boundaries between the two symbols of successively transmitted symbols. Specifically, when one hundred of transmission symbols are transmitted as one packet, to indicate boundaries of packets, the value of L included in the first and last transmission symbols of each packet are set to, for example, 0, and the value of L included in the other transmission symbols of each packet are set to, for example, 1. In this case, packet boundaries are detected between the transmission symbols with L of 0.

Further, a destination to which a transmission symbol is sent can also be designated using a value of L. If a base station transmits different types of information to users 1 and 2, the values of L included in, for example, four successive transmission symbols to be sent to user 1 as one packet are set to 0, 1, 2 and 3, while the values of L included in, for example, four successive transmission symbols to be sent to user 2 as one packet are set to 1, 0, 3 and 2. By setting different patterns of values of L for different users, the base station can transmit information to individual users. In this case, the user terminals can detect the boundaries of packets. User 1 detects a boundary when the value of L shifts from 3 to 0, while user 2 detects a boundary when the value of L shifts from 2 to 1.

Furthermore, the modulation scheme for transmitting signals employed in a base station can be reported to a terminal. In this case, a value of L for a transmission symbol is preset in accordance with the modulation scheme utilized. For example, if L=0, L=1 and L=2 are set to indicate 4-PSK, 16-QAM and 64-QAM, respectively, a terminal as a receiver can detect the modulation scheme of symbols transmitted from a base station, by detecting the value of L.

Referring to FIGS. 26A, 26B and 26C, transmission efficiency will be described. FIG. 26A is a view illustrating a case where modulated signals input to the IDFT appearing in FIG. 22 are all 4-PSK signals. FIG. 26B is a view illustrating a case where two of the modulated signals shown in FIG. 26A are no-information signals, and the other six modulated signals are all 4-PSK signals. FIG. 26C is a view illustrating a case where two of the modulated signals shown in FIG. 26A are no-information signals, and other two modulated signals are 16-QAM signals.

In the case shown in FIG. 26B where $X_0$ and $X_4$ included in the input signals $X_0, X_1, \ldots, X_7$ of the IDFT 11 are no-information signals, the transmission efficiency is lower by the transmission bits of the no-information signals $X_0$ and $X_4$ than the case shown in FIG. 26A where none of the input signals $X_0, X_1, \ldots, X_7$ are no-information signals.

In light of this, in the ninth embodiment, when one input signal is set to a no-information signal, the modulation circuit 13 modulates, into a signal of a larger number of bits, one of the input signals of the IDFT 11 other than the no-information signal, as is shown in FIG. 26C. The modulation circuit 13 is a circuit for modulating an input signal into a modulated signal corresponding to a predetermined modulation scheme.

For instance, the modulation circuit 13 modulates a 4-PSK signal into a 16-QAM signal or 64-QAM signal, etc., which has a larger number of transmission bits than the former.

FIG. 26C shows an example, where the number of transmission bits is identical to that in the example of FIG. 26A where all input signals $X_0, X_1, \ldots, X_7$ are 4-PSK signals. Since the number of transmission bits of a 16-QAM signal is double the number of transmission bits of a 4-PSK signal, two 4-PSK input signals are replaced with respective 16-QAM signals in the example of FIG. 26C where two input signals are no-information signals.

The embodiment is not limited to the use of the 16-QAM scheme as in the examples of FIG. 26C.

For example, to make the number of transmission bits identical to that in the example of FIG. 26A, two 4-PSK signals included in $X_0, X_1, \ldots, X_7$ may be replaced with respective 8-PSK signals. Alternatively, one 4-PSK signal included in $X_0, X_1, \ldots, X_7$ may be replaced with a 64-QAM signal.

Further, if no-information signals are included in $X_0, X_1, \ldots, X_7$, and if the power is reduced by the number of the no-information signals, the resistance to errors is reduced. To prevent a reduction in resistance to errors, the ninth embodiment employs a power-adjusting unit 14 for increasing the power of the modulated signals $X_1'$ and $X_5'$ of the 16-QAM scheme in order to make the total power of $X_0, X_1', \ldots, X_5', \ldots, X_7$ shown in FIG. 26C identical to that of $X_0, X_1, \ldots, X_7$ shown in FIG. 26A. If the former total power can be made identical to the latter, the resistance to errors can be made identical.

As described above, some of the IDFT input signals can be set to no-information signals without degrading the resistance to errors and without reducing the number of transmission bits per one symbol. In other words, the modulation scheme and power can be set on condition that the input signals of the IDFT 11 have the same number of bits and the same power.

However, if a reduction in the number of transmission bits by setting a certain 4-PSK input signal of the IDFT 11 to a level of 0 is allowed, it is not necessary to change the modulation scheme for another input signal to another multi-value modulation scheme. It is sufficient if the modulation scheme is kept at the 4-PSK scheme. Further, if a reduction in error ratio due to a change in modulation scheme for a certain input signal is allowed, no power adjustment is needed.

The number of no-information signals included in each transmission symbol input to the IDFT 11 can be changed in accordance with the state of the transmission channel. This will be explained referring to FIGS. 27A and 27B. FIG. 27A is a block diagram illustrating a multi-carrier transmission system in which a transmission channel from a base station 50 to a terminal 40 differs from that from the terminal 40 to the base station 50. FIG. 27B is a block diagram illustrating a multi-carrier transmission system in which a transmission channel from a base station 70 to a terminal 60 is identical to that from the terminal 60 to the base station 70.

The terminal 40 or the base station 70 detects the state of the transmission channel, and controls the modulation circuit contained in an OFDM transmitter 52 or 73. For example, if the multipath delay time is long, the base station controls the modulation circuit contained in the OFDM transmitter 52 or 73 to increase the number of no-information signals to be inserted. On the other hand, if the multipath delay time is short, the base station controls the modulation circuit to reduce the number of no-information signals to be inserted. The base station detects the state of the transmission channel in the manner stated below.

FIG. 27A illustrates frequency division duplex (FDD) communication in which up-link and down-link transmission channels are used between the base station 50 and terminal 40. In this case, when OFDM transmission is performed from the base station 50 to the terminal 40 using the down transmission channel, the base station 50 instructs the terminal 40 to inform the base station of the transmission condition for the down-link transmission channel via the up-link transmission channel. Based on the transmission condition for the down-link transmission channel supplied from the terminal 40, the base station 50 executes OFDM transmission.

More specifically, for instance, in the terminal 40, a down-link transmission channel estimation unit 42 estimates the state of the down-link transmission channel based on a signal received by the OFDM receiver 41. Subsequently, a transmitter 43 transmits, to the base station 50, information concerning the state of the down-link transmission channel estimated by the estimation unit 42. In the base station 50, a receiver 51 receives the information concerning the state of the down-link transmission channel, and outputs the information to the OFDM transmitter 52. The OFDM transmitter 52 transmits a signal to the terminal 40, based on the input information concerning the state of the down-link transmission channel.

On the other hand, FIG. 27B illustrates time division duplex (TDD) communication in which only a single transmission channel is used as both an up-link transmission channel and down-link transmission channel between the base station 70 and terminal 60. In this case, when OFDM transmission is performed from the base station 70 to the terminal 60, the base station 70 detects a transmission condition for the down-link transmission channel, from the characteristics of a signal received. Based on the detected transmission condition for the down-link transmission channel, the base station 70 executes OFDM transmission.

More specifically, for instance, in the base station 70, a down-transmission-channel estimation unit 72 estimates the state of the down-link transmission channel from a signal received by a receiver 71. Based on the estimated state, the OFDM transmitter 73 transmits a signal to the terminal 60.

Tenth Embodiment

Figure 28:
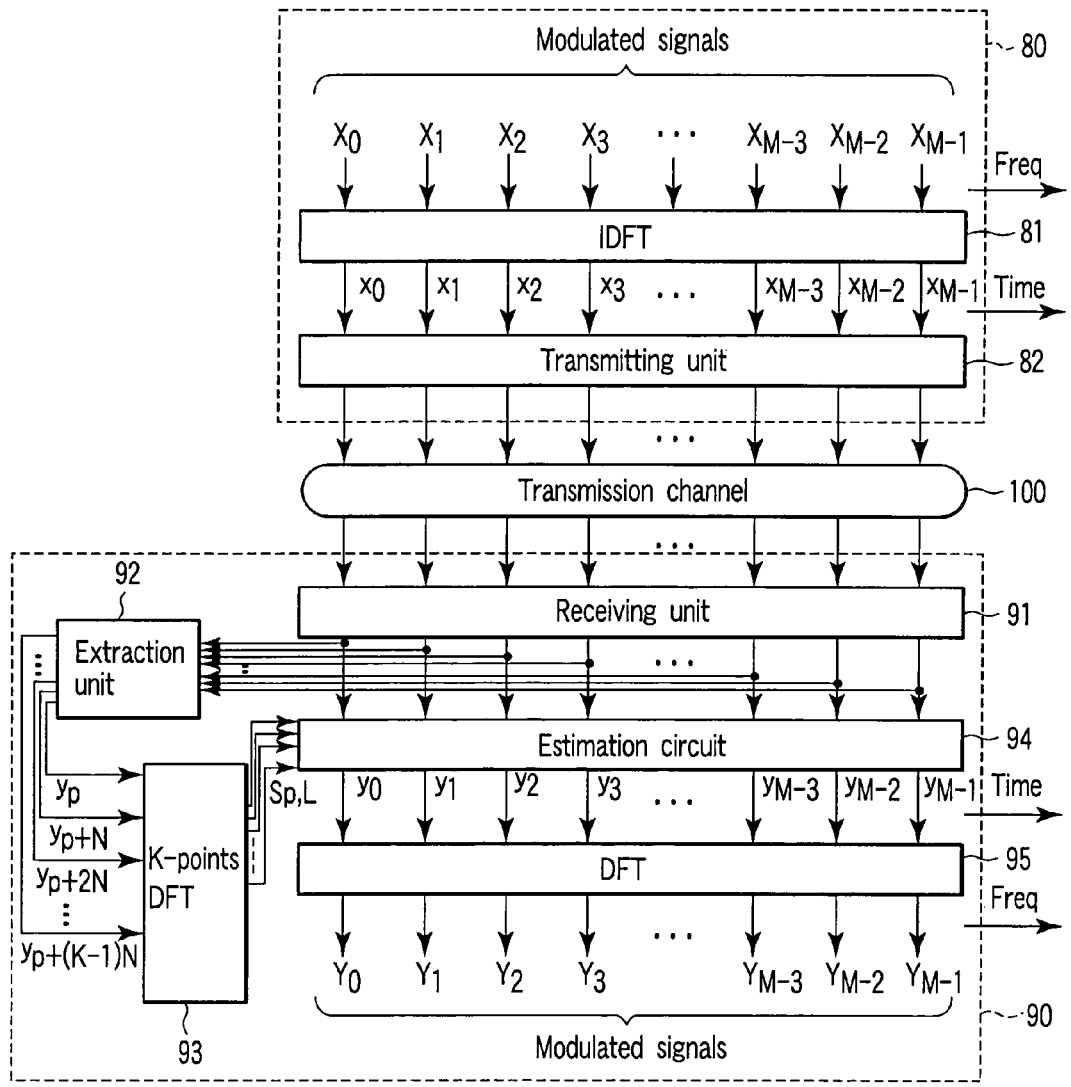
FIG. 28 is a block diagram illustrating a multi-carrier transmission system according to a tenth embodiment of the invention.

Although the above-described ninth embodiment is directed to a reverse discrete Fourier transformer having eight (=M) input/output points, a tenth embodiment is directed to a generalized case where M is set to $2^m$ (m is a positive integer). This case will be described with reference to FIG. 28. FIG. 28 is a block diagram illustrating a multi-carrier transmission system according to the tenth embodiment.

In a transmitter 80, every $k^{th}$ $X_{L+pk}$ (L=0, 1, ..., K−1; p=0, 1, ..., N−1; M=KN; N=$2^n$) included in the input signals $X_0$, $X_1$, ..., $X_{M-1}$ of an IDFT 81 with M (M=$2^m$) input/output points and beginning from $X_L$ is set to a level of 0.

Assuming that the input signals of the IDFT 81 are $X_0$, $X_1$, ..., $X_{M-1}$, the output signals of the IDFT are $x_0$, $x_1$, ..., $x_{M-1}$, $W_M$=exp(−j2π/M), and j2=−1, the relationship between the input and output signals is given by $$x_k = (1/M)\left(X_0 + W_M^{-k} X_1 + W_M^{-2k} X_2 + \ldots + W_M^{-(M-1)k} X_{M-1}\right) \quad [C8]$$

($\underline{k}$ represents an integer, and $0 \leq k \leq M-1$)

Further, up is defined for the output signals $x_0$, $x_1$, ..., $x_{M-1}$ of the IDFT 81, using the following equations (the combination of the output signals $x_0$, $x_1$, ..., $x_{M-1}$ is a transmission symbol):

$$u_p = W_M^{pL} x_p + W_M^{(p+N)L} x_{p+N} + \quad [C9]$$
$$W_M^{(p+2N)L} x_{p+2N} + \ldots + W_M^{(p+(K-1)N)L} x_{p+(K-1)N},$$

($\underline{p}$ represents an integer, and $0 \leq p \leq N-1$)

If $u_0$, $u_1$, ..., $u_{N-1}$ is input to a DFT with N input/output points, the output signal $U_k$ (k represents an integer, and $0 \leq k \leq M-1$) of the DFT is given by $$U_k = u_0 + W_N^k u_1 + W_N^{2k} u_2 + \ldots + W_N^{(N-1)k} u_{N-1} \quad [C10]$$

where $W_N$=exp(−j2π/N)=$W_M^K$. Using the equations [C9], the equations [C10] can be modified in the following manner:

$$U_k = x_0 + W_M^{(L+kK)} x_1 + W_M^{2(L+kK)} x_2 + \ldots + W_M^{(M-1)(L+kK)} x_{M-1} \quad [C11]$$

On the other hand, if $x_0$, $x_1$, ..., $x_{M-1}$ is input to a DFT with M input/output points, the output signal $X_k$ (k represents an integer, and $0 \leq k \leq M-1$) of the DFT is given by $$X_k = x_0 + W_M^k x_1 + W_M^{2k} x_2 + \ldots + W_M^{(M-1)k} x_{M-1} \quad [C12]$$

From the equations [C11] and [C12], the followings are acquired:

$$X_{L+pK} = U_p \quad (p=0, 1, \ldots, N-1; L=0, 1, \ldots, K-1) \quad [C13]$$

In the equations [C13], if $X_{L+pK}=U_p=0$, the output signal $u_p$ of an IDFT with N input/output points assumed when $U_0$, $U_1, \ldots, U_{N-1}$ are input thereto is naturally $u_p=0$ ($p=0, 1, \ldots, N-1$). Accordingly, from the equations [C9], the followings are acquired:

$$W_M^{pL} x_p + W_M^{(p+N)L} x_{p+N} + W_M^{(p+2N)L} x_{p+2N} + \ldots + \quad [C14]$$
$$W_M^{(p+(K-1)N)L} x_{p+(K-1)N} = 0,$$
$$(p = 0, 1, \ldots, N-1; L = 0, 1, \ldots, K-1)$$

If each of the right and left parts of the equations [C14] are divided by $W_M^{pL}$, and if $W_M^N = \exp(-j2\pi N/M) = \exp(-j2\pi/K) = W_K$ is considered, then the following equations are acquired from the above equations [C14]:

$$x_p + W_K^L x_{p+N} + W_K^{2L} x_{p+2N} + \ldots + W_K^{(K-1)L} x_{p+(K-1)N} = 0 \quad [C15]$$
$$(p = 0, 1, \ldots, N-1; N-1; L = 0, 1, \ldots, K-1)$$

The equations [C15] are used as a constraint on the output signals of the IDFT 81 with the M input/output points when $X_{L+pk}$ ($L=0, 1, \ldots, K-1$; $p=0, 1, \ldots, N-1$; $M=KN$; $N=2n$) is set to a level of 0.

For example, in the ninth embodiment where M=8, N=2 and K=4, the equation [C15] are modified as follows:

$$x_p + W_4^L x_{p+2} + W_4^{2L} x_{p+4} + W_4^{3L} x_{p+6} = 0 \quad (p=0, 1) \quad [C16]$$

Thus, the equations [C16] are identical to the equations [C3-1] and [C3-2] extracted in the ninth embodiment.

A receiving unit 91 receives, as an adjacent signal sequence of $y_0, y_1, \ldots, y_{M-1}$, a transmission symbol sequence having passed through a transmission channel 100. An extraction unit 92 receives the transmission symbol sequence from the receiving unit 91, extracts, therefrom, signal sequences of $y_p$, $y_{p+N}, y_{p+2N}, \ldots, y_{p+(K-1)N}$ ($p=0, 1$), and outputs the extracted signal sequences to a K-points DFT 93. Assuming here that the transmission channel 100 is an ideal one free from noise, multipath fading, etc., if a boundary is detected at correct timing in the symbol sequence received by the multi-carrier receiver 20, i.e., if accurate symbol synchronization is performed, the following is established between the time-base signals:

$$x_k = y_k \quad (k=0, 1, \ldots, M-1) \quad [C17-1]$$

Similarly, the following is established between the frequency-base signals:

$$X_k = Y_k \quad (k=0, 1, \ldots, M-1) \quad [C17-2]$$

Since, in general, each input and corresponding output of a DFT is in a one for one relationship, if the equations concerning the input or output are established, the other equations are also established. On the other hand, if signal transmission is out of synchrony with signal reception, i.e., if symbol synchronization is not established, the above equations [C17-1] or [C17-2] are not established.

The K-points DFT 93 has M input/output points and receives the signal sequence of $y_p, y_{p+N}, y_{p+2N}, \ldots, y_{p+(K-1)N}$.

The K-points DFT 93 performs DFT transform on the signals to calculate $S_{P,L}$ using the following equations:

$$S_p, L = y_p + W_K^L y_{p+N} + W_K^{2L} y_{p+2N} + \ldots + W_K^{(K-1)L} y_{p+(K-1)N} \quad [C18]$$
$$(L = 0, 1, \ldots, K-1; p = 0, 1, \ldots, N-1; M = KN;$$
$$M = 2^m; N = 2^n)$$

Thus, the 4-points DFT 93 receives the signal sequence of $y_p, y_{p+N}, y_{p+2N}, \ldots, y_{p+(K-1)N}$, performs discrete Fourier transform concerning the signals input to the K input/output points, and outputs a signal sequence of $S_{p,0}, S_{p,1}, S_{p,2}, \ldots, S_{p,K-1}$. Since in the tenth embodiment, $p=0, 1, \ldots, N-1$, the K-points DFT 93 performs four-point discrete Fourier transform N times. The K-points DFT 93 outputs the calculated $S_{p,L}$ to an estimation circuit 94. $S_{p,L}=0$ is a constraint on the equations [C15]. The estimation circuit 94 sequentially receives $S_{p,L}$ ($L=0, 1, \ldots, K-1$; $p=0, 1, \ldots, N-1$), thereby determining whether each $S_{p,L}$ is 0, and estimating the value of L. In other words, the estimation circuit 94 estimates the value of L that makes $S_{p,L}$ 0 when $p=0, 1, \ldots, N-1$.

Accordingly, even if the multi-carrier receiver 20 cannot detect the N signals set to a level of 0, which are included in the M modulated signals input to the IDFT 81 of the multi-carrier transmitter 80, i.e., even if the receiver cannot detect the value of the non-negative integer L not higher than N-1 and included in the equations $X_{L+pK}=0$, the estimation circuit 94 can estimate the value of L. Specifically, the estimation circuit 94 examines which ones of the K output signals $S_{p,0}, S_{p,1}, \ldots, S_{p,K-1}$ ($p=0, 1, \ldots, N-1$) output when the K signals $y_p, y_{p+N}, y_{p+2N}, \ldots, y_{p+(K-1)N}$ are input to the K-points DFT 93 with the K input/output points are 0, thereby estimating the value of L included in $S_{p,L}$ with the level of 0. Thus, the estimation circuit 94 can detect the N signals set to a level of 0, which are included in the M modulated signals input to the IDFT 81.

A DFT 95 performs discrete Fourier transform on a signal sequence, and outputs the transformed signals as output signals. Assuming that the input and output signals of the DFT 25 are $y_0, y_1, \ldots, y_{M-1}$ and $Y_0, Y_1, \ldots, Y_{M-1}$ respectively, the input and output signals have the following relationship:

$$Y_k = y_0 + W_M^k y_1 + W_M^{2k} y_2 + \ldots + W_M^{(M-1)k} y_{M-1} \quad (k=0, 1, \ldots, M-1) \quad [C19]$$

The other principles are similar to those employed in the ninth embodiment.

A description will be given of the DFT transform operations performed. In the case of using the equations [C18], discrete Fourier transform is performed N times at each of the K points of the K-points DFT 93. Assume here that a DFT with M input/output points is used, instead of the K-points DFT 93, to directly receive the signal sequence of $y_0, y_1, \ldots, y_{M-1}$ In this case, DFT operations are performed M times to acquire $S_{p,L}$. In both cases, the same calculation result is acquired. Considering that M=KN, the total number of operations in the case (1) where discrete Fourier transform is performed N times at each of the K points will now be compared with that in the case (2) where discrete Fourier transform is performed one time at each of the M points. The number of operations corresponds to the number of complex operations since the numbers included in the equations [C18] are complex numbers.

The number of complex operations performed by the DFT with the M input/output points is $M^2$. Accordingly, the number of complex operations in the case (1) is $K^2N$, while the number of complex operations in the case (1) is $K^2N^2$ ($=M^2$). Thus, the number of operations is smaller in the case (1) than in the case (2).

Further, fast Fourier transformers (FFTs) and inverse fast Fourier transformers (IFFTs) may be utilized instead of all DFTs and IDFTs employed in the tenth embodiment. The total number of operations in the case (3) where fast Fourier transform is performed N times at each of the K points will be compared with that in the case (4) where fast Fourier transform is performed one time at each of the M points. The number of complex operations in the case (3) is $(K/2)(\log_2 K-1)N$, while the number of complex operations in the case (4) is $(M/2)(\log_2 M-1)=(KN/2)(\log_2 K+\log_2 N-1)$. Thus, the number of operations is smaller in the case (3) than in the case (4).

In addition, concerning the number of operations, there is a more efficient operation method. When a value of L is detected in each transmission symbol, M signals are extracted as $y_0, y_1, \ldots, y_{M-1}$ from a transmission symbol sequence at certain timing, thereby executing DFT operations N times at each of the K points to acquire $S_{p,L}$ given by the equations [C19]. After that, while the extraction position is shifted by one signal, the same operations are executed. At this time, however, a greater part of the required operations can be omitted by utilizing the results of the preceding operations. That is, when M signals are extracted as $y_1, y_2, \ldots, y_M$, and the operations given by the following equations are executed, it is actually sufficient if one DFT operation is performed at each of the K points to acquire $S_{p,L}$ when $p=N-1$ and $L=0, 1, \ldots, K-1$:

$$S_{p,L} = \qquad [C20]$$
$$y_{p+1} + W_K^L y_{p+N+1} + W_K^{2L} y_{p+2N+1} + \ldots + W_K^{(K-1)L} y_{p+(K-1)N+1}$$
$$(L = 0, 1, \ldots, K-1; p = 0, 1, \ldots, N-1; M = KN;$$
$$M = 2^m; N = 2^n)$$

This is because $S_{p,L}$ obtained when $p=0, 1, \ldots, N-2$ and $L=0, 1, \ldots, K-1$ have already been calculated by the preceding DFT operations concerning the already extracted $y_0, y_1, \ldots, y_{M-1}$. Similarly, concerning the next M signals, too, it is sufficient if one DFT operation is performed at each of the K points.

The above-described embodiments are not limited to radio communication between a base station and terminal, but also applicable to wireless or wired broadcasting.

The present embodiment is not limited to the above-described embodiments, but may be modified in various ways without departing from its scope. Further, various embodiments can be realized by appropriately combining the structural elements disclosed in the embodiments. For example, some element may be deleted from the entire elements employed in the embodiments. Furthermore, elements employed in different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-carrier transmission system comprising:
    a transmitter including:
        an acquisition unit configured to acquire $2^m$ (m: a natural number) modulated signals including $2^n$ (n: a natural number; n<m) no-information signals which are failed to be used for information transmission, the acquisition unit subjecting the modulated signals to inverse discrete Fourier transform to obtain a plurality of transformed signals, an $L^{th}$ modulated signal of the modulated signals being a first no-information signal of the no-information signals, every $K^{th}$ modulated signal of the modulated signals that is counted from the first no-information signal being a subsequent no-information signal of the no-information signals (K: a natural number; L: an integer; $K=2^{m-n}$; $0 \leq L \leq K-1$); and
        a transmission unit configured to transmit the transformed signals; and
    a receiver including:
        a receiving unit configured to receive the transformed signals; and
        a detection unit configured to detect synchronization timing by extracting a sequence of time-based signals of the received signals to establish a relation between the received signals, the relation being determined by positions of the no-information signals included in the transformed signals.

2. The system according to claim 1, wherein the detection unit detects the synchronization timing based on a constraint corresponding to a relational expression related to the transformed signals.

3. The system according to claim 1, wherein the acquisition unit transforms the M ($=2^m$) modulated signals $X_k$ (k: an integer $0 \leq k \leq M-1$) into $X_k$, $X_k$ being defined to be $$x_k = (1/M)(X_0 + W_M^{-k} X_1 + W_M^{-2k} X_2 + \ldots + W^{-(M-1)k} X_{M-1}),$$
$$(W_M = \exp(-j2\pi/M); j2 = -1).$$

4. The system according to claim 1, further comprising a bit-increasing unit configured to increase the number of transmission bits of at least one of $(2^m-2^n)$ modulated signals which fail to include the no-information signals, the number of transmission bits of the $(2^m-2^n)$ modulated signals being higher than the number of transmission bits of the $2^m$ modulated signals if the $2^m$ modulated signals fails to include the no-information signals.

5. The system according to claim 4, wherein the bit-increasing unit increases a multi-value modulating number of at least one of the $2^m$ modulated signals other than the modulated signals including the no-information signals.

6. A multi-carrier transmission system comprising:
    a transmitter including:
        an acquisition unit configured to acquire $2^m$ (m: a natural number) modulated signals including $2^n$ (n: a natural number; n<m) no-information signals which are failed to be used for information transmission, the acquisition unit subjecting the $2^m$ modulated signals to inverse discrete Fourier transform to obtain a plurality of transformed signals, an $L^{th}$ modulated signal of the modulated signals being a first no-information signal of the no-information signals, every $K^{th}$ modulated signal of the modulated signals that is counted from the first no-information signal being a subsequent no-information signal of the no-information signals (K: a natural number; L: an integer; $K=2^{m-n}$; $0 \leq L \leq K-1$); and a transmission unit configured to transmit the $2^m$ transformed signals; and a receiver including:

a receiving unit configured to receive the $2^m$ transformed signals; and a calculation unit configured to calculate, based on the $2^m$ transformed signals received, a constraint given by a relational expression established between the $2^m$ received signals determined by positions of the no-information signals included in the transformed signals; and a correction unit configured to correct at least one of the transformed signals to establish the constraint by extracting a sequence of time-base signals of the $2^m$ received signals.

7. The system according to claim 6, wherein the transmission unit copies q (q: an integer; $1 \leq q \leq 2^m$) sequential latter ones of the $2^m$ transformed signals, and transmits q copied modulated signals before the $2^m$ modulated signals.

8. The system according to claim 6, wherein assuming that the $2^m$ transformed signals received are represented by $y_k$ (k: an integer; $0 \leq k \leq M-1$; $M=2^m$), the correction unit corrects at least one of the $2^m$ modulated signals received $y_k$, using a constraint given by following equations:

$$y_p + W_K^L y_{p+N} + W_K^{2L} y_{p+2N} + \ldots + W_K^{(K-1)L} y_{p+(K-1)N} = 0,$$

$(W_K = \exp(-j2\pi/K); j^2 = -1; N = 2^n; p:$ an integer;

$0 \leq p \leq N-1).$

9. The system according to claim 6, which further comprises a determination unit configured to determine, if a to-be-corrected received signal is predetermined, a level of noise based on a constraint established between received signals other than the to-be-corrected received signal, and wherein the correction unit fails to correct the to-be-corrected received signal if the level of the noise is higher than a value, the correction unit corrects the to-be-corrected received signal if the level of the noise is not higher than the value.

10. The system according to claim 6, wherein the acquisition unit is configured to transform the M ($=2^m$) modulated signals $X_k$ (k: an integer; $0 \leq k \leq M-1$) into a value given by the following formula:

$$x_k = (1/M)(X_0 + W_M^{-k} X_1 + W_M^{-2k} X_2 + \ldots + W^{-(M-1)k} X_{M-1}),$$

$(W_M = \exp(-j2\pi/M); j^2 = -1).$

11. A multi-carrier transmission system comprising: a transmitter including:

an acquisition unit configured to acquire $2^m$ (m: a natural number) modulated signals including $2^n$ (n: a natural number; n<m) no-information signals which are failed to be used for information transmission, the acquisition unit subjecting the $2^m$ modulated signals to inverse discrete Fourier transform to obtain a plurality of transformed signals, an $L^{th}$ modulated signal of the modulated signals being a first no-information signal of the no-information signals, every $K^{th}$ modulated signal of the modulated signals that is counted from the first no-information signal being a subsequent no-information signal of the no-information signals (K: a natural number; L: an integer; $K=2^{m-n}$; $0 \leq L \leq K-1$); and a transmission unit configured to transmit $2^m$ transformed signals; and a receiver including:

a receiving unit configured to receive $2^m$ transmitted signals;

a detection unit configured to detect $2^m$ received signals which have distorted amplitudes;

a correction unit configured to correct at least one of detected signals;

a transforming unit configured to transform, if the correction unit fails to correct at least one of the detected signals, both the at least one detected signal corrected by the correction unit and the at least one detected signal which are failed to be corrected; and a setting unit configured to set, to no-information signals, the received signals which correspond to the no-information signals, to subject the no-information signals and a plurality of transformed signals to inverse discrete Fourier transform, and to input, to the transforming unit, a plurality of inverse-discrete-Fourier-transformed signals which correspond to a plurality of amplitude-distorted signals, as corresponding input signals for the transforming unit.

12. The system according to claim 11, wherein the receiver further includes a determination unit configured to determine whether the setting unit should operate, based on a constraint given by a relational expression established between the $2^m$ transmitted signals and also based on the amplitude-distorted signals, the determination unit supplying to the setting unit a determination signal containing a determination result.

13. The system according to claim 11, wherein the receiver further includes:

a counter which counts number of operations of each of the transforming unit and the setting unit; and an output unit configured to output, to the setting unit, a stop signal for stopping the setting unit if the number of operations exceeds a value.

14. The system according to claim 11, wherein the receiver further includes:

a storage unit configured to store a plurality of amplitudes for a plurality of first output signals output from the transforming unit;

a comparator which compares respective amplitudes corresponding to the first output signals with a plurality of second output signals which are output from the transforming unit after the transforming unit receives a plurality of signals output from the setting unit and processes each of the signals; and an output unit configured to output, to the setting unit, a stop signal for stopping the setting unit if a difference between the amplitudes corresponding to the first output signals and the second output signals is lower than a value.

15. The system according to claim 11, wherein assuming that the $2^m$ received signals are represented by $y_k$ (k: an integer; $0 \leq k \leq M-1$; $M=2^m$), the correction unit corrects at least one of the $2^m$ received signals $y_k$, using a constraint given by the following equations:

$$y_p + W_K^L y_{p+N} + W_K^{2L} y_{p+2N} + \ldots + W_K^{(K-1)L} y_{p+(K-1)N} = 0,$$

$$(W_k = \exp(-j2\pi/K); j^2 = -1; N = 2^n;$$

$$p : \text{an integer}, 0 \leq p \leq N-1).$$

16. A multi-carrier transmission system comprising: a transmitter including:
   an acquisition unit configured to acquire $2^m$ (m: a natural number) modulated signals including $2^n$ (n: a natural number; n<m) no-information signals which are failed to be used for information transmission, the acquisition unit subjecting the $2^m$ modulated signals to inverse discrete Fourier transform to obtain a plurality of transformed signals, an $L^{th}$ modulated signal of the modulated signals being a first no-information signal of the no-information signals, every $K^{th}$ modulated signal of the modulated signals that is counted from the first no-information signal being a subsequent no-information signal of the no-information signals (K: a natural number; L: an integer; K=$2^{m-n}$; 0≤L≤K−1); and
   a transmission unit configured to transmit $2^m$ transformed signals of the transformed signals; and
a receiver including:
a receiving unit configured to receive the transmitted $2^m$ transformed signals; and
an estimation unit configured to estimate a value of L based on the received $2^m$ transformed signals.

17. The system according to claim 16, wherein the estimation unit estimates the value of L based on a constraint as a relational expression established between the $2^m$ modulated signals.

18. The system according to claim 16, wherein the estimation unit includes:
   a generation unit configured to generate, from the $2^m$ received signals, K calculation signals for calculating a constraint as a relational expression established between the $2^m$ modulated signals; and
   a transform unit configured to subject the K calculation signals to discrete Fourier transform.

19. The system according to claim 18, wherein the transform unit subjects the K calculation signals to one of discrete Fourier transformer and fast Fourier transformer.

20. The system according to claim 16, wherein assuming that the $2^m$ received signals are represented by $y_k$ (k: an integer; 0≤k≤M−1; M=$2^m$), the estimation unit acquires a power of $$y_p + W_K^L y_{p+N} + W_K^{2L} y_{p+2N} + \ldots + W_K^{(K-1)L} y_{p+(K-1)N} = 0.$$

$$(W_k = \exp(-j2\pi/K); j^2 = -1; N = 2^n;$$

$$p : \text{an integer}, 0 \leq p \leq N-1)$$

for each value of p, and estimates the value of L from a value of L' which makes the power not higher than a value.

* * * * *